US007197418B2

(12) United States Patent
Fuller, III et al.

(10) Patent No.: US 7,197,418 B2
(45) Date of Patent: *Mar. 27, 2007

(54) ONLINE SPECIFICATION OF A SYSTEM WHICH COMPARES DETERMINED DEVICES AND INSTALLED DEVICES

(75) Inventors: David W. Fuller, III, Austin, TX (US);
Michael L. Santori, Austin, TX (US);
Brian Sierer, Austin, TX (US); Ganesh Ranganathan, Austin, TX (US); John Pasquarette, Austin, TX (US); Joseph E. Peck, Round Rock, TX (US);
Matthew Novacek, Austin, TX (US);
Hugo A. Andrade, Austin, TX (US);
Newton Petersen, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/223,360

(22) Filed: Sep. 9, 2005

(65) Prior Publication Data

US 2006/0009945 A1    Jan. 12, 2006

Related U.S. Application Data

(63) Continuation of application No. 10/120,261, filed on Apr. 10, 2002, now Pat. No. 7,043,393, which is a continuation-in-part of application No. 10/101,512, filed on Mar. 19, 2002, now Pat. No. 7,050,923.

(60) Provisional application No. 60/312,359, filed on Aug. 15, 2001.

(51) Int. Cl.
*G06F 19/00* (2006.01)

(52) U.S. Cl. ............... 702/127; 702/121; 702/188; 700/9; 700/28; 700/90; 709/208; 709/217; 709/238; 709/246; 713/1; 713/100

(58) Field of Classification Search ........ 702/121–123, 702/188, 127; 700/9, 28, 90; 709/208, 217, 709/238, 246; 713/1, 100
See application file for complete search history.

(56) References Cited

U.S. PATENT DOCUMENTS 4,812,996 A    3/1989  Stubbs (Continued)

FOREIGN PATENT DOCUMENTS

EP    0 782 318    7/1997
WO    97 35254    9/1997

OTHER PUBLICATIONS

Anritsu, 'MX148070A, Jitter Measurement Applicaiton Software, MX158071A, Jitter Measurement Sequence Driver', Jan. 2001, pp. 1-11.*

(Continued)

*Primary Examiner*—Marc S. Hoff
*Assistant Examiner*—Elias Desta
(74) *Attorney, Agent, or Firm*—Meyertons Hood Kivlin Kowert & Goetzel, P.C.; Jeffrey C. Hood; Mark S. Williams

(57) ABSTRACT

A system and method for online configuration of a measurement device for a measurement system. The user accesses a server with a client computer over a network and specifies a desired measurement task. If the user lacks the hardware required to perform the task, hardware specifications and configuration software and/or data specific to the user's application, i.e., to perform the task, are sent to a manufacturer, who pre-configures the hardware with the configuration software and/or data to perform the task and sends the pre-configured hardware to the user. The hardware may be re-configurable hardware, such as a programmable hardware element or processor/memory based device. Configuration software and/or data for configuring the user's measurement system hardware (and/or software) to perform the desired task may also be sent to the user. The configuration software sent to the user may comprise a graphical program usable by the measurement system to perform the task.

46 Claims, 26 Drawing Sheets

U.S. PATENT DOCUMENTS

| | | |
|---|---|---|
| 4,868,785 A | 9/1989 | Jordan et al. |
| 4,884,228 A | 11/1989 | Stanley et al. |
| 5,136,705 A | 8/1992 | Stubbs et al. |
| 5,155,836 A | 10/1992 | Jordan et al. |
| 5,309,352 A | 5/1994 | Stubbs |
| 5,481,741 A | 1/1996 | McKaskle et al. |
| 5,630,164 A | 5/1997 | Williams et al. |
| 5,801,942 A | 9/1998 | Nixon |
| 5,812,394 A | 9/1998 | Lewis et al. |
| 5,828,851 A | 10/1998 | Nixon |
| 5,838,563 A | 11/1998 | Dove |
| 5,966,532 A | 10/1999 | McDonald et al. |
| 5,970,471 A | 10/1999 | Hill |
| 5,991,537 A | 11/1999 | McKeon et al. |
| 6,053,951 A | 4/2000 | McDonald et al. |
| 6,061,057 A | 5/2000 | Knowlton et al. |
| 6,064,816 A | 5/2000 | Parthasarathy et al. |
| 6,083,267 A | 7/2000 | Motomiya |
| 6,098,028 A | 8/2000 | Zwan et al. |
| 6,167,383 A | 12/2000 | Henson |
| 6,173,438 B1 | 1/2001 | Kodosky et al. |
| 6,219,628 B1 | 4/2001 | Kodosky et al. |
| 6,339,763 B1 | 1/2002 | Divine |
| 6,344,853 B1 | 2/2002 | Knight |
| 6,370,569 B1 * | 4/2002 | Austin ........................ 709/217 |
| 6,785,805 B1 | 8/2004 | House et al. |
| 6,985,876 B1 * | 1/2006 | Lee ............................. 705/27 |
| 7,043,393 B2 * | 5/2006 | Fuller et al. ................ 702/127 |
| 2003/0101025 A1 * | 5/2003 | Shah et al. ................. 702/188 |
| 2003/0163298 A1 | 8/2003 | Odom et al. |
| 2005/0102199 A1 | 5/2005 | Lee |

OTHER PUBLICATIONS

Cigoy, 'Configuring Your Data Acquisition or Test and Measurement System for Maximum Noise Immunity', Jan. 1999, pp. 1-11.*

Thomas Handschuch, "Solaris 2 Systemadministration", 1995, International Thomson Publishing, pp. 357-359.

Truchard, J.J., "Software Technology for Automated Measurements", IEEE, 1991, XP010085113, pp. 259-262.

Konig, R. et al. "Combining Rules and State Objects in a Configuration Expert System", Proceedings of the Conference on Artificial Intelligence Applications, 1991, pp. 275-279.

Kramer, B.M., "Knowledge-Based Configuration of Computer Systems Using Hierarchical Partial Choice", Proceedings of the International Conference on Tools for Artificial Intelligence, San Jose, Nov. 5-8, 1991, pp. 368-375.

Tracy Marks, "Windows 95 Manual," Windweaver Training Online, Jun. 2, 1997, pp. 1-9.

National Instruments Corporation, *LabView User Manual*, Chapter 2: Introduction to Virtual Instruments, Jul. 2000, pp. 2-1 through 2-5.

National Instruments Corporation Instrumentation Reference and Catalogue 1997, Copyright 1996, pp. 3-2 and 3-3.

No Author, "Test and Measurement", IEEE Spectrum, v 30, January 1993, p. 56.

* cited by examiner

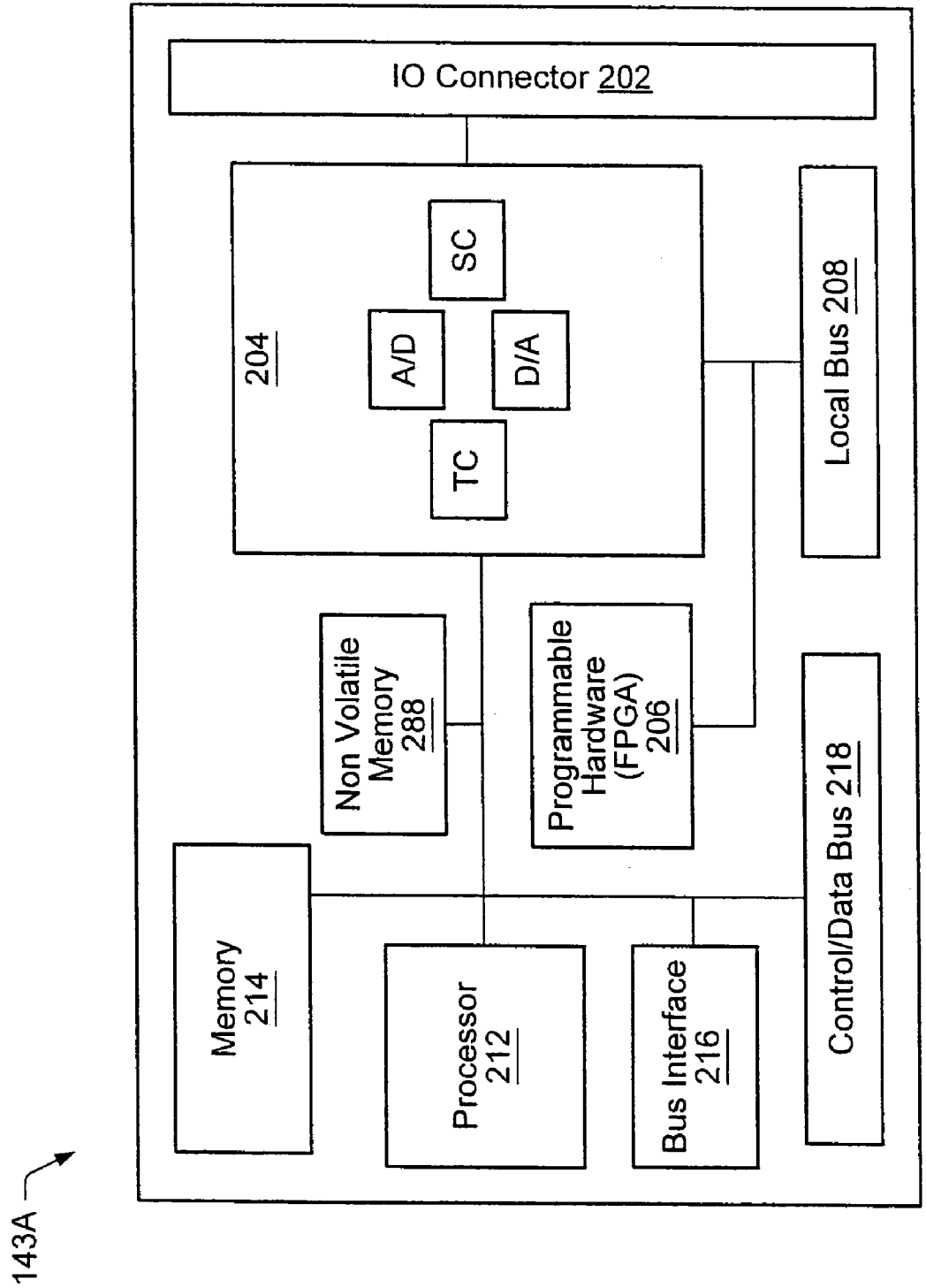

Fig. 16C

ONLINE SPECIFICATION OF A SYSTEM WHICH COMPARES DETERMINED DEVICES AND INSTALLED DEVICES

CONTINUATION AND PRIORITY DATA

This application is a Continuation of U.S. application Ser. No. 10/120,261, titled "System and Method for Online Specification of Measurement Hardware", filed Apr. 10, 2002 now U.S. Pat. No. 7,043,393 whose inventors are David W. Fuller III, Michael L. Santori, Brian Sierer, Ganesh Ranganathan, John Pasquarette, Joseph E. Peck, Matthew Novacek, Hugo A. Andrade, and Newton Petersen, which claims benefit of priority of U.S. Provisional Application Ser. No. 60/312,359 titled "System and Method for Online Configuration of a Measurement System" filed Aug. 15, 2001, whose inventors are Brian Sierer, Ganesh Ranganathan, Hugo Andrade and Joseph Peck.

U.S. application Ser. No. 10/120,261, titled "System and Method for Online Specification of Measurement Hardware", filed Apr. 10, 2002 is a Continuation In Part of U.S. application Ser. No. 10/101,512 titled "Network-based System for Configuring a Measurement System using Configuration Information Generated based on a User Specification" filed Mar. 19, 2002, now U.S. Pat. No. 7,050,923 whose inventors are Brian Sierer, Ganesh Ranganathan, John Pasquarette, David W. Fuller III, Joseph E. Peck, Matthew Novacek, and Hugo A. Andrade.

FIELD OF THE INVENTION

The present invention relates to the fields of system design, computer software, and electronic commerce, and more particularly to online specification, configuration, distribution and deployment of hardware to perform desired tasks. Additionally, applications of the invention to measurement and automation applications are described.

DESCRIPTION OF THE RELATED ART

Current models for purchasing software allow the user to purchase pre-existing, static software programs that are targeted to a mass audience. For example, a user can access a web site of numerous different software vendors and purchase and download desired pre-packaged software programs. Similarly, hardware available for purchase is usually provided un-configured, or with a standard default configuration. If the user requires a particular hardware configuration to perform a desired task, the hardware must generally be configured by the user, which may require expertise not readily available.

However, current electronic commerce models for purchasing or retrieving software do not have any provision for online specification of a task to facilitate creation of a custom program or configuration. Stated another way, current electronic commerce models for purchasing software do not include the ability to programmatically generate a program or configuration that implements a task that has been specified by the user. Therefore, an improved electronic commerce model is desired for specifying, creating, distributing and deploying software programs and/or data, and hardware configuration programs. Additionally, improved systems and methods are desired for specifying and providing hardware and/or software and data to a user for use in a system, such as a measurement system.

One area where users to desire to purchase custom software and/or hardware solutions is in the area of measurement and automation. Scientists and engineers often use measurement or automation systems to perform a variety of functions, including measurement of a physical phenomena or unit under test (UUT), test and analysis of physical phenomena, simulation, hardware-in-the-loop testing, process monitoring and control, control of mechanical or electrical machinery, data logging, laboratory research, and analytical chemistry, to name a few examples.

A typical measurement system comprises a computer system with a measurement device or measurement hardware. The measurement device may be or include a computer-based instrument, a data acquisition device or board, a programmable logic device (PLD), a sensor, an actuator, or other type of device for acquiring or generating data. The measurement device may be a card or board plugged into one of the I/O slots of the computer system, a card or board plugged into a chassis, or an external device. For example, in a common measurement system configuration, the measurement hardware is coupled to the computer system via other means such as through a VXI (VME extensions for Instrumentation) bus, a PXI (PCI extensions for Instrumentation) bus, a GPIB (General Purpose Interface Bus), a serial port, or parallel port of the computer system. Optionally, the measurement system includes signal conditioning devices which receive the field signals and condition the signals to be acquired.

A measurement system may also typically include transducers, sensors, actuators or other detecting (or generating) means for providing "field" electrical signals representing a process, physical phenomena, equipment being monitored or measured, etc. The field signals are provided to the measurement hardware.

The measurement hardware is configured and controlled by measurement software executing on the computer system. The measurement software for configuring and controlling the measurement system typically comprises two portions: the device interface or driver level software and the application software, or the application. The driver level software serves to interface the measurement hardware to the application. The driver level software may be supplied by the manufacturer of the measurement hardware or by some other third party software vendor. An example of measurement or DAQ driver level software is NI-DAQ from National Instruments Corporation. The application or client is typically developed by the user of the measurement system and is tailored to the particular function or task which the user intends the measurement system to perform.

One current area of research and development is the use of reconfigurable instruments to perform measurement and automation tasks. For example a reconfigurable measurement device may include a programmable hardware element, such as a Field Programmable Gate Array (FPGA), which may be reconfigurable to perform a variety of measurement operations. As another example, a reconfigurable measurement device may include a CPU and memory, whereby measurement application programs may be stored and executed to perform a variety of measurement operations. Typically, a user who wishes to configure such an instrument for a particular measurement task may use various tools and references to determine the correct configuration of the device for the measurement task. This process may be complicated to perform and prone to error. Additionally, in many cases the user may not have the hardware and/or software necessary to support the task, and may not know how to determine the required resources for the task. An e-commerce vendor who wishes to provide measurement system components to a user may be faced with a frustrated customer and high product returns, due to errors in product selection and configuration.

Therefore, it would be desirable to provide new systems and methods for specifying and configuring hardware and software for various tasks, such as measurement tasks. It would further be desirable to provide new electronic commerce systems to allow vendors to more easily create and distribute programs (including software programs and hardware configuration programs) to customers.

SUMMARY OF THE INVENTION

Various embodiments for online (or network-based) configuration of a system are presented. More particularly, various embodiments are presented for network-based (e.g., Internet-based) specification, creation, and deployment of hardware, configuration information and/or programs to users. Embodiments of the present invention may be used to support new models of electronic commerce.

The system may include a client computer system and one or more devices coupled to the client computer system. The client computer system may couple to a server, also referred to as a configuration server, over a network. The client computer system may be operated by a user, and the server may be operated by a vendor to support online specification, creation, and deployment of task-specific configuration information and/or programs, based on user input.

The client computer system may receive user input specifying requirements for a desired task, and the client may provide these requirements to the server. The server may then determine or programmatically generate one or more of: configuration information, one or more software programs, and/or one or more hardware configuration programs, in response to or based on the requirements. The configuration information, software program(s), and/or hardware configuration program(s) may then be transferred to the client computer system and/or devices to configure the system to perform the task. Embodiments of the invention may be used in various fields, including measurement, automation, simulation, and others. Various embodiments of the invention are described below in a measurement application.

In one embodiment, the user of the client computer system may provide user input to the client computer system indicating one or more requirements for a measurement task desired to be performed by the measurement system. For example, the client computer system may display a graphical user interface (GUI) on its display, and the GUI may receive the user input indicating the requirements for the measurement task. In one embodiment, the server may provide the GUI to the client computer system over the network, and the client computer system may display the received GUI. The GUI may display a plurality of panels on the display to guide the user of the client computer system in providing the requirements for the measurement task. Thus, the GUI may comprise a "task specification wizard" or "task specification assistant" that guides the user to specify a portion or all of task, preferably in a specific domain, such as measurement or automation.

The requirements may comprise information indicating types of the one or more measurement devices present in the system, desired operation of the one or more measurement devices, desired signal analysis, etc. For example, the requirements may comprise information regarding one or more of signal type, sampling rate, timing, scaling, analysis function, and display function, among others.

The requirements provided by the user may comprise information specifying the measurement devices present in the user's system. The requirements may also specify one or more target measurement devices to be configured by the configuration information, software programs, and/or hardware configuration programs (collectively referred to as "software products"). The server may also programmatically determine information (requirements) from the system being configured, such as the types of devices present, current configuration settings, current installed programs, etc.

In one embodiment, the client computer system may display a graphical user interface (GUI) which iconically illustrates the measurement system in the form of a configuration diagram. The GUI may be generated by software executing on the client computer system or the server computer system. For example, the GUI may display one or more device icons corresponding to respective ones of the one or more measurement devices in the measurement system. The GUI may also display connections between the device icons, wherein the displayed connections correspond to couplings between the measurement device(s) and/or the client computer system. The GUI may further display one or more icons which represent software products to be created and/or deployed in a device, referred to a software product icons. For example, the GUI may further display one or more software product icons, e.g., configuration icons, corresponding to configuration information generated (or to be generated) by the server, one or more software product icons, e.g., program icons, corresponding to programs generated (or to be generated) by the server, and/or one or more hardware configuration program icons corresponding to hardware configuration programs generated (or to be generated) by the server.

The user may provide input to the GUI specifying the one or more target measurement devices to be configured by the software products, either before or after the software products have been provided by the server. The user may associate any of these various icons with a device icon, e.g., by using drag and drop techniques. For example, where a user associates a configuration icon with a device icon, where the configuration icon corresponds to first configuration information, and where the device icon corresponds to a first device, the association may operate to initiate generation of the first configuration information and/or may operate to configure the first device with the first configuration information. As another example, where a user associates a program icon with a device icon, where the program icon corresponds to a first program, and where the device icon corresponds to a first device, the association may operate to initiate generation of the first program and/or deploy or store the first program on the first device. As another example, where a user associates a hardware configuration program icon with a device icon, wherein the hardware configuration program icon corresponds to a first hardware configuration program, and where the device icon corresponds to a first device having a programmable hardware element, the association may operate to initiate generation of the first hardware configuration program and/or configure the programmable hardware element with the first hardware configuration program.

The client computer system may provide the requirements for the measurement task to a server over a network, such as the Internet. In one embodiment, the server may host a vendor configuration site or a vendor e-commerce site through which the client computer system and/or the user may interface with the server.

The server may then determine one or more software products, e.g., one or more of: configuration information, one or more software programs, and/or one or more hardware configuration programs, in response to the received requirements (and also including any information determined by the server). Thus the server may store software that is executable to receive requirements for a measurement task from a client computer, optionally determine capabilities of the measurement system, and determine (e.g., programmatically generate) one or more software products, e.g., one or more of: configuration information, one or more software programs, and/or one or more hardware configuration programs, in response to the requirements and/or capabilities.

The respective software products (e.g., configuration information, software program(s), and/or hardware configuration program(s)) may then be transferred to the client computer system and deployed on various devices. In one embodiment, the user may then deploy the various received software products on various devices in the system. For example, the user may use the configuration diagram GUI to iconically or graphically deploy the various software products to various devices. Alternatively, the server may operate to automatically or programmatically deploy the software products on the devices in the user's system. In this embodiment, where the client system displays a configuration diagram, the configuration diagram may be animated or graphically updated to visually display to the user the various software product deployments that the server is performing. In yet another embodiment, the client computer may automatically deploy the software products on the devices in the system, for example, by detecting the hardware and/or software, and launching a configuration program, which itself may be one of the downloaded software products, to deploy the software products.

In one embodiment, the software product(s) may comprise a complete, executable solution. In another embodiment, the software products may not be a complete solution (e.g., due to an incomplete specification by the user), and, for example, the user may be required to complete a portion of a received program. In one embodiment, the software products provided by the server may include development tools that can be installed on the client computer and used to develop a software product for the measurement task. In one embodiment, the server may provide development tools in addition to other software products, such as configuration information, software program(s) and/or hardware configuration program(s). In another embodiment, the server may provide only development tools.

In one embodiment, the server operates to generate and provide one or more software products (configuration information, software programs, and/or hardware configuration programs) without any cost to the user of the client computer system. In another embodiment, the client computer system provides payment information to pay for receipt of the software products. The payment information may be provided to the server, or to a separate payment server.

Exemplary embodiments of determining and providing software products (e.g., configuration information, one or more software programs, and/or one or more hardware configuration programs) are described below.

In a first embodiment, the server may determine configuration information in response to the requirements. The configuration information may be useable for configuring the measurement system to perform the measurement task. The server may determine the configuration information at least in part by retrieving the configuration information from a memory medium based on the requirements. Alternatively, the server may determine the configuration information at least in part by programmatically generating the configuration information in response to the one or more requirements.

The configuration information may comprise configuration data for configuring the measurement system, e.g., parameters for configuring one or more of the measurement devices. For example, the configuration information may be useable to configure one or more of: the client computer system, the one or more measurement devices, and/or one or more application programs. In a measurement application example, the configuration information may comprise one or more of sampling rate, gain setting, signal type, timing information, and scaling information, among other types of measurement parameters. The configuration information may also include one or more help files and/or one or more example files. The example files may include example source code, such as graphical source code (e.g., a LabVIEW VI) or textual source code, such as C code.

The client computer system may include a configuration software program which is operable to receive the configuration information and configure the measurement system using the configuration information. Alternatively, in addition to the configuration information, the server may further determine and provide one or more programs that are executable by the client computer system to configure the measurement system with the configuration information to perform the measurement task.

Thus, in various embodiments, the configuration information may include:

configuration data for configuring the measurement system to perform the measurement task, where the client computer system includes a configuration software program which is operable to receive the configuration data and configure the measurement system;

configuration data and a configuration program (e.g., an installer) which is executable by the client computer system to configure one or more of the client computer system and the one or more measurement devices using the configuration data; and/or a self-executing program file which operates to configure one or both of the client computer system and the one or more measurement devices with the configuration information.

After the server determines the configuration information, the server may provide the configuration information to the measurement system over the network. The measurement system may then be configured using the configuration information, wherein the measurement system may be operable to perform the measurement task after being configured using the configuration information. For example, the client computer system may receive the configuration parameters and configure one or more measurement devices, the client computer system, and/or one or more software programs accordingly.

After being configured using the configuration information, the measurement system may operate to perform the measurement task. It is noted that other programs, either developed by the user or provided by the server, may be used to perform the measurement task. In a measurement application example, the measurement system may receive a signal from a signal source, and the one or more measurement devices may operate according to the configuration information to analyze the signal.

In a second embodiment, the server may determine one or more software programs in response to the requirements.

The software program(s) may be executable by the measurement system to perform the measurement task.

The software program(s) may comprise executable code (machine language code) which is executable by the measurement system to perform the measurement task. Alternatively, the software program(s) may comprise source code which is one or more of: 1) compilable and executable, or 2) interpretable, by the measurement system to perform the measurement task. In one embodiment, the software program(s) may comprise at least one graphical program. In this embodiment, the measurement system may store a graphical program execution engine for executing the graphical program to perform the measurement task. The software program(s) may also comprise any combination of the above, e.g., one or more executable code files, one or more source programs in a text-based programming environment, and/or one or more graphical programs.

The server may determine the software program(s) at least in part by retrieving the programs from a memory medium based on the requirements. Alternatively, or in addition, the server may determine the software program(s) at least in part by programmatically generating the programs based on the requirements. In one embodiment, the server may programmatically generate a graphical program in response to the requirements. For example, in response to receiving the one or more requirements for the task, the server may generate a LabVIEW graphical program developed under the National Instruments LabVIEW graphical development environment, which is usable to perform the task. The generated graphical program may then be sent to the client computer system.

After the server determines the software program(s), the server may provide the software program(s) to the measurement system over the network. The software program(s) may be deployed in the measurement system in various respective locations. For example, the software program(s) may be executable by the client computer system. Alternatively, or in addition, a measurement device may have a processor and memory for executing the program(s). In one embodiment, the provided software program(s) may not be complete and/or executable, and the user may be required to complete the program in some way prior to execution or deployment on the various devices. In one embodiment, the server may further provide software development tools (e.g., LabVIEW) to aid the user in completing the received program.

After the software program(s) are deployed in the system, the measurement system may execute the software program(s) to perform the measurement task. In a measurement application example, the one or more measurement devices and/or client computer system may execute the software program(s) to receive a signal from a signal source and analyze the signal.

Where the received program is a graphical program, the client may execute a graphical program execution engine (e.g., LabVIEW or LabVIEW RT) to execute the graphical program to perform the specified task. In other words, the measurement system may include the graphical program execution engine, thereby facilitating native execution of the graphical program on the system to perform the task.

In another embodiment, the graphical program may be converted to an executable format (machine code), and run or executed under a real time operating system to perform the task. As another example, the graphical program may be converted to a different or "lower level" source code format, such as C, C++, FORTRAN, Basic, Java, etc., then compiled or interpreted for execution under an operating system, such as a real time operating system. In yet another embodiment, the graphical program may be converted to a hardware configuration program at the client computer and used to configure a programmable hardware element in the client system.

In a third embodiment, the server may determine one or more hardware configuration programs in response to the requirements. The one or more hardware configuration programs may be used to configure a programmable hardware element in the measurement system to perform the measurement task.

The server may determine the hardware configuration program(s) at least in part by retrieving the programs from a memory medium based on the requirements. Alternatively, or in addition, the server may determine the hardware configuration program(s) at least in part by programmatically generating the hardware configuration programs based on the requirements.

A hardware configuration program may be generated in various ways. For example, the server may programmatically generate a program (e.g., a text-based program or a graphical program) in response to the requirements, and then programmatically generate the hardware configuration program based on the program. As another example, the server may programmatically generate an intermediate specification or data structure representing the desired operation, and then programmatically generate the hardware configuration program based on this intermediate specification or data structure.

After the server determines the hardware configuration program(s), the server may provide the hardware configuration program(s) to the measurement system over the network. The hardware configuration program(s) may be deployed in the measurement system in various respective locations. For example, a measurement device may have a programmable hardware element that is configurable using the program(s). The user may choose to deploy the hardware configuration program(s) to various devices, e.g., using a GUI based configuration diagram. In one embodiment, the provided hardware configuration program(s) may not be complete, and the user may be required to complete the hardware configuration program in some way prior to deployment on a programmable hardware element. In one embodiment, the server may further provide hardware configuration program development tools to aid the user in completing the received program.

After the programmable hardware element in the measurement system is configured with the hardware configuration program, the programmable hardware element may operate according to the hardware configuration program to perform at least a portion of the measurement task. In a measurement application example, a measurement device having a programmable hardware element that has been configured according to the hardware configuration program may operate accordingly to receive a signal from a signal source and analyze the signal.

In one embodiment, if the server determines, either programmatically or based on user input, that the that the client system does not include a necessary measurement hardware device for performing the task, and if the user agrees to purchase the device, the server may transmit information to a manufacturer, e.g., to a manufacturing server operated by the manufacturer, indicating that the measurement hardware device should be shipped to the user. For example, the server may display a dialog box to the user indicating that a hardware device is needed and asking the user if he/she desires to purchase this hardware device. The manufacturer may then send the measurement hardware device to the user.

Where the server is operated by the hardware manufacturer, the server may simply send the software product order to a hardware fulfillment server for processing. For example, National Instruments may operate a server which is operable to receive user requirements specifying a task and determine (or create) software products that perform this task as described above, and may also include a hardware fulfillment server that interfaces to manufacturing for providing necessary hardware software products to users.

In one embodiment, the server may also transmit the software products that have been determined to the hardware fulfillment server (manufacturer) so that the hardware device can be appropriately configured before being sent to the user. Thus, the manufacturer may configure the measurement hardware device with the respective software products, e.g., by storing a software program on the device or by configuring a programmable hardware element on the device, prior to sending the indicated hardware device to the user. In this instance, the configured measurement hardware device sent to the user may already be operable to perform the desired measurement task. In another embodiment, the one or more software products may be provided to the user for configuring the hardware device when it is received. The software products may be provided to the client computer system over the Internet, via a CD ROM sent by mail, or by any other transmission means. In another embodiment, the server may provide the appropriate development tools to the client computer system to enable the user to easily develop custom solutions.

In one embodiment, the user may provide information regarding the current configuration and software products (e.g., programs) present in the client system to the server for analysis. For example, the user can provide a snapshot of the configuration of the measurement system and the software programs (e.g., a LabVIEW VI) present in the system. The server may receive this information and execute software to make proposed suggestions to the user or actual modifications to the client system's configuration or programs. The modified configuration or programs may then be returned to the client system for use. This type of bi-directional analysis may be performed one or more times. Alternatively, the server may programmatically analyze a software product, such as a program (e.g., a graphical program), resident on a client system and make proposed changes (including additions) to the program based on requirements specified by the user.

Thus, in various embodiments, the present invention provides systems and methods whereby a user may specify a measurement task over a network, and various software products may be generated or modified which are usable to configure a measurement system to perform the measurement task. The software products may then be sent to the user for configuration on or deployment to the client system. Additionally, if the user does not have the required measurement hardware to perform the measurement task, the required hardware may be automatically sent to the user, and may even be pre-configured with the appropriate software products to perform the measurement task. Further, the user can provide information on the current configuration and software products present in the client system for analysis by the server and further modifications.

BRIEF DESCRIPTION OF THE DRAWINGS

A better understanding of the present invention can be obtained when the following detailed description of the preferred embodiment is considered in conjunction with the following drawings, in which:

FIGS. 4A–4D are block diagrams of reconfigurable instruments, according to various embodiments;

FIGS. 16A–16C illustrate embodiments of a configuration diagram for deploying software products in a system.

Figure 1:
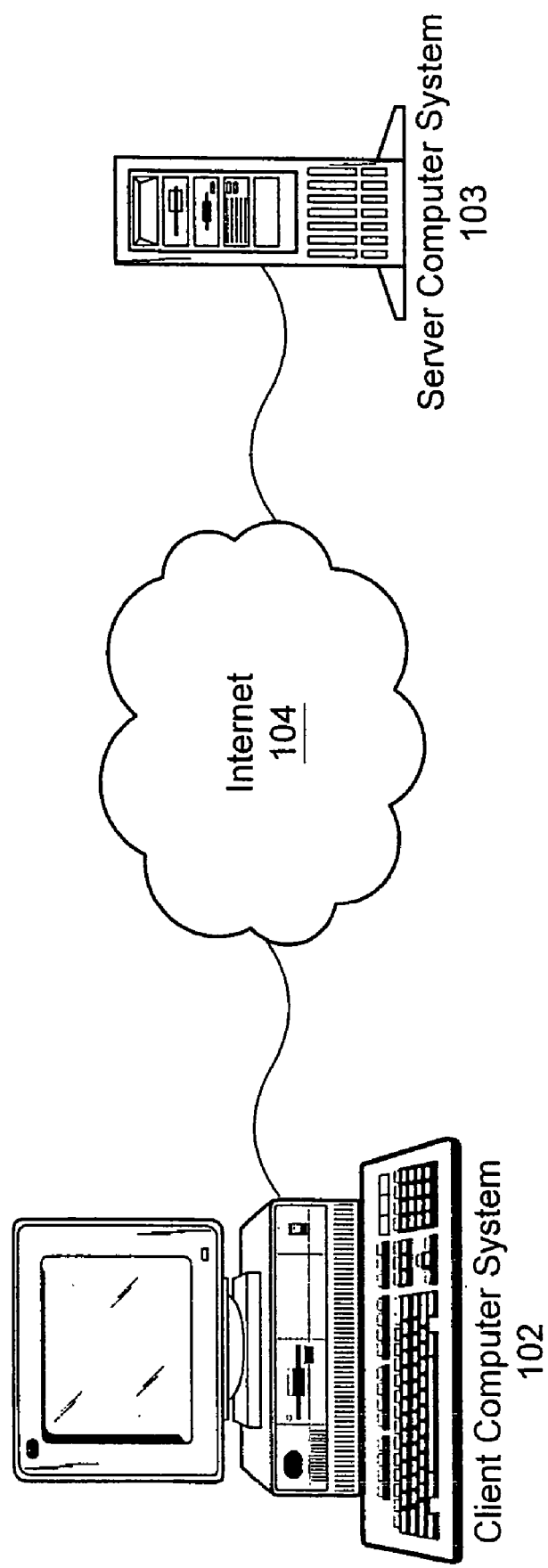
FIG. 1 illustrates a client/server system for configuration of a measurement system, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990;

U.S. Pat. No. 5,481,741 titled "Method and Apparatus for Providing Attribute Nodes in a Graphical Data Flow Environment";

U.S. Pat. No. 6,173,438 titled "Embedded Graphical Programming System" filed Aug. 18, 1997;

U.S. Pat. No. 6,219,628 titled "System and Method for Configuring an Instrument to Perform Measurement Functions Utilizing Conversion of Graphical Programs into Hardware Implementations," filed Aug. 18, 1997;

U.S. patent application Ser. No. 09/617,600 titled "Graphical Programming System with Distributed Block Diagram Execution and Front Panel Display," filed Jun. 13, 2000;

U.S. patent application Ser. No. 09/745,023 titled "System and Method for Programmatically Generating a Graphical Program in Response to Program Information," filed Dec. 20, 2000;

U.S. patent application Ser. No. 60/301,785 titled "Measurement System Software Architecture for Easily Creating High-Performance Measurement Applications," filed Jun. 29, 2001;

U.S. patent application Ser. No. 10/008,792 titled "Measurement System Software Architecture for Easily Creating High-Performance Measurement Applications," filed Nov. 13, 2001;

U.S. patent application Ser. No. 60/312,242 titled "System and Method for Graphically Creating, Deploying and Executing Programs in a Distributed System" filed Aug. 14, 2001;

U.S. patent application Ser. No. 10/058,150 titled "Reconfigurable Measurement System Utilizing a Programmable Hardware Element and Fixed Hardware Resources", filed on Oct. 29, 2001;

U.S. patent application Ser. No. 09/587,682 titled "System and Method for Automatically Generating a Graphical Program to Perform an Image Processing Algorithm" filed on Jun. 5, 2000; and U.S. application Ser. No. 10/101,508 titled "Network-based System for Configuring a Measurement System using Configuration Information Generated based on a User Specification" filed Mar. 19, 2002.

The LabVIEW graphical programming manuals, including the "G Programming Reference Manual", available from National Instruments Corporation, are also hereby incorporated by reference in their entirety.

FIG. 1—A Client/Server System

FIG. 1 illustrates a client/server system suitable for implementing various embodiments of the present invention. As FIG. 1 shows, a client computer system 102 may be coupled to a server computer system 103 through a network 104, such as the Internet. The client computer system 102 may include software, such as browser software, for accessing and communicating with the server computer system 103. Each of the client computer system 102 and server computer system 103 may include network interface devices and network ports for communicating on a network. The client computer system 102 may also be coupled to, or comprise, one or more devices, where the client computer system 102 and the one or more devices compose a system. In one embodiment, the device is a measurement device, and the client computer system 102 and the one or more measurement devices compose a measurement system. For example, the client computer system 102 may couple to any of the measurement devices shown in FIGS. 2A and 2B, among others.

As described below, the client computer system 102 and/or one or more devices coupled to the client computer system may be configurable by receiving one or more software products over a network in response to task information or requirements provided by the client computer system 102. In one embodiment, the client computer system 102 may be used for interfacing to the server 103 and used for configuring a device that is coupled to the network 104, but is not connected (or directly coupled) to the client computer system 102.

As used herein, the term "software product" includes one or more of the following: configuration information, one or more software programs, and/or one or more hardware configuration programs. Thus the term "software product" includes any of various types of programs or data that may be used to configure a computer system, device, or program.

As used herein, the term "device" is intended to include any of various types of devices that include one or more of: 1) a processor and memory; and/or 2) a programmable hardware element or reconfigurable logic. Exemplary types of processors include a conventional microprocessor or CPU (such as an X86, PowerPC, SunSparc, etc.), a digital signal processor (DSP), microcontroller, or other type of processor. Exemplary types of programmable hardware elements include a programmable logic device (PLD), e.g., an FPGA (field programmable gate array), or other types of reconfigurable logic.

Exemplary types of devices include computer systems, network devices, personal digital assistants (PDAs), television systems, multimedia devices, measurement devices, instruments, industrial automation devices, process control devices, smart data acquisition devices, smart sensors (including smart cameras), smart actuators, video devices (e.g., digital cameras, digital video cameras), audio devices, computer peripherals, telephones, appliances, or other processor-based or programmable hardware-based devices. Exemplary measurement and automation devices include any of the devices shown in FIGS. 2A and 2B. Exemplary network devices include network interface cards, routers, bridges, switches, hubs, etc. Exemplary measurement devices include camera, video cameras, sound devices, etc.

As used herein, the term "measurement device" is intended to include any of various types of devices which performs at least a portion of a measurement or automation function. The term "measurement device" includes any of the instruments or measurement devices shown in FIGS. 2A and 2B, as well as other measurement devices, such as smart sensors (including smart cameras), sensors, transducers, etc. A "measurement device" may comprise a client computer system which executes measurement software. The client computer system may also couple to one or more other measurement devices, e.g., an internal measurement device (e.g., configured as a plug-in card), or external measurement devices.

The terms "reconfigurable measurement device", "smart measurement device" or "reconfigurable instrument" may be used to refer to a "measurement device" as described above. For more information on a reconfigurable measurement device or reconfigurable instrument which includes a processor and memory, please see U.S. Pat. No. 6,173,438 which was incorporated by reference above. For more information on a reconfigurable measurement device or reconfigurable instrument which includes a programmable hardware element or reconfigurable hardware, e.g., an FPGA, please see U.S. Pat. No. 6,219,628 which was incorporated by reference above.

As used herein, the term "programmable hardware element" is intended to include various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware.

As used herein, the term "program" is intended to include: 1) a software program, or 2) a hardware configuration program, useable for configuring a programmable hardware element or reconfigurable logic. A "software program" may be any type of code and/or data that may be stored in a memory medium and executed by a processor. Exemplary software programs include programs written in text-based programming languages, such as C, C++, Pascal, FORTRAN, Cobol, Java, etc.; programs written in assembly language; programs written in graphical programming languages; programs that have been compiled to machine language; scripts; and other types of executable software. Exemplary "hardware configuration programs" include netlists and bit files for programmable hardware elements such as FPGAs and other reconfigurable hardware.

As used herein, the term "configuration information" may include configuration data, such as hardware configuration settings or parameters, help files, documentation, etc. Configuration data is typically used to configure one or more devices for desired operation.

As used herein, the term "graphical program" or "block diagram" is intended to include a program comprising graphical code. The term "graphical code" refers to two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A graphical program may also comprise a user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output that will be used by the graphical program or VI (virtual instrument), and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. In some embodiments the user interface or front panel of a graphical program may enable the user to interactively control or manipulate the input being provided to the graphical program during program execution.

Examples of graphical program development environments that may be used to create graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Khoros from Khoral Research, SnapMaster from HEM Data, VisSim from Visual Solutions, ObjectBench by SES (Scientific and Engineering Software), and VisiDAQ from Advantech, among others. In the preferred embodiment, the system uses the LabVIEW graphical programming system available from National Instruments.

A program for performing an instrumentation, measurement, automation or simulation function, such as measuring phenomena of a Unit Under Test (UUT) or device, controlling or modeling instruments, controlling or measuring a system or process, or for designing, modeling or simulating devices, may be referred to as a virtual instrument (VI).

Figure 2A:
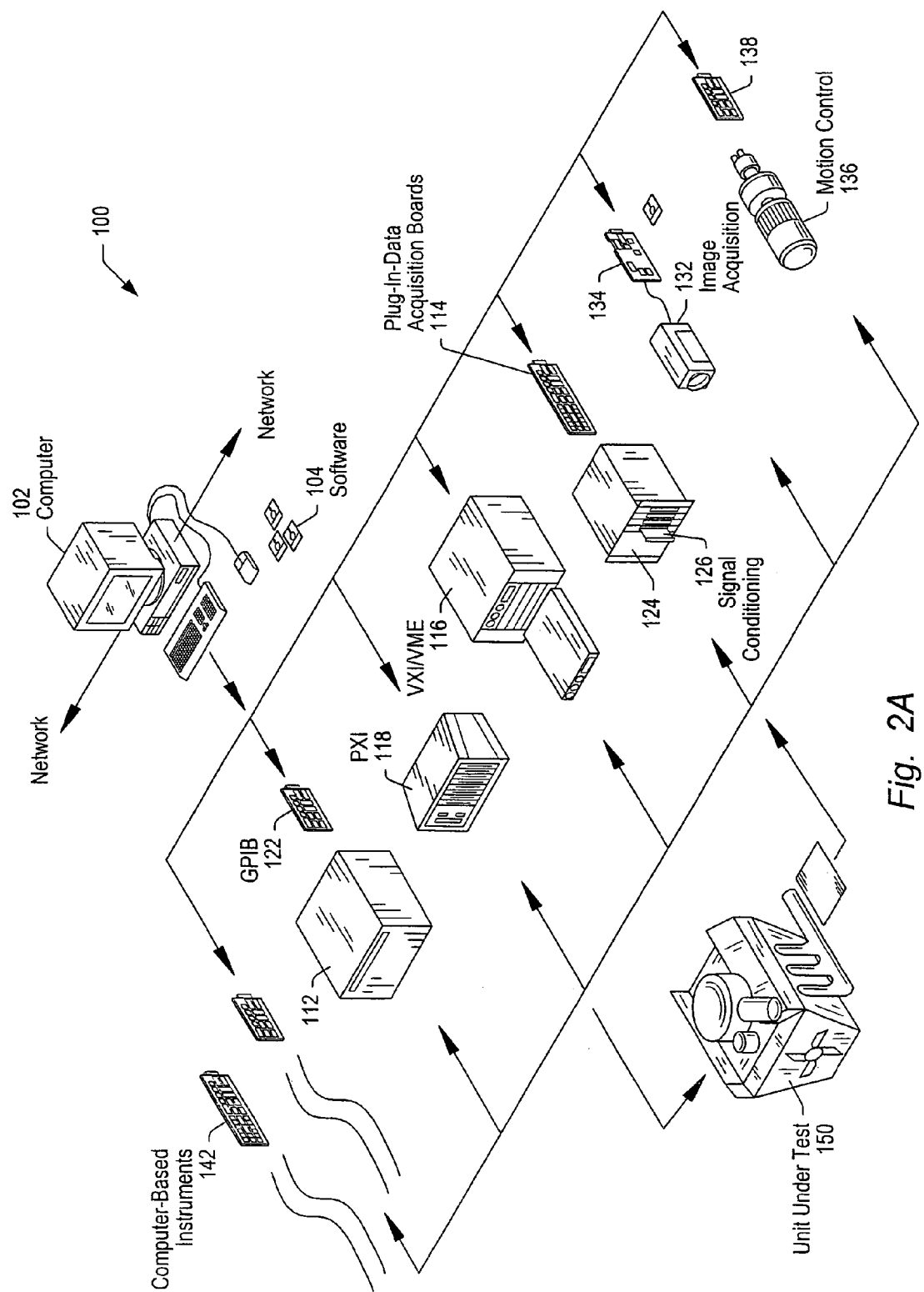
FIGS. 2A–2C illustrate representative instrumentation and process control systems including various I/O interface options.
Figure 2B:
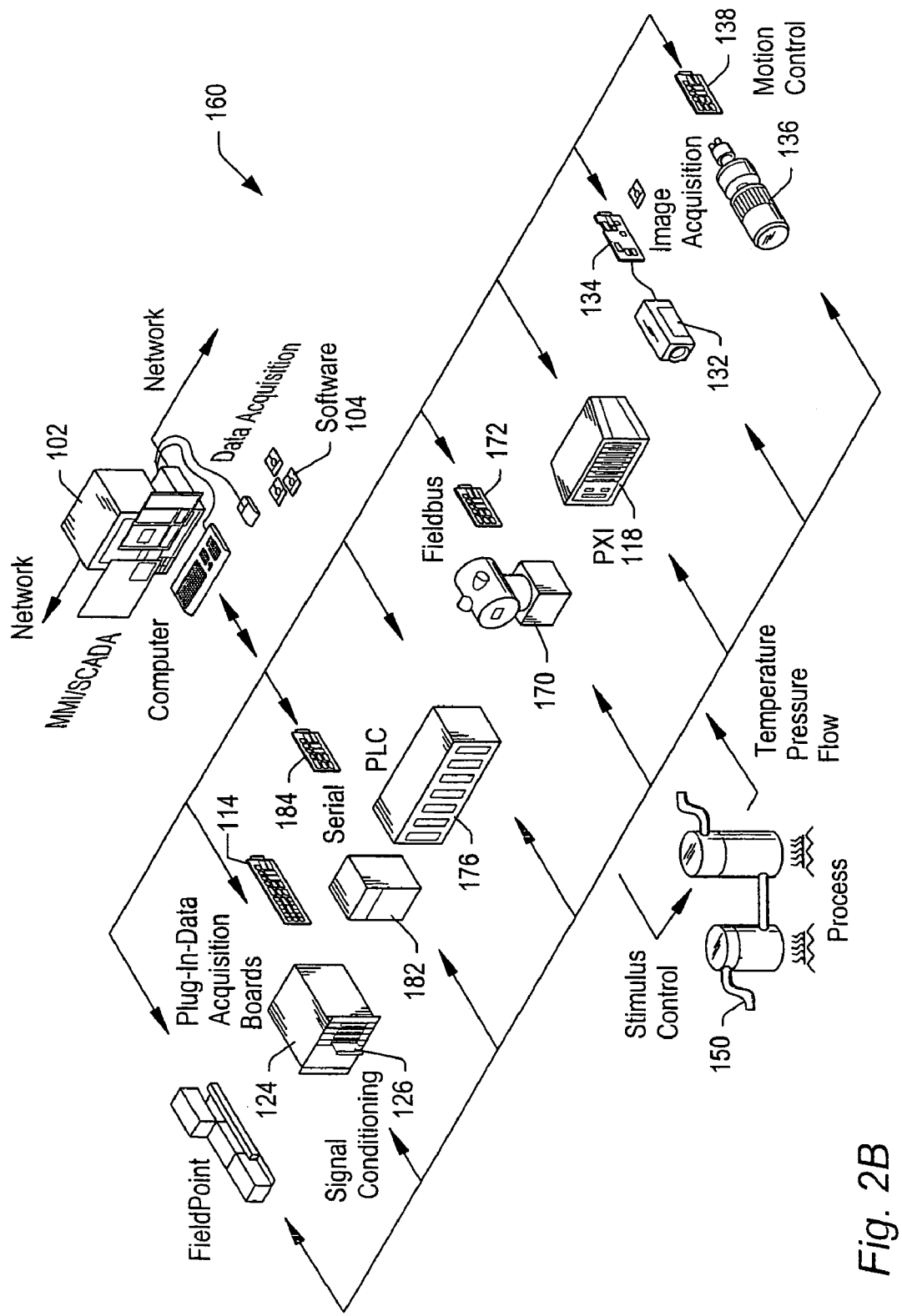
Figure 2C:
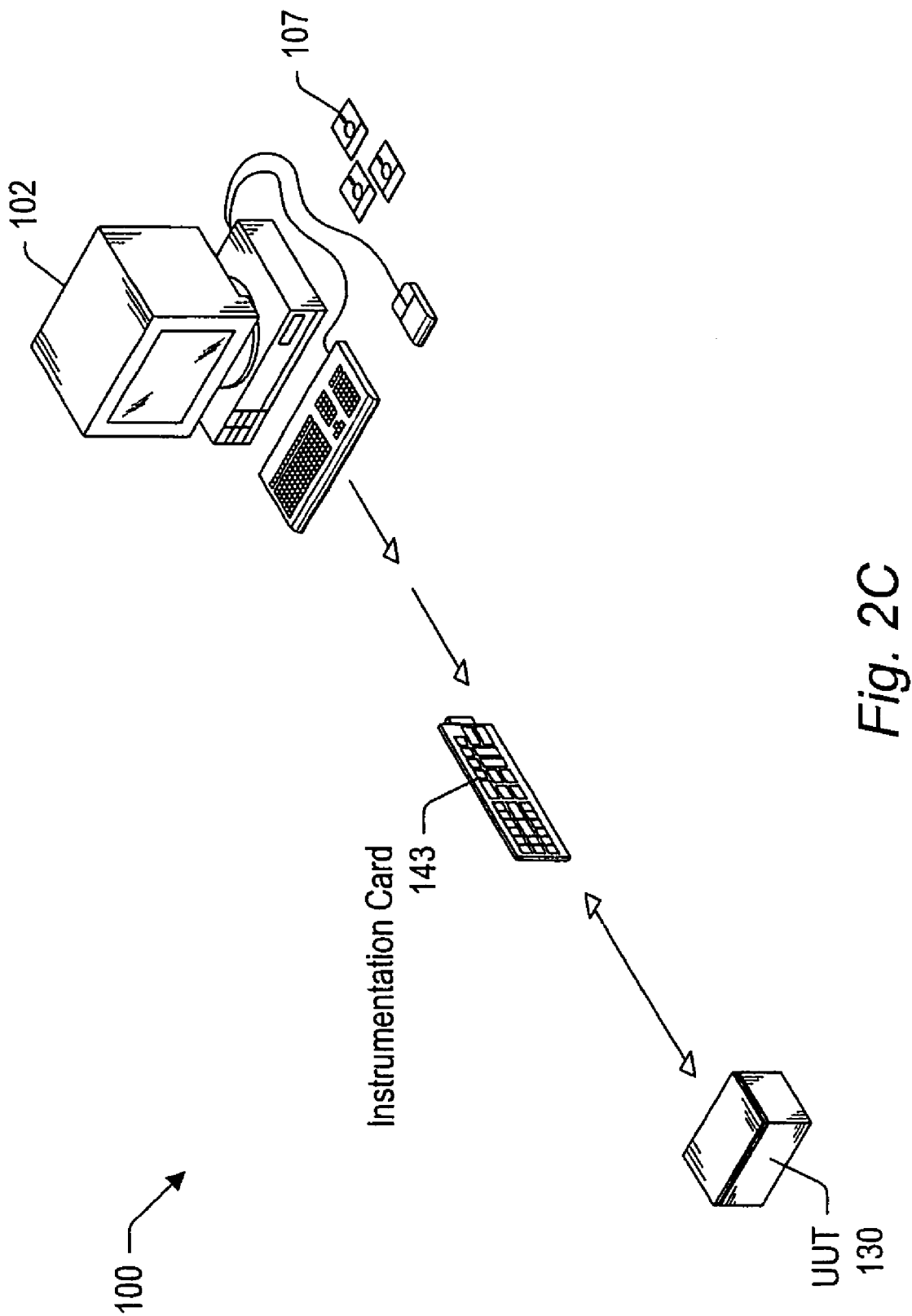

FIGS. 2A–2C—Instrumentation and Industrial Automation Systems

FIGS. 2A–2C illustrate exemplary measurement and automation systems. As used herein, the term "measurement system" is intended to include the types of measurement systems and automation systems shown in FIGS. 2A, 2B and 2C, as well as other types of systems. For example, although not shown in FIGS. 2A–2C, a measurement system may comprise one or more traditional "box" instruments, such as those available from Agilent or Tektronix, which may couple to a computer system or which include a processor, memory and display capabilities, preferably including web browser capabilities.

The measurement systems shown in FIGS. 2A–2C may be operable to receive and be configured by configuration information. The measurement systems shown in FIGS. 2A–2C may be operable to receive and execute programs, e.g., software programs and/or hardware configuration programs, according to one embodiment of the invention. In accordance with one embodiment of the invention, the present system and method allows users to more easily configure and/or program their measurement systems. For example, a user can specify one or more of measurement, control, simulation, and automation tasks (collectively referred to as "measurement tasks") and provide this specification to a server computer system. The server can then determine (e.g., programmatically create) software products, such as configuration information or programs, and provides these software products to the measurement system to configure the measurement system to implement desired tasks.

As used herein, the term "measurement system" is intended to include an instrumentation system such as that shown in FIGS. 2A and 2C, an industrial automation system such as that shown in FIG. 2B, or a modeling or simulation system involved with the design, validation or testing of a product involving "real world I/O", i.e., the acquisition or generation of data to/from a model or simulation of a device or product being designed, validated or tested, such as hardware-in-the loop simulation and rapid control prototyping. The term "measurement" may include one or more of instrumentation, measurement, data acquisition, automation, control, and simulation, including hardware-in-the-loop simulation and rapid control prototyping.

FIG. 2A illustrates an exemplary measurement system or instrumentation system 100. The system 100 may comprise a host computer 102 which connects to one or more measurement devices or instruments. The host computer 102 may comprise a CPU, a display, memory, and one or more input devices such as a mouse or keyboard, as shown. The host computer 102 connects through the one or more instruments to analyze, measure, or control a unit under test (UUT) or process 150.

The host computer 102 may execute a program which interacts with or controls the one or more instruments. The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition card 134, a motion control device 136 and associated motion control interface card 138, and/or one or more computer based instrument cards 142 and 143, including reconfigurable instruments, among other types of devices. Various examples of reconfigurable instruments or measurement devices are described below with reference to FIGS. 4A–4D.

The GPIB instrument 112 may be coupled to the computer 102 via the GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 may comprise an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 may be coupled to the computer 102 via a VXI bus, MXI bus, or other serial or parallel bus provided by the computer 102. The computer 102 may include VXI interface logic, such as a VXI, MXI or GPIB interface card (not shown), which interfaces to the VXI chassis 116. The PXI chassis or instrument may be coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

In addition to the above measurement devices, other types of measurement devices include smart sensors (including smart cameras).

In typical instrumentation systems an instrument of each interface type may not be present, and in fact many systems may only have one or more instruments of a single interface type, such as only GPIB instruments. The instruments are coupled to the unit under test (UUT) or process 150, or are coupled to receive field signals, typically generated by transducers. The system 100 may be used in a data acquisition and control application, in a test and measurement application, a process control application, a man-machine interface application, or a simulation application.

FIG. 2B illustrates an exemplary industrial automation system 160. The industrial automation system 160 may be similar to the instrumentation or test and measurement system 100 shown in FIG. 2A. Elements which are similar or identical to elements in FIG. 2A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 2B, the computer 102 may execute a program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, as well as a reconfigurable instrument, describe above, among other types of devices. As mentioned above, various examples of reconfigurable instruments or measurement devices are described below with reference to FIGS. 4A–4D.

The DAQ card 114, the PXI chassis 118, the video device 132, and the image acquisition card 136 may be connected to the computer 102 as described above. The serial instrument 182 may be coupled to the computer 102 through a serial interface card 184, or through a serial port, such as an RS-232 port, provided by the computer 102. The PLC 176 may couple to the computer 102 through a serial port, Ethernet port, or a proprietary interface. The fieldbus interface card 172 may be comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes.

In typical industrial automation systems a device will not be present of each interface type, and in fact many systems may only have one or more devices of a single interface type, such as only PLCs. The devices are coupled to the device or process 150.

FIG. 2C illustrates one embodiment of a measurement system in which the computer system 102 couples to an instrumentation card or measurement device 143. In one embodiment, the measurement device 143 may be programmed or configured to operate as any of a variety of measurement devices or instruments.

As described above, the term "measurement device" or "reconfigurable instrument" may refer to a device with a processor, e.g., a CPU, coupled to a memory, which is operable to store and execute one or more software programs to perform a measurement task. By executing different measurement application programs, the device may operate as a variety of different measurement devices. The term "measurement device" or "reconfigurable instrument" may also refer to a device which comprises a programmable hardware element (also called reconfigurable hardware), such as a Field Programmable Gate Array (FPGA), which may be (re)programmed with a hardware configuration program, such as a bit file generated from a netlist or hardware description, to function as any of a variety of measurement devices. A measurement device or reconfigurable instrument may also refer to a device which includes combinations of one or more processors, one or more programmable hardware elements, or various combinations, such as multiple FPGAs, multiple CPU/memory elements, and/or combinations of both FPGA and CPU/memory elements.

As FIG. 2C also shows, the instrumentation card 143 may be operable to couple to a Unit Under Test (UUT) 130. Thus, the computer system 102 and the instrumentation card 143 may compose a measurement system which is operable to measure one or more attributes of the UUT to analyze or characterize the UUT.

For illustration purposes, the instrumentation card 143 is shown outside the computer 102. However, the instrumentation card 143 may be located within the chassis of the computer 102. For example, one or more instrumentation cards 143 may be coupled to the computer 102 by one or more I/O slots (not shown) provided by the computer 102 and to the UUT 130 (and/or to receive field signals) through one or more sensors or transducers (also not shown). The computer 102 may connect through the one or more instrumentation cards 143 to analyze, measure or control a unit under test (UUT) or process under test 130.

In another embodiment, one or more instrumentation cards 143 may be comprised in a separate chassis and coupled to the computer 102. For example, the one or more instrumentation cards 143 may be comprised in a PXI chassis, a VXI chassis or other similar form factor. The computer 102 may also be comprised in a PXI chassis or VXI chassis.

The system 100 may be used in a data acquisition and control application, in a test and/or measurement application, an automation application, a process control application, a man-machine interface application, or a simulation application, including a hardware-in-the-loop simulation application or a rapid control prototyping application, among others.

The computer system 102 and/or one or more of the instruments or devices (e.g., reconfigurable instruments) may include a memory medium (or memory mediums) on which data and software according to the present invention may be stored. The client computer system memory medium may store (for execution by the CPU) a web browser for accessing other computers on the Internet, and configuration information and/or programs received from a server computer system 103, as well as other types of software. The client computer system memory medium may store a configuration program. An exemplary configuration program for measurement applications is Measurement & Automation Explorer (MAX) from National Instruments Corporation.

The server computer system 103 may comprise a CPU and a memory medium. The server memory medium may store software (for execution by the CPU) for determining software products (configuration information, software programs, and/or hardware configuration programs) in response to requirement information received from a client computer system, and for providing determined software products to the client computer system. The server memory medium may store web server software for hosting a web site that is accessible by the client computer system. The server memory medium may also store electronic commerce software for conducting electronic commerce with the client computer system (e.g., receiving payment from the client computer system).

Either of the client or server memory mediums may store task specification software (e.g., a measurement task specifier) for enabling a user to specify requirements or a specification of a task. Either of the client or server memory mediums may also store a program for generating a configuration diagram that graphically illustrates the measurement system in which the client computer system 102 is a part.

The software comprised in the server for determining software products may comprise measurement task specification software including an expert system which may include a plurality of experts. In one embodiment, the measurement task specification software may be operable to receive user input specifying a measurement task and to generate a measurement task specification. The expert system may be operable to analyze the measurement task specification and determine one or more hardware and/or software implementations to perform the specified measurement task. In one embodiment, the server computer system 103 may also store a runtime builder and a plurality of measurement primitives, described below. Additionally, the server memory medium(s) may store various software products produced by or with these software components, such as a measurement task specification, various types of programs, including software programs, e.g., graphical programs, hardware configuration programs (e.g., bit files), configuration information for software and/or hardware, etc. In one embodiment, the server computer system 103 may also generate or include a runtime specification, and a runtime, described in more detail below. More information on an embodiment of the software product determination software may be found in U.S. patent application Ser. No. 10/008,792 titled "Measurement System Software Architecture for Easily Creating High-Performance Measurement Applications," filed Nov. 13, 2001.

In some embodiments, the server computer system 103 may comprise a plurality of interconnected server computers. For example, one server computer may be used to interface with client computer systems over the network, such as the computer system 102, while another server computer may be used to store and manage a database. In addition, one server computer may be used to interface with client computer systems over the network (and possibly store programs for downloading to client computer systems), and other servers may also store programs useable for downloading to client computer systems. A separate server may also operate as an e-commerce server for requesting and receiving payment information The term "memory medium" is intended to include an installation medium, e.g., a CD-ROM, floppy disks 104, or tape device; a computer system memory or random access memory such as DRAM, SRAM, EDO RAM, RRAM, etc.; or a non-volatile memory such as a magnetic media, e.g., a hard drive, or optical storage. The memory medium may comprise other types of memory as well, or combinations thereof. In addition, the memory medium may be located in a first computer in which software programs are stored and/or executed, or may be located in a second different computer which connects to the first computer over a network, such as the Internet. In the latter instance, the second computer provides the program instructions to the first computer for execution.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

In one embodiment, the programs and methods as described herein may be designed for measurement systems, including data acquisition/generation, analysis, and/or display; automation systems; simulation systems; systems for controlling, modeling, or simulating instrumentation or industrial automation hardware; and systems for controlling, modeling or simulating systems or devices being designed, prototyped, validated or tested, including hardware-in-the-loop systems and rapid control prototyping systems. However, it is noted that the present invention can be used for a plethora of applications and is not limited to measurement or industrial automation applications. In other words, FIGS. 2A–2C and the embodiments described below are exemplary only, and the programs and methods may be used for any of various purposes and may be stored in and execute on any of various types of systems to perform any of various applications. For example, embodiments of the present invention may be used to purchase or distribute programs for any general purpose application. Thus the methods described herein provide an e-commerce model for selling or distributing programs, such as software programs, in any of various fields, particularly fields that require custom program generation.

Figure 3:
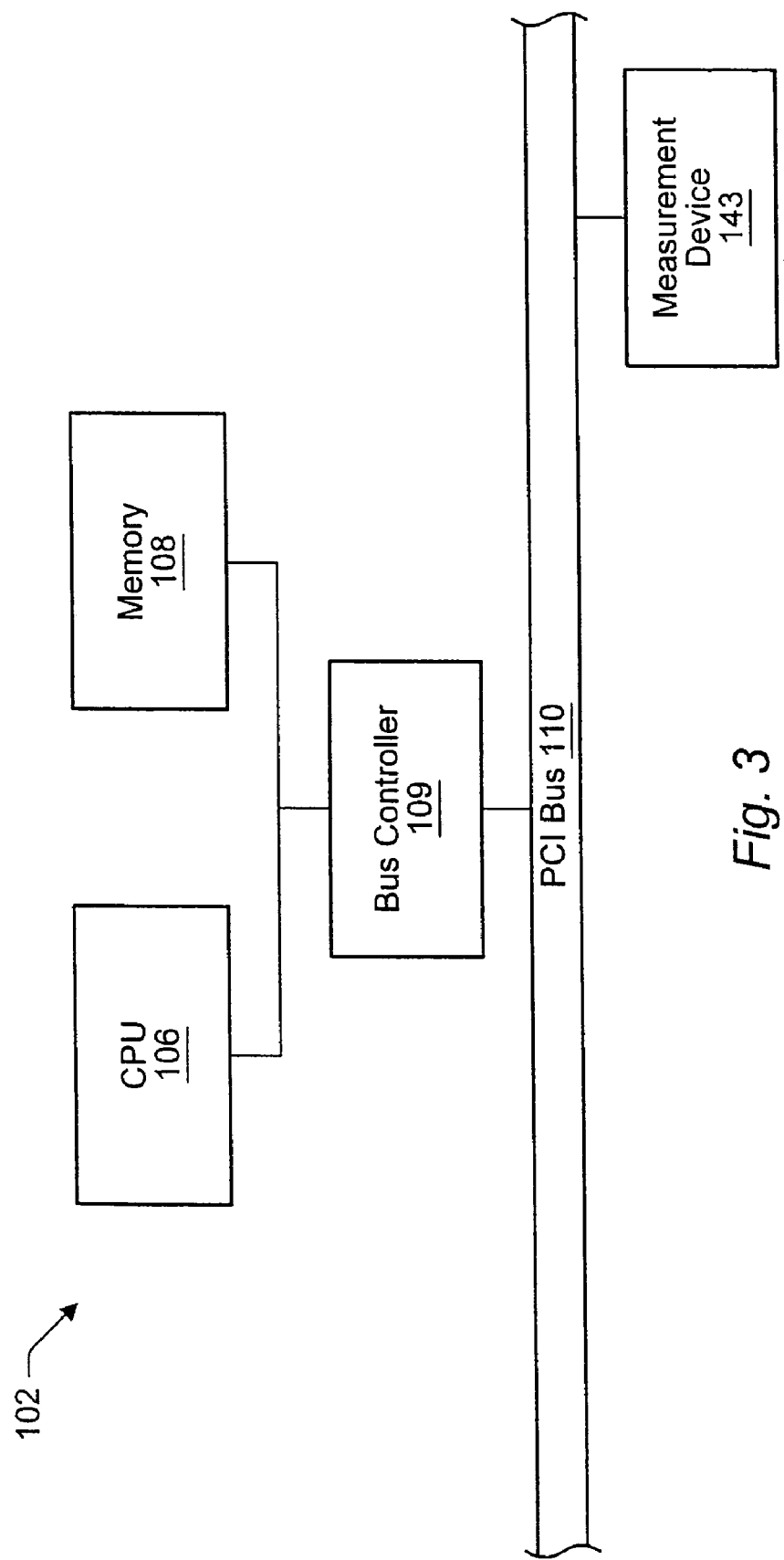
FIG. 3 is a block diagram of the client computer system of FIGS. 1, 2A, 2B, and 2C, according to one embodiment.

FIG. 3—Client Computer System Block Diagram

FIG. 3 is an exemplary block diagram of the client computer system illustrated in FIGS. 1, 2A, 2B, and 2C. It is noted that any type of computer system configuration or architecture can be used in conjunction with the system and method described herein, as desired, and FIG. 3 illustrates a representative PC embodiment. It is also noted that the computer system may be a general purpose computer system such as illustrated in FIGS. 2A and 2B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 106 which is coupled to a memory 108 and a bus controller 109. The CPU 106 may be any of various types, including an x86 processor, e.g., a Pentium class, a PowerPC processor, a CPU from the SPARC family of RISC processors, as well as others. Memory 108 is also coupled to the bus controller 109. The memory 108 may store one or more computer programs or libraries according to one embodiment of the present invention. The memory 108 also stores operating system software, i.e., software for operation of the computer system, as is well known to those skilled in the art.

The bus controller 109 (or bus bridge logic) may be coupled to an expansion or input/output bus 110. The expansion bus 110 is preferably the PCI (Peripheral Component Interconnect) expansion bus, although other bus types can be used. The expansion bus 110 may include slots for various devices such as a measurement device or reconfigurable instrument 143, as well as other devices as desired.

The computer 102 may further comprise a video display subsystem 180 and hard drive 182 coupled to the expansion bus 170.

It is noted that although the measurement device shown is the reconfigurable instrument 143 of FIGS. 2A and 2C, the measurement device 143 could be any of the devices of FIGS. 2A and 2B, or any other measurement device as desired.

FIGS. 4A–4D—Block Diagrams of Reconfigurable Instruments

FIGS. 4A–4D are block diagrams of various exemplary embodiments of a reconfigurable instrument or reconfigurable measurement device. It is noted that the presented embodiments are for illustration purposes only, and are not intended to limit the type of reconfigurable device used in the present invention.

FIG. 4A—Reconfigurable Instrument with FPGA and Processor/Memory

FIG. 4A is a block diagram illustrating a device 143A, e.g., an interface card, configured with a programmable hardware element and a processor and memory according to one embodiment. It is noted that FIG. 4A is exemplary only, and the interface card or device 143A may have various architectures or forms, as desired. For example, the device may be internal or external to the computer 102, and may be connected to the computer through a network, such as the Internet. In various embodiments, the device illustrated in FIG. 4A may be one of the DAQ interface cards 142 or 143 shown in either of FIG. 2A or 2C, or may be the image acquisition device 134 shown in FIG. 2A or 2B. However, as noted above, the programmable hardware may be included on any of the various devices shown in FIG. 2A, 2B, or 2C, or on other devices, as desired. Also, the programmable hardware illustrated in FIG. 4A is an FPGA, but the device may include other types of programmable hardware instead or in addition to, such as a Complex Programmable Logic Device (CPLD) or other type of (re)configurable hardware.

As shown in FIG. 4A, the device 143A may include an I/O connector 202 which is operable to send/receive signals. In the embodiments of FIGS. 2A, 2B, and 2C, the I/O connector 202 presents analog and/or digital connections for receiving/providing analog or digital signals. The I/O connector 202 may be adapted for coupling to SCXI conditioning logic 124 and 126, or may be adapted to be coupled directly to a unit under test 130 or process or system 160.

The device 143A may also include data acquisition (DAQ) logic 204. As shown, the data acquisition logic 204 may comprise analog to digital (A/D) converters, digital to analog (D/A) converters, timer counters (TC) and signal conditioning (SC) logic as shown. The DAQ logic 204 may provide the data acquisition functionality of the DAQ card 143. In one embodiment, the DAQ logic 204 comprises 4 A/D converters, 4 D/A converters, 23 digital I/Os, a RTSI connector, and a TIO. This extra hardware is useful for signal processing and motion control applications. The programmable hardware element or FPGA 206 can access these resources directly, thereby enabling creation of very powerful measurement, DSP and control applications, among others.

The device 143A may include a programmable hardware element 206. In one embodiment, the programmable hardware 206 comprises a field programmable gate array (FPGA) such as those available from Xilinx, Altera, etc. The programmable hardware element 206 may be coupled to the DAQ logic 204 and may also be coupled to the local bus interface 208. Thus a program, e.g., a graphical program such as a National Instruments LabVIEW graphical program, or a text program, can be created on the computer 102, or on another computer in a networked system, and at least a portion of the program can be converted into a hardware implementation form (hardware configuration program) for execution in the FPGA 206. The portion of the program converted into a hardware implementation form is preferably a portion which requires fast and/or real-time execution. Note that although only one programmable hardware element (FPGA) 206 is shown, the programmable hardware 206 may include multiple FPGAs (or other programmable hardware elements) as well.

In the embodiment of FIG. 4A, the interface card 143A may further include a dedicated on-board processor 212 and memory 214. This enables a portion or all of a program, e.g., a graphical or text program, to be compiled into machine language for storage in the memory 214 and execution by the processor 212. This may be in addition to a portion of the program being converted into a hardware implementation form in the FPGA 206. Thus, in one embodiment, after a program has been created, a portion of the program may be compiled for execution on the embedded processor 212 and executed locally on the interface card 143A via the processor 212 and memory 214, and a second portion of the program may be translated or converted into a hardware configuration program and deployed to the FPGA 206 for hardware implementation.

As one example, a first portion of a block diagram of a graphical program (that requires real time or fast execution) may be converted into a hardware executable format and downloaded to the FPGA 206 for hardware implementation, and a second portion of the block diagram (that may not require real time performance) may be stored in the memory 214 as program instructions and executed by the processor 212, in either a compiled or interpreted manner. As another example, a portion or all of the block diagram portion of the graphical program may be converted into a hardware executable format and downloaded to the FPGA 206 for hardware implementation, and a user interface portion (or front panel portion) of the graphical program may be stored in the memory 214 as program instructions and executed by the processor 212, in either a compiled or interpreted manner. Thus the portion of the graphical program which requires the most real time or deterministic performance may be executed directly in hardware for fast operation, and other parts of the block diagram, i.e., the user interface portion, which may not require real time performance, may execute on the processor 212. Where the processor executes the user interface portion, the processor may then send resulting signals to the video subsystem for display of the user interface on the computer display.

As shown, the device 143A may further include bus interface logic 216 and a control/data bus 218. In one embodiment, the interface card 143A is a PCI bus-compliant interface card adapted for coupling to the PCI bus of the host computer 102, or adapted for coupling to a PXI (PCI extensions for Instrumentation) bus. The bus interface logic 216 and the control/data bus 218 thus present a PCI or PXI interface.

The device 143A may also include local bus interface logic 208. In one embodiment, the local bus interface logic 208 may present a RTSI (Real Time System Integration) bus for routing timing and trigger signals between the interface card 143A and one or more other devices or cards.

In one embodiment, the device 143A also includes a non-volatile memory 288 coupled to the programmable hardware element 206. The non-volatile memory 288 may be operable to store software programs that are to be executed by the processor and memory 212 and 214. The non-volatile memory 288 may also be operable to store a hardware configuration program (or hardware description) received from the host computer system to enable configuration or deployment of the hardware configuration program in the programmable hardware element 206.

Figure 4B:
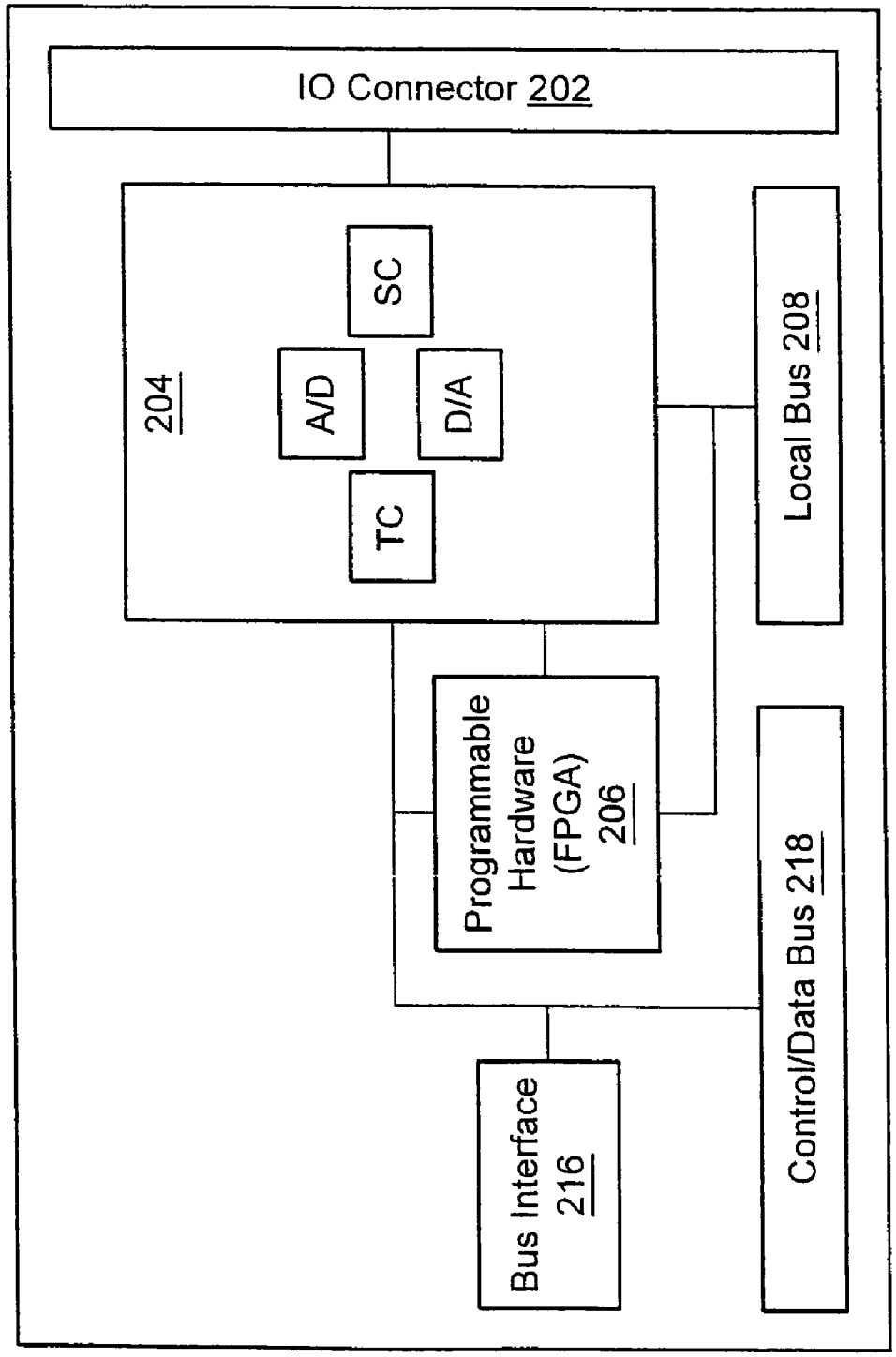

FIG. 4B—Reconfigurable Instrument with FPGA

In the embodiment of FIG. 4B, the processor 212 and memory 214 are not included on the device 143B. Thus the device 143B includes a programmable hardware element, but does not include a processor or memory. Thus a task specification or program (or program portion) may be converted into a hardware configuration program (such as via a netlist) and uploaded to the FPGA 206. Thus in the embodiment of FIG. 4B, any supervisory control portion of the task or program which is necessary or desired to execute on a programmable processor in software may be executed by the host CPU in the computer system 102, and not executed locally by a processor on the device 143B. In one embodiment, the device 143B may include a non-volatile memory (not shown) coupled to the programmable hardware element 206. As described above, the non-volatile memory may be operable to store the hardware configuration program received from the host computer system for deployment to the programmable hardware element 206, e.g., prior to or during booting of the computer system 102.

Figure 4C:
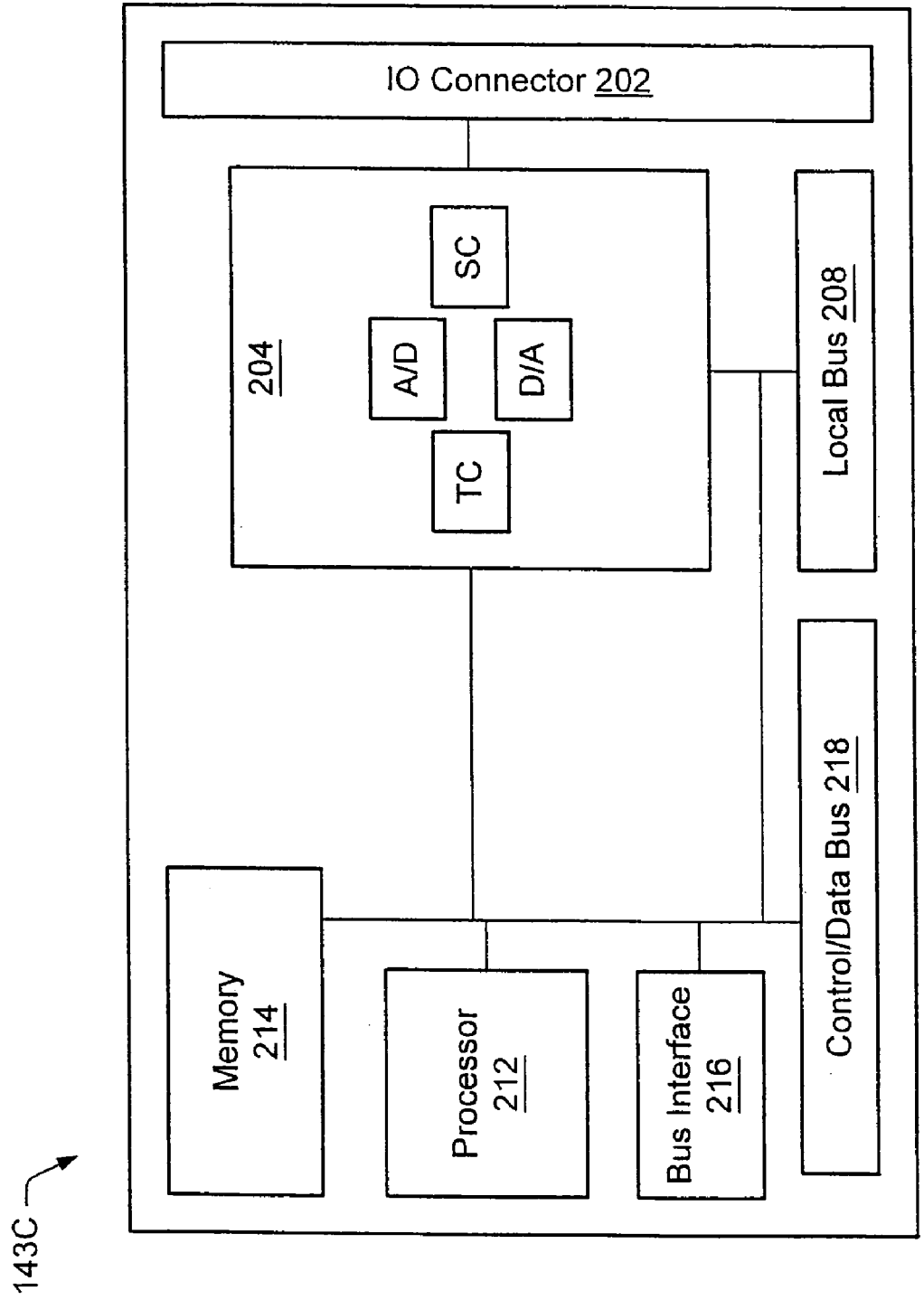

FIG. 4C—Reconfigurable Instrument with Processor and Memory

In the embodiment of FIG. 4C, the processor 212 and the memory 214 are included on the device 143C, but the FPGA 206 is not included. Thus, in the embodiment of FIG. 4C, a portion of a program, e.g., a portion of a block diagram of a graphical program, may be stored in the memory 214 as program instructions and executed by the processor 212, in either a compiled or interpreted manner. As one example, the memory 214 may store a real time operating system for executing programs. The memory 214 may also store a graphical program execution engine for executing graphical programs. Thus, as one example, a measurement program that may require real time performance may be stored in the memory 214 as program instructions and executed by the processor 212, under the control of a RTOS, to perform a particular measurement task. In this manner, the device 143C may operate as any of a number of measurement instruments, albeit with performance somewhat below what may be possible with an FPGA or other programmable hardware.

Figure 4D:
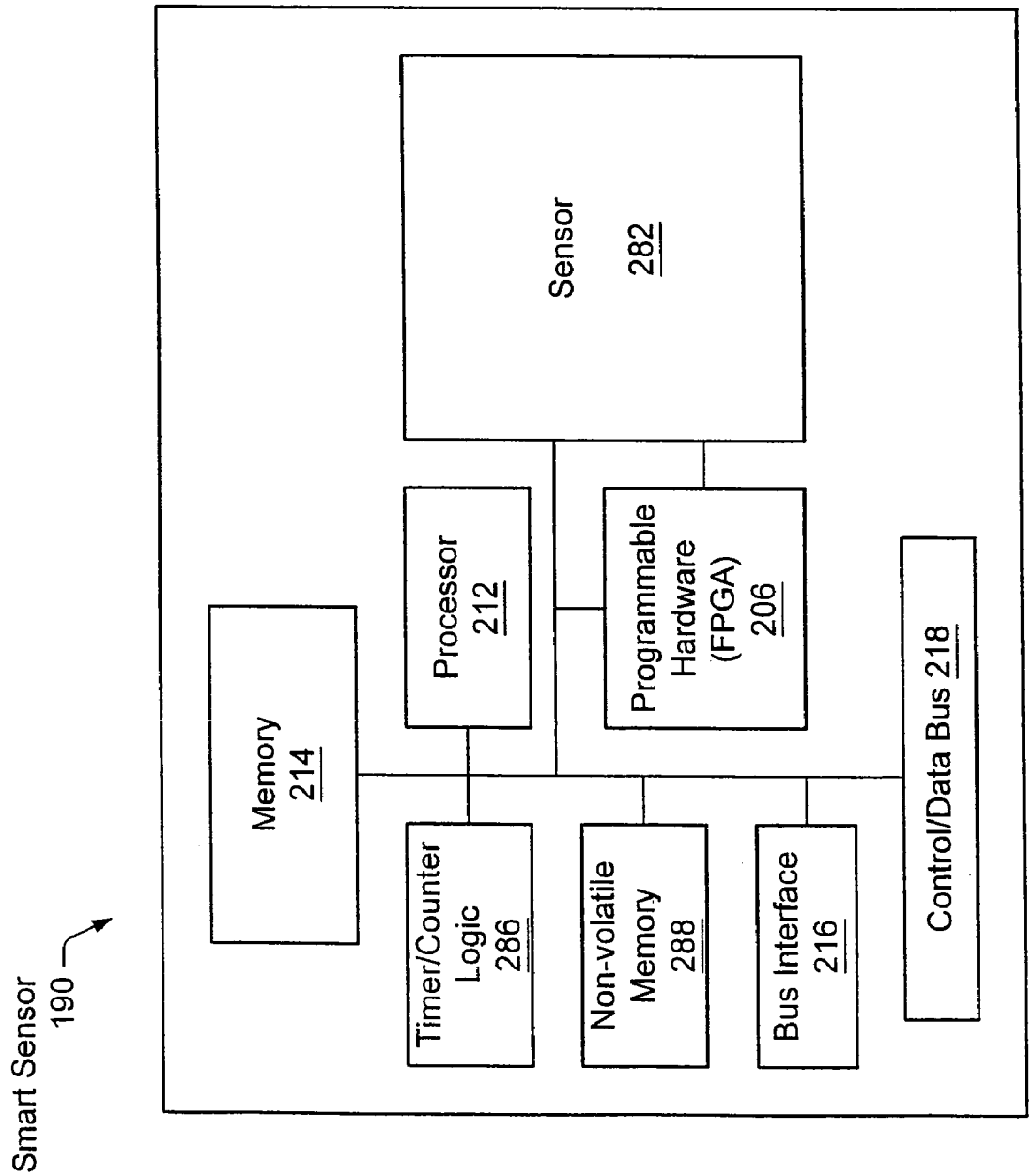

FIG. 4D—Smart Sensor With FPGA and Processor/Memory

FIG. 4D illustrates a block diagram of a smart sensor 190. As shown, the smart sensor 190 may include a programmable hardware element (programmable or reconfigurable hardware) 206 according to an embodiment of the present invention, e.g., an FPGA. The smart sensor 190 may also include a processor 212 and memory 214.

The programmable hardware element 206 in the smart sensor 190 may be configured with a hardware configuration program that implements a measurement function, e.g., an image processing function. The smart sensor 190 may also comprise a sensor 282 coupled to the programmable hardware element 206. The smart sensor 190 may also include a memory (a memory medium) 214 coupled to the sensor that stores acquired data, e.g., an acquired image. The memory 214 may be designed to store a portion of an image, a whole image, or two or more images. The memory 214 may include a memory controller (not shown). If the smart sensor 190 includes an analog sensor, the smart sensor 190 may further include analog to digital (A/D) logic (not shown) for converting analog signals into digital signals, e.g., image signals into a digital image, for storage in the memory. The smart sensor 190 may also optionally include timer/counter logic 286 that may perform timing/counting operations, e.g., during operation of the programmable hardware element. The smart sensor 190 may also optionally include a non-volatile memory 288 which may be operable to store one or more programs, e.g., software programs or hardware configuration programs, received from the host computer system.

As noted above, the smart sensor 190 may include a processor 212 (or multiple processors 212) coupled to memory 214 and the sensor 282. As described above with reference to FIG. 4A, the processor 212 may be operable to execute a portion or all of a program that implements a measurement function. For example, the processor 212 may execute a program (which may require real time performance) to interface with the sensor 282 and/or control smart sensor functionality.

In one embodiment, the smart sensor 190 may not include the processor 212, but rather may only include the FPGA 206 (or multiple FPGAs) as the functional unit. In another embodiment, the smart sensor 190 may not include the FPGA 206, but may use just the one or more processors 212 for on-board processing. In other embodiments, the smart sensor 190 may include various combinations of both processors and FPGAs to perform smart sensor operations.

In one embodiment, the sensor 282 may comprise a camera, and the smart sensor 190 may comprise a smart camera. The camera may be digital or analog, and may be operable to generate any of a variety of images, including Infra-Red (IR), visible spectrum, Ultra-Violet (UV), or any other type of image.

Figure 5:
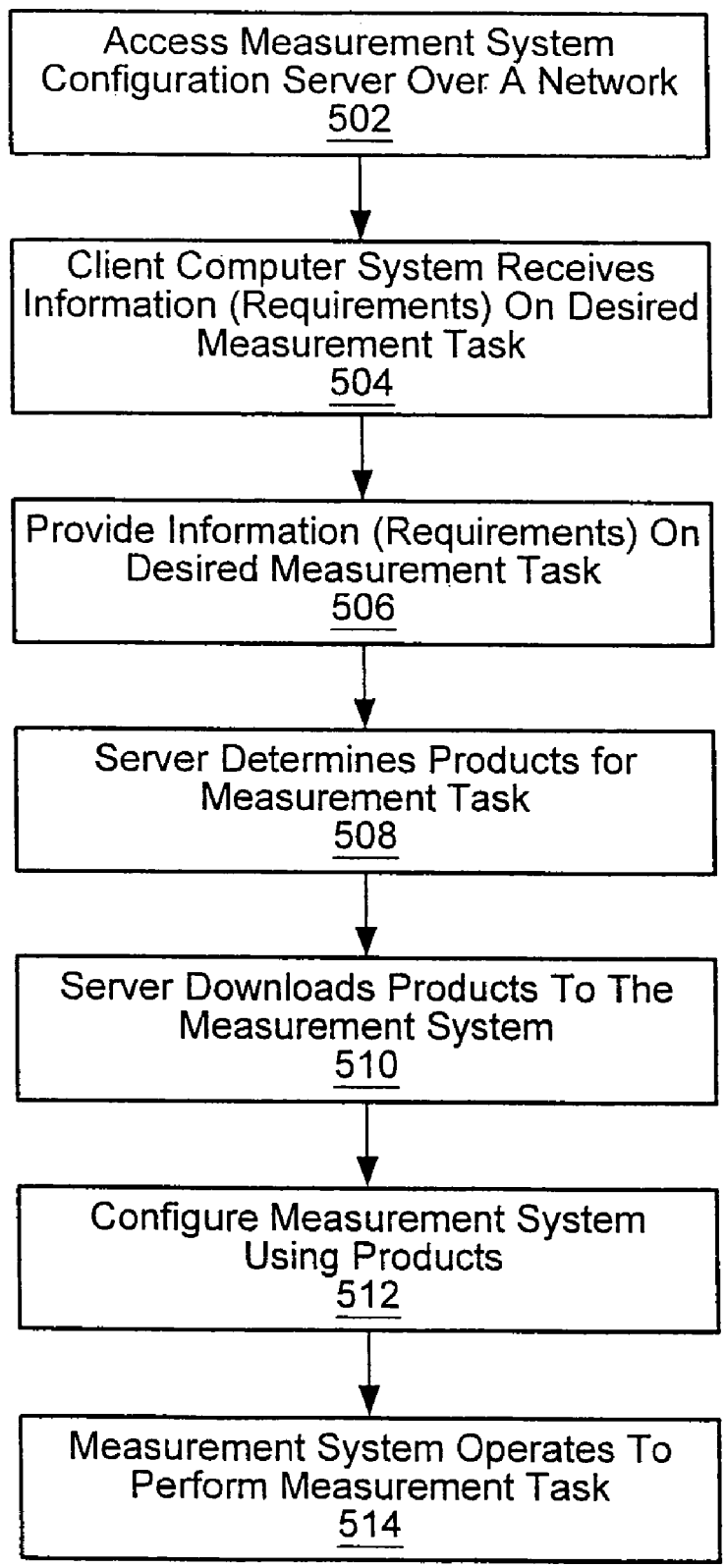
FIG. 5 is a flowchart diagram illustrating network-based specification, generation and deployment of software products according to one embodiment.
Figure 6A:
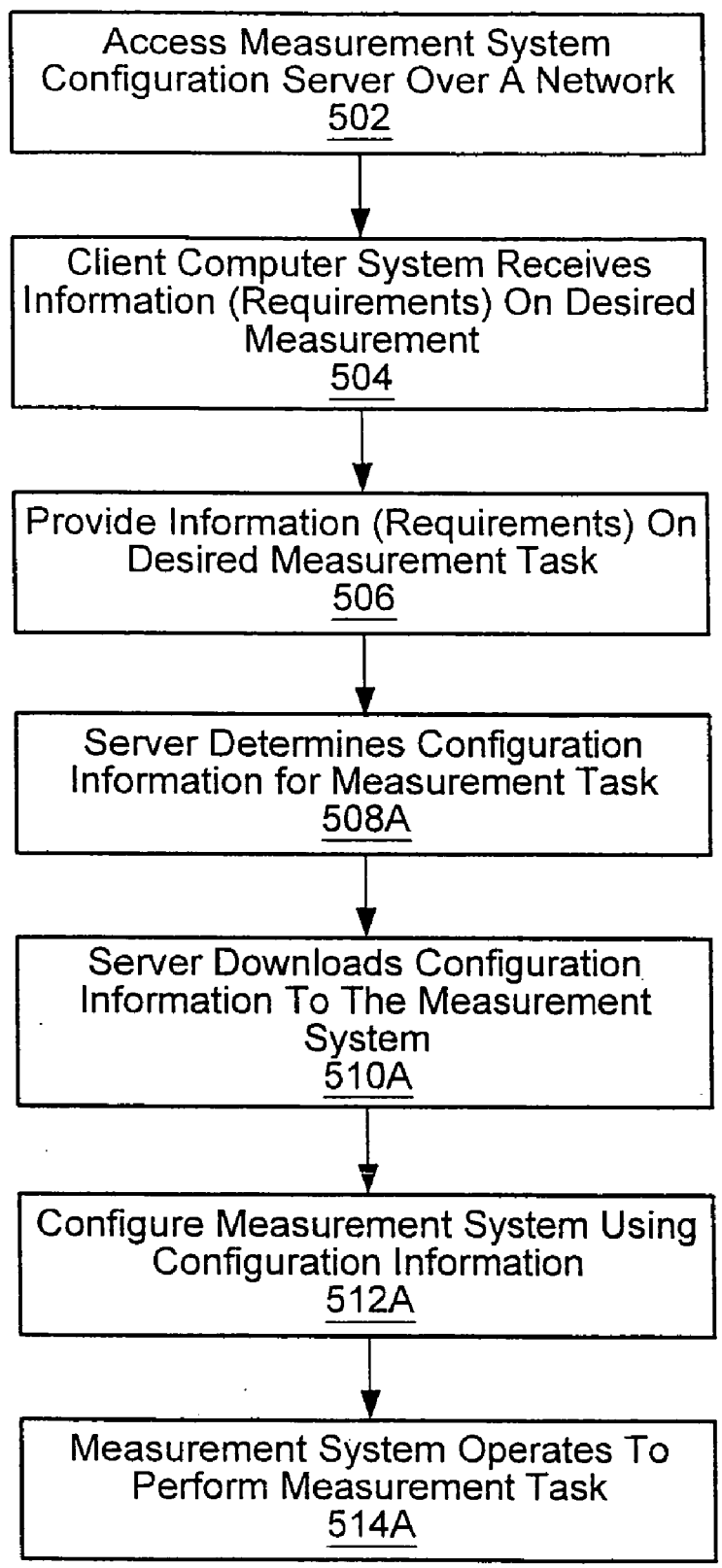
FIG. 6A is a flowchart diagram illustrating network-based specification, generation and deployment of configuration information according to one embodiment.
Figure 6B:
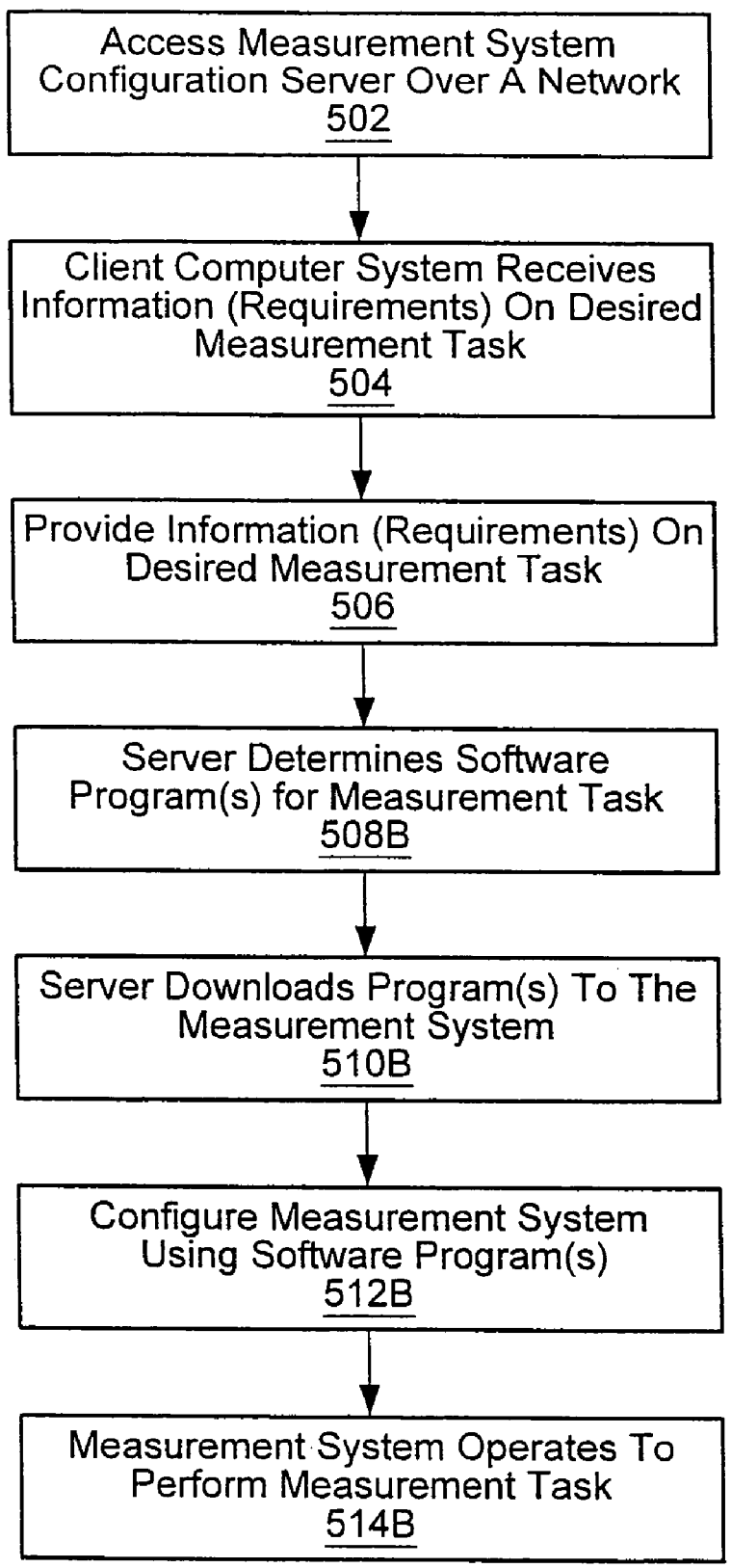
FIG. 6B is a flowchart diagram illustrating network-based specification, generation and deployment of software programs according to one embodiment.
Figure 6C:
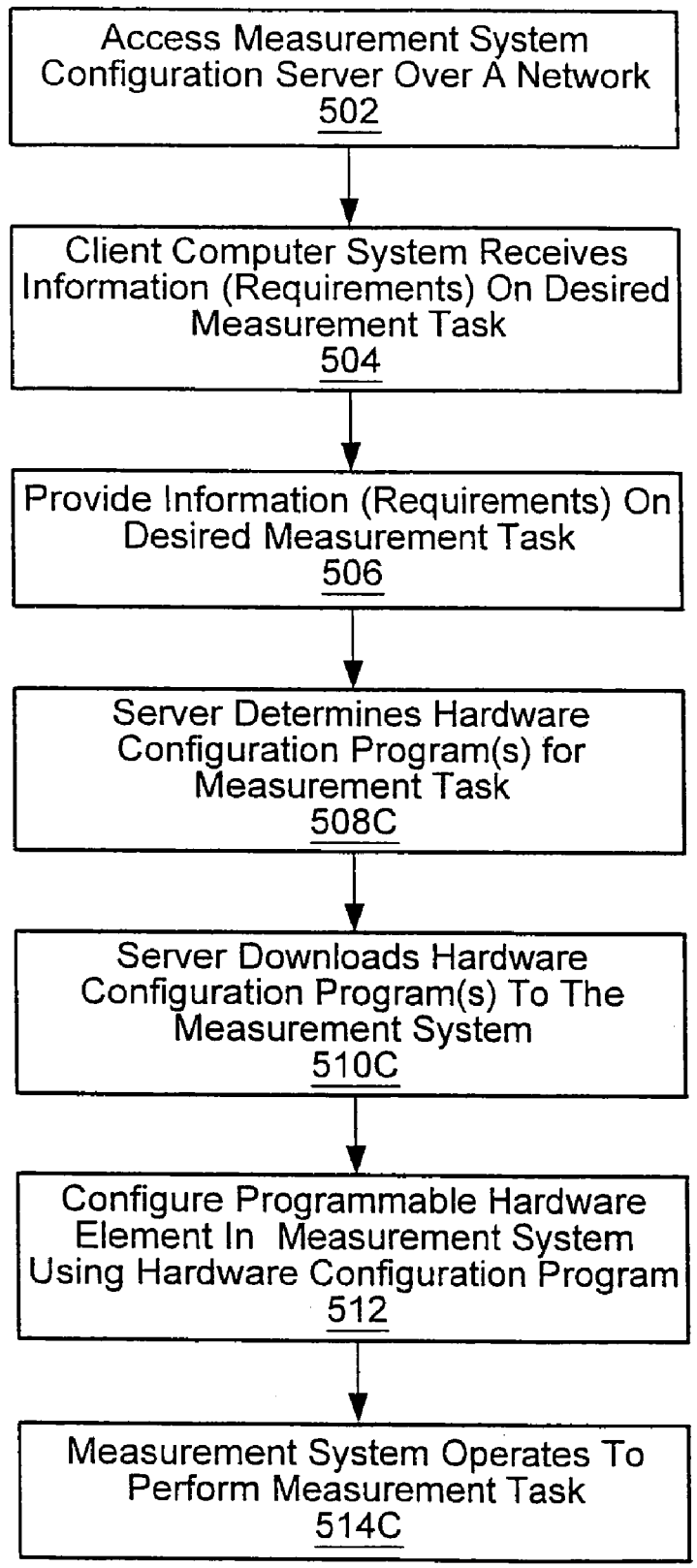
FIG. 6C is a flowchart diagram illustrating network-based specification, generation and deployment of hardware configuration programs according to one embodiment.

FIGS. 5–6C—Method for Configuring a Measurement System

FIG. 5 is a flowchart diagram illustrating one embodiment of a method for configuring a measurement system to perform a specified measurement task. FIGS. 6A–6C are flowcharts which illustrate examples of the method of FIG. 5. FIGS. 5 and 6A–6C are discussed together below. It is noted that the flowcharts of FIG. 5 and FIGS. 6A–6C are exemplary only. Further, various steps in the flowcharts of FIG. 5 and FIGS. 6A–6C may occur concurrently or in a different order than that shown, or may not be performed, as desired. Also, various additional steps may be performed as desired.

The various methods described below include scenarios where the user has a computer system ("client computer system") which can interface to a network (e.g., the Internet) to access a configuration server. The user may desire to obtain: 1) configuration data or programs for the client computer system, 2) configuration data or programs for a measurement device coupled directly to or comprised in the client computer system (e.g., any of the devices shown in FIGS. 2A–2C); and/or 3) configuration data or programs for a measurement device that is coupled to a network (e.g., the Internet), where the measurement device is not directly coupled to the client computer system, but rather may be a remote measurement device.

In examples 2 and 3 above, the user may desire to configure a measurement device, such as a smart sensor, expansion card, etc., which does not have its own display capabilities. In example 3 above, the user may desire to configure a measurement device that is in a different location, such as a smart sensor or other embedded device, e.g., on a factory floor. Thus, in example 3, the user may provide a network location, e.g., an IP address, of the measurement device being configured. Thus, the user may be required to use a separate computer system (the "client computer system") which has a display in order to implement the method described herein and configure a measurement device that does not inherently include display capabilities.

FIG. 5—Configuring a Measurement System for a Measurement Task

FIG. 5 is a flowchart diagram illustrating one embodiment of a method for configuring a measurement system for a measurement task.

Step 502

As shown, in step 502 a measurement system server 103 may be accessed, for example by a client computer system 102 over a network 104, such as the Internet. In one embodiment, the client computer system 102 may access the server 103 via a web browser, such as Netscape Navigator or Microsoft's Internet Explorer. In other embodiments, various other software programs may be used to access the server 103. In one embodiment, the server 103 may host a vendor's web site through which the client computer system 102 and/or the user may interface with the server 103.

In one embodiment, the access of the server 103 may be initiated by a user. In other words, a user may launch a web browser on the client system 102 to access the vendor's web site to purchase a customizable measurement product. In another embodiment, the access may be initiated programmatically by software executing on the client computer 102.

Step 504

In step 504 information on a desired measurement task to be performed by the measurement system (referred to as requirements) may be provided to the client computer system 102. In step 504 the client computer 102 may receive user input indicating the one or more requirements and may then provide this user input over a network to the server 103 in step 506. As used herein, the term "requirements" refers to any of various types of information describing or specifying a task, such as a measurement task. For example, the term "requirements" may include a specification of necessary hardware devices for performing the task.

In one embodiment, in step 504 the client computer system 102 may display a graphical user interface (GUI) on its display. The user of the client computer system 102 may then provide input to the GUI indicating the one or more requirements for the measurement task. The GUI may comprise a plurality of panels which guide a user of the client computer system 102 in providing the one or more requirements for the measurement task. The GUI may also comprise menus, dialog boxes, text entry fields and/or other similar graphical user interface elements. The GUI may be displayed by software executing on the client computer system 102. Alternatively, the server 103 may provide a graphical user interface (GUI) to the client computer system over the network, wherein the client computer system 102 displays the received GUI from the server.

In one embodiment, the user may invoke a measurement task specifier, e.g., running on either the client computer system 102 or the server 103, to specify or configure the desired measurement task, thereby producing a measurement task specification. The measurement task specifier may include a graphical user interface (GUI) which enables the user to easily and simply specify or configure a desired measurement task. This may involve selecting various parameters of the task such as the type of measurement being performed using voltage, current, desired signal analysis, etc. and other measurement settings and desired operation.

In one embodiment, the measurement task specifier may comprise a measurement task assistant. In other words, the measurement task specifier may be a software program which leads the user through a measurement task specification process, thereby generating the measurement task specification. In another embodiment, the measurement task specifier may comprise a measurement task configurator. The measurement task configurator may be a software program invocable by the user under a development environment, such as National Instruments' LabVIEW environment, Measurement Studio programming development environment, or any other development environment. In yet another embodiment, the measurement task specifier may be an API through which the user makes calls to generate the task specification. The measurement task specifier may thus generate the measurement task specification in response to user input. For example, in the case that the measurement task specifier is invoked by the user from the LabVIEW graphical development environment, the user may specify or configure a measurement task by placing or "dropping" nodes or icons on a graphical diagram and connecting the nodes via virtual "wires" to generate a graphical diagram or model of the measurement task. The graphical development environment program (e.g., LabVIEW) may generate software objects or data structures corresponding to the components of the graphical diagram which specify the measurement task. These data structures may comprise the measurement task specification.

As another example, consider the case where the measurement task specifier is an API in a text-based development environment, such as Microsoft Corporation's Visual C++ development environment. In this embodiment, the user may make API function calls in a C++ application program to specify the various attributes or aspects of the desired measurement task, such as measurement type (voltage, current, pressure, etc.), timing or sampling parameters, or other measurement task specification information. The executed functions may produce corresponding data structures which contain specification information for the measurement task.

For one embodiment of a measurement task specifier, please see co-pending U.S. patent application Ser. No. 60/301,785 titled "Measurement System Software Architecture for Easily Creating High-Performance Measurement Applications," filed Jun. 29, 2001, which was incorporated by reference above. It is noted that other means of communicating the one or more requirements to the server 103 are also contemplated, including FAX, email, telephone, and speech recognition, among others.

As one example of step 504, the user may use a graphical programming development environment such as LabVIEW to create a graphical program that specifies at least part of the desired measurement task. In creating a graphical program, the user may place one or more icons or nodes on the display and connect them in a desired way to accomplish the desired result. The user may also specify other desired operation. The graphical program and other user input may be provided to the server 103 and used by the server to generate a more complete program that accomplishes the user's desired task. Alternatively, the server 103 may generate a hardware configuration program based on the graphical program.

In one embodiment, the server 103 (or the client computer 102) automatically creates a configuration diagram based on the user's current measurement system configuration. The configuration diagram may include device icons representing devices present in the user's system and software product icons, such as program icons representing programs present in the user's system. The configuration diagram may be created with the aid of a configuration program, such as National Instrument's Measurement and Automation Explorer (MAX). The server 103 (or the client computer 102) may programmatically or automatically create and display a configuration diagram as described in U.S. patent application Ser. No. 60/312,242 titled "System and Method for Graphically Creating, Deploying and Executing Programs in a Distributed System" filed Aug. 14, 2001, whose inventors are Jeffrey L. Kodosky, Darshan Shah, and Steven W. Rogers. The client computer system 102 may display the configuration diagram (generated by the client or provided by the server). Where the server 103 creates the configuration diagram, the server 103 may download the configuration diagram to the client computer system 102, or simply display the diagram on the client system 102, e.g., in the client's browser. Where the client computer 102 (or the user) creates the configuration diagram, the configuration diagram may be used to provide information to the server 103 about the current configuration of the system. The user may also manually create the configuration diagram by selecting and interconnecting device icons. Also, the server 103 or client 102 may programmatically create a first portion of the configuration diagram and the user may manually create a second portion of the configuration diagram.

In one embodiment, the user may then graphically modify or manipulate the configuration diagram to specify requirements for the desired system. For example, the user may select device icons from a palette offered by the server 103. The user can "drag-and-drop" device icons from the server palette onto the user's configuration diagram to indicate that the user would like to purchase these devices. As another example, the user can "drag-and-drop" pre-existing program icons from the server palette onto the user's configuration diagram to indicate that the user would like to purchase these programs. As another example, the user may select device icons in the configuration diagram to initiate a respective assistant configuration program (either executing on the client 102 or the server 103) which guides the user in creating a program or configuration for the selected device. The user may use various other methods to graphically create, modify or manipulate the configuration diagram to specify requirements for the desired system.

The user may also use a prototyping environment to specify the requirements for the measurement task. In a prototyping environment the user may select operations that are recorded in a script or data structure. In one embodiment of a prototyping environment, the user may select the operations by applying the operations to an object, such as an image. An exemplary prototyping environment is the National Instruments Vision Builder product. For more information on an exemplary prototyping environment please see U.S. patent application Ser. No. 09/587,682, referenced above.

In another embodiment the user may browse existing configuration diagrams in a database, and select a configuration diagram that represents, or is close to, the user's desired measurement task. The existing configuration diagram may include device icons representing required devices and program icons representing programs, among other information. The user may also browse existing graphical programs that represent, or are close to, the user's desired measurement task.

The user may also browse existing solutions based on the requirements the user has entered. For example, the server may receive initial requirements, suggest various solutions, and the user may then select and optionally further modify the solution. The solution may take the form of one or more of a configuration diagram, graphical program, etc. Then user may then modify the configuration diagram or use an assistant program as described above to further specify requirements of the task.

In one embodiment, the user may use combinations of the above methods to specify the measurement task. For example, in one embodiment, the user may create a high level configuration diagram and/or graphical program to specify the desired measurement task at a high level, and in addition the user may also specify desired operation using a wizard-based manner. Creation of the configuration diagram may involve automatic or manual creation or display of device icons, program icons and interconnections that represent the current system configuration. Creation of the high level graphical program may involve selecting and interconnecting a small number of function icons or nodes, such as a measurement read node, a measurement analysis node, and/or a measurement write node. The user may then use a configuration assistant, e.g., a series of dialog boxes or user interface panels, to further specify desired operation. As another example, the user may select an existing configuration diagram, provide input to modify the configuration diagram, and use a wizard-based program to provide further input on desired operation. Various other combinations of the above methods are possible, as well as other methods.

The user input (requirements) may include domain specific user input. For example, in a measurement application, the user input may be measurement specific user input. The measurement specific user input or requirements may include, but are not limited to, one or more of a measurement function (i.e., instrument) type, such as an oscilloscope function, multimeter function, DAQ function, machine vision function, image processing function, motion control function, process control function, simulation function, automation function, plant control function, or measurement analysis function; sampling rate; gain; measurement type, such as voltage, resistance, temperature, current, pressure, photonic intensity, frequency, etc.; a component list indicating hardware and/or software components which the user either already has, or which the user wishes to use to perform the measurement function; publishing information, such as a URL (Universal Resource Locator) indicating a target site or device to which software products may be sent, or the name and/or location of a logging file; constraints, i.e., metrics which the user may wish to be minimized or maximized (i.e., optimized), such as cost, weight, performance, form-factor, etc.; platform or bus information, such as MacOS, Unix, Solaris, Windows NT, or PCI, PXI, VXI, USB, Wireless Ethernet (IEEE 802.11), Bluetooth, etc., which the user may prefer for the measurement system; measurement task specifications, such as a script, a task list, menu or button selections, drag and drop activity, as in a graphical development environment; programs; or any other user input which is germane to the measurement task or system.

In one embodiment, as part of the requirements provided by the user, the user may specify available (or installed) hardware and/or software components of the measurement system, described above. Alternatively, the server 103 may automatically determine available (or installed) hardware and/or software components of the measurement system.

Step 506

In step 506 information on a desired measurement task to be performed by the measurement system (referred to as requirements) may be provided to the server 103. Thus the client computer system 102 may provide the received information (the requirements) over the network (e.g., the Internet) to the sever 103. In one embodiment, as noted above, the server 103 may query the client system to determine the various hardware devices and/or programs that the user currently has installed in his/her measurement system. The server 103 may use this information (these requirements) in determining hardware and/or programs for the measurement task in step 508. It is noted that steps 504 and 506 may be considered as being performed in one step or as one action.

Step 508

In step 508 the server 103 may determine one or more measurement software products (e.g., configuration information and/or programs) in response to the requirements. In one embodiment, determining one or more measurement software products may comprise analyzing the measurement task specification and determining configuration information and/or programs that will accomplish the measurement task specification. The server may also determine one or more proposed solutions, where the term solution may include required devices, measurement software products (e.g., configuration information and/or programs), a configuration diagram, and other information.

The server 103 may analyze the received information (requirements) and may determine and provide two or more of: configuration information, software program(s), and/or hardware configuration programs, based on the requirements In one embodiment, an expert system comprised on the server 103 may operate to analyze the measurement task specification and determine the one or more measurement programs and/or measurement device software products. The expert system may also validate the measurement task specification, i.e., may determine if the specified measurement task may be implemented with available resources. In one embodiment, determining the one or more measurement device software products may comprise creating a runtime specification based on the measurement task specification. The runtime specification preferably comprises parameter settings for one or more measurement devices and other hardware comprised within the system, and may also specify software components or software programs which are to be used during execution of the task. In one embodiment, the runtime specification may comprise a specification of the parameters of one or more measurement primitives, where each measurement primitive comprises a software object and corresponding configuration settings, and where each measurement primitive is operable to implement at least a portion of the measurement task.

In one embodiment, the expert system may comprise a plurality of experts where one or more expert programs are available for each of various types of application or problem domains. Said another way, one or more experts may exist for each of various types of measurement tasks or sub-tasks. Thus, depending upon the type of measurement task specified or configured by the user in step 504, one or more corresponding experts that correspond to the problem domain of the task may be invoked to create the runtime specification.

As mentioned above, in one embodiment, the measurement system may comprise the client computer system and one or more measurement devices coupled to or comprised in the computer system. The one or more measurement software products may comprise configuration information which is operable to configure one or more of the client computer system and the one or more measurement devices to perform the measurement task. The client computer system 102 may include a configuration software program (such as National Instrument's MAX) which is operable to receive the configuration data and configure the measurement system (one or more of the client computer system 102, the one or more measurement devices). Alternatively, the software product may comprise configuration data and an installer, wherein the installer is executable by the client computer system 102 to configure the measurement system using the configuration data. As another alternative, the software product may include configuration data and configuration software which is executable by the client computer system 102 to configure the measurement system, and/or one or more application programs with the configuration data.

In another embodiment, the one or more measurement software products may include software programs (application software and/or drivers) which are executable by the measurement system (by the client computer system 102 and/or the one or more measurement devices) to perform the measurement task. For example, in one embodiment, the downloaded software product may include one or more of a graphical program or machine executable code which is executable to perform the measurement task. In another embodiment, the application software may include text based source code which is compilable and executable, or interpretable, by the client computer system to perform the measurement task using the one or more measurement devices.

As another example, the downloaded software product may comprise a self-executing program file which may operate to configure one or both of the client computer system 102 and the one or more measurement devices with configuration information or with other software program. A measurement device (which may also be called a reconfigurable instrument) may comprise a processor (CPU) and a memory (or multiple processor/memory elements), for executing a received software program.

As mentioned above, in one embodiment at least one of the measurement devices may comprise a programmable hardware element, such as an FPGA. In this case, the software product may include one or more hardware configuration programs (hardware descriptions or netlists) which are usable to configure the programmable hardware element. The downloaded hardware configuration program may be usable to configure the programmable hardware element, e.g., one or more FPGAs, to perform the measurement task.

In one embodiment, in step 508 the server 103 may also determine required hardware and/or devices for the measurement task. In other words, the server 103 may determine one or more measurement device software products in response to the one or more requirements. In one embodiment, determining one or more measurement device software products may comprise analyzing the measurement task specification and determining hardware with which to implement the measurement task. This embodiment is described further with respect to FIGS. 14A–14C.

Step 510

In step 510 the server 103 may provide or download software products (programs and/or configuration information) for the measurement task to the client computer system 102. Said another way, the server 103 may provide one or more measurement program products or configuration information to the client computer system 102 which are usable to configure the measurement system to perform the measurement task. The measurement system may be operable to be configured to perform the measurement task after receipt of the measurement program products and/or configuration information. Further user development may also be necessary to complete the received programs.

In one embodiment, the server 103 may provide the one or more measurement programs over the network, such as the Internet, to the client computer system 102. Thus the one or more measurement programs may be configured as IP packets and transferred over the Internet to the client computer system 102.

In one embodiment, the server 103 provides software products to the client computer system 102 in the form of a Compact Disc (CD) which may be delivered by mail to the user for installation on the client computer system 102. Other media may also be used to transfer the one or more measurement software products, including tapes, discs, or any other suitable medium. In another embodiment, the one or more measurement software products may be provided to the client system by sending the client system (or the user) a key or password which may be used to download the measurement software products from a website or other medium.

In one embodiment, prior to (or after) downloading, the server 103 may send data and information to the client computer system 102, e.g., using dynamic web page generation technology, to visually depict current or final 'as purchased' customized software products (i.e., the one or more measurement software products customized for the user's measurement task). For example, the server 103 may cause to be displayed a configuration diagram illustrating the proposed or "as-purchased" software products. The user may verify the visually depicted customized software products for accuracy, completeness, etc. prior to proceeding with payment and final check out.

In one embodiment, the client computer system 102 may provide a digital certificate to the server 103 for security, i.e., to verify the identity of the client computer system 102 and/or the user before providing the measurement software products. In another embodiment, a digital certificate may be provided by the server 103 to the client system to verify that the measurement software products being provided are in fact the correct software products for the specified measurement task or measurement system.

In one embodiment, the server 103 may receive payment information to pay for receipt of the software products. For example, the client computer system 102 may provide payment information to pay for receipt of the software products. The payment information may also be provided to a separate e-commerce server.

Step 512

In step 512, the provided software products may be installed or configured on the client computer system 102 and/or a measurement device. Note that in various embodiments, the installation and/or configuration may be performed by the user, by software executing on the client computer system 102, or by software executing on the server 103.

Where the received software product is configuration information, step 512 may comprise the measurement system executing a configuration program to configure various components in the measurement system (including software and devices) according to the configuration information. This may involve setting various hardware parameters, setting software parameters, etc. A configuration program, such as National Instrument's MAX, may configure various components using the configuration information.

Where the received software product is one or more software programs, step 512 may comprise storing the software programs in a memory medium of the target device (the client computer system or a measurement device) for execution by a processor.

Where the received software product is a hardware configuration program, step 510 may comprise configuring a programmable hardware element in the measurement system with the hardware configuration program.

Step 514

After the software products provided by the server 103 have been configured and/or installed on the measurement system (on the client computer system and/or a device), in step 514 the measurement system may execute to perform the measurement function. Where the received software product is configuration information, this may comprise the measurement system executing according to the configuration information. Where the received software product is one or more software programs, the measurement system may execute the one or more software programs in performing the measurement task. Where the received software product is a hardware configuration program, a programmable hardware element in the measurement system may operate according to the hardware configuration program. Various combinations of the above may also occur.

When the measurement system executes to perform the measurement function, the measurement system may operate to acquire a signal from a signal source and analyze the signal after the acquisition. The signal source may be a unit under test (UUT), a sensor, or other signal source.

In some embodiments, the received programs may be incomplete or insufficient to fully perform the user's desired task. In this case, the user may be prompted for more information or requirements. Alternatively, the user may be expected to complete or finish a received program in some way. In one embodiment, the server 103 may also provide one or more development tools, or the development tools may be made available on the server in an ASP (application service provider) model. The user may then use these tools to further complete a received program or software product.

FIGS. 6A–6C—Exemplary Embodiments of the Method of FIG. 5

Figure 7:
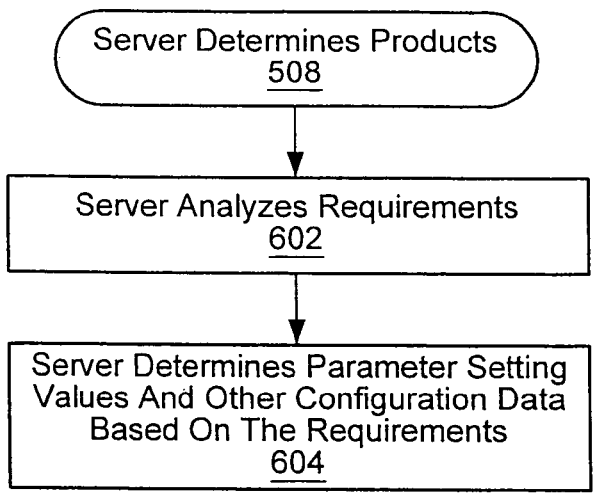
FIG. 7 is a flowchart diagram illustrating a method of determining configuration information based on received requirements.

FIGS. 6A–6C illustrate exemplary embodiments of the method presented above with reference to FIG. 5. FIGS. 7, 8, 9, 10A, and 10B further illustrate specific steps in the method. As shown in FIG. 6A, the server 103 may determine (e.g., generate) configuration information for the task in step 508A. As shown in FIG. 7, in one embodiment in step 602 the server 103 may analyze the received information (requirements) and in step 604 may determine parameter setting values and/or other configuration data based on the requirements. The server 103 may produce a configuration file that can be used to configure devices or software present in the measurement system. For example, the server 103 may generate a configuration file that can be used by a configuration program resident in the client computer system. One example of a configuration program targeted for measurement (including automation) is Measurement and Automation Explorer (MAX) offered by National Instruments Corporation. In step 512A the client computer system, e.g., the configuration program, may deploy the configuration information to the respective devices.

Figure 8:
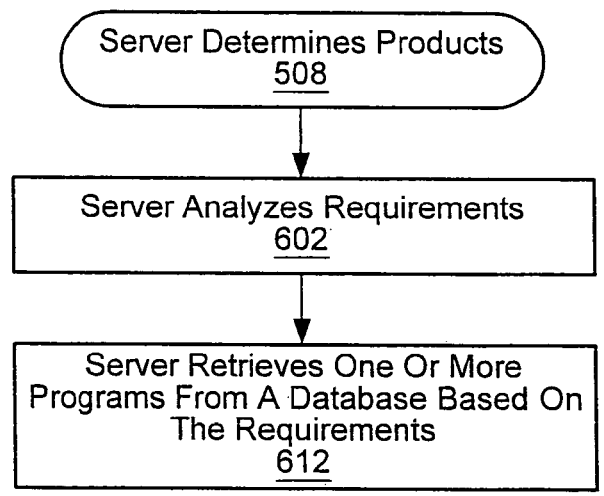
FIG. 8 is a flowchart diagram illustrating a method of determining programs based on received requirements which includes retrieving the programs from a database.
Figure 9:
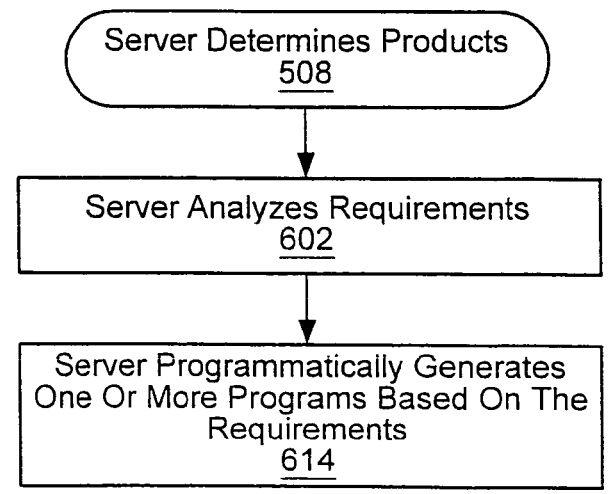
FIG. 9 is a flowchart diagram illustrating a method of determining programs by programmatically generating the programs based on the received requirements.

FIG. 6B illustrates an embodiment of the method of FIG. 5 where the server 103 generates software programs for the task. As shown in FIG. 6B, the server 103 may determine (e.g., generate) software programs for the task. As shown in FIGS. 8 and 9, in one embodiment in step 602 the server 103 may analyze the received information (requirements) and may determine one or more software programs based on the requirements. For example, in step 612 of FIG. 8 the server 103 may retrieve pre-existing software program(s) from a memory medium or database based on the requirements. In step 614 of FIG. 9 the server 103 may automatically or programmatically generate software program(s) (e.g., a graphical program) based on the requirements. The server may also perform a combination of steps 612 and 614, e.g., retrieve some pre-existing programs and programmatically generate others.

Where the server 103 determines or generates one or more software program(s), the software program(s) may include executable code which is executable by the measurement system to perform the measurement task. The software program(s) may also include source code which is one or more of: 1) compilable and executable, or 2) interpretable, by the measurement system to perform the measurement task. The software program(s) may also include at least one graphical program.

The generated software program(s) may be targeted for execution by the client computer system 102 and/or a measurement device coupled to or comprised in the client computer system 102. The generated software program(s) may also be targeted for execution by a remote device.

Where the generated software program is a graphical program, the measurement system (either the computer system or a device) may include a graphical program execution engine for executing the graphical program to perform the measurement task. For example, the server 103 may generate a LabVIEW graphical program, and the measurement system may include a device executing LabVIEW RT which executes the LabVIEW program. The software program(s) may take other forms, such as scripts, etc.

The software programs may then be downloaded and deployed in steps 510B and 512B, respectively.

Various methods for receiving user requirements and generating a software program in response thereto are described in the following patent applications, referenced above and incorporated herein by reference:

U.S. patent application Ser. No. 09/745,023 titled "System and Method for Programmatically Generating a Graphical Program in Response to Program Information," filed Dec. 20, 2000;

U.S. patent application Ser. No. 60/301,785 titled "Measurement System Software Architecture for Easily Creating High-Performance Measurement Applications," filed Jun. 29, 2001; and U.S. patent application Ser. No. 10/008,792 titled "Measurement System Software Architecture for Easily Creating High-Performance Measurement Applications," filed Nov. 13, 2001.

FIG. 6C illustrates an embodiment of FIG. 5 where the server generates at least one hardware configuration program. In one embodiment, as discussed above, in steps 504 and 506 the user may input a specification or requirements for the desired task (e.g., measurement task) to the server 103, and in 508C the server 103 may determine, e.g., generate, a hardware configuration program based on this information. The server 103 may select a pre-compiled hardware configuration program, or may programmatically generate a new hardware configuration program.

In one embodiment, in steps 504 and 506 the server 103 may present a configuration tool on the client computer 102 specifically designed for creating a hardware configuration program. For example, the configuration tool may comprise one or more programs implementing a configuration assistant. The assistant may be operable to lead a user through the configuration process, receiving user input specifying the user requirements for the system, providing various information specific to the hardware configuration program generation process, and generating a hardware configuration program for deployment on a programmable hardware element in the client system, e.g., a RIO (reconfigurable I/O) device in the client system. A RIO device is a device that includes a programmable hardware element and fixed hardware resources. In one embodiment, the configuration tool (e.g., the assistant) may also be operable to deploy the hardware configuration program onto the programmable hardware element in the client system, e.g., the RIO device.

As discussed generally above, a vendor may operate or host the configuration assistant on server computer system 103, such as an e-commerce server, which may be accessible to users (i.e., customers) over a network, e.g., the Internet. The client computer system 102 may be coupled to the server computer system 103 over the network, such as the Internet. The configuration assistant program may be stored and executed on the server computer 103. Software executing on the client computer system (e.g., a browser program) may be used to access the server (i.e., the configuration assistant). The user may thereby engage the configuration assistant remotely to specify a configuration of the desired task, and to download or deploy the resulting hardware configuration program generated by the configuration assistant onto a programmable hardware element (e.g., a RIO device). In one embodiment, the vendor server may provide sales and purchasing services to the customer in addition to system configuration.

Thus the server program (configuration assistant) may present a graphical user interface (GUI) to the user on the client computer system 102 and receive input therefrom specifying user requirements for the system to be configured. Where the GUI is targeted to hardware configuration programs, the GUI may provide one or more different approaches or support levels for performing the customization, each targeting a different class of users. For example, a basic support level may include providing precompiled hardware configurations from which the user may select a solution. This approach offers the least flexibility, but simplifies the choices that the user may consider. This approach may in many ways be considered a parameterized solution, in that the pre-defined nature of the hardware resources is very structured, with well defined acquisition modes and functionality.

In contrast, another embodiment of the configuration process offers very little pre-defined structure. This embodiment may mix program primitives (e.g., LabVIEW primitives) with low level I/O, and allows for the construction of timing, triggering, inline processing, and more. These building blocks can be pieced together to create the same functionality as the existing solutions, as well as much more capable operations. These blocks can often be combined in different ways to provide similar solutions, but one may be preferable to the other in terms of extensibility, resource utilization, etc. This approach offers the greatest flexibility, but requires a more sophisticated user.

In one embodiment, as mentioned above, the configuration assistant may provide a drag and drop interface for creating the user defined configuration. In another embodiment, the assistant may provide a menu and/or button based graphical interface for creating the user defined configuration. In another embodiment, the assistant may provide a list of available resources, e.g., low level interface primitives such as AI, AO, and DIO, as well as a list of higher level functions that can be applied to these low-level primitives, including higher level interface functions such as counters built on top of DIO lines, or inline processing such as linearization or filtering for AI lines. The configuration assistant may include or utilize a graphical program development environment such as LabVIEW.

The user may select the resources required by an application, and configure any resources as necessary (for example, setting gain parameters on an analog input resource) using the configuration assistant. In one embodiment, the selections may be hierarchical, and may allow the user to add the higher level interface or inline processing in the same window. The user may then identify the timing and triggering requirements of the application, selecting from the resources identified/created in the previous step.

In one embodiment a description file may be generated which identifies resources and features the task requires or that the user has selected. From this description file, G code (graphical code, e.g., National Instruments G graphical programming language) may be generated. HDL code may then be generated from the G code (or directly from the description file), and eventually a program binary file, i.e., a hardware configuration program, for the FPGA generated from the HDL code. In these approaches, caching schemes may be used so that the number of compilations may be minimized.

In step 508C the server 103 may determine at least one hardware configuration program based on the requirements the user has provided. As shown in FIGS. 8 and 9, in one embodiment in step 602 the server 103 may analyze the received information (requirements) and may determine one or more hardware configuration programs based on the requirements. For example, in step 612 of FIG. 8 the server 103 may retrieve pre-existing hardware configuration program(s) from a memory medium or database based on the requirements. In step 614 of FIG. 9 the server 103 may automatically or programmatically generate programs, e.g., hardware configuration program(s), based on the requirements. The server may also perform a combination of steps 612 and 614, e.g., retrieve some pre-existing hardware configuration programs and programmatically generate others.

In one embodiment, specific features (as opposed to complete configurations) may be pre-compiled in such a way that they may be assembled or composed quickly into an appropriate configuration. The advantage of this approach is that most of the relative placement and routing has been done up front, and so only a "quick" replacement and rerouting is needed to put the configuration together. In another embodiment of this approach, a set or library of complete configurations may be maintained by the server 103 (or a separate computer) and made available for a wide variety of applications. The server (or user) may select a best solution (i.e., configuration), then make modifications as needed.

In one embodiment, the server 103 may maintain a cache for storing one or more pre-compiled portions of the program, so that successive compiles may be performed more quickly than the original compilation. In other words, in one embodiment, incremental compilation may be supported. In another embodiment, the server 103 may support a graphical program differencing or "diff" method for detecting changes in graphical programs. An example of a graphical program "diff" application is described in U.S. Pat. Nos. 5,974,254 and 6,138,270, which are incorporated herein by reference as though fully and completely set forth herein. The graphical program diff method may detect differences in two graphical programs (e.g., successive versions of the same graphical program), and only the differences may need to be compiled.

In addition, the server 103 may search pre-existing hardware configuration programs in a database to attempt to find an existing hardware configuration program that satisfies the user's requirements. The server 103 may offer an existing hardware configuration program that includes more functionality than the user's task requires. The user can choose to accept this pre-existing program, trading off the drawback of a larger footprint for no required compile time.

Various methods for receiving user requirements and generating a hardware configuration program in response thereto are described in U.S. patent application Ser. No. 10/058,150 titled "Reconfigurable Measurement System Utilizing a Programmable Hardware Element and Fixed Hardware Resources", filed on Oct. 29, 2001, referenced above and incorporated herein by reference.

Thus, in one embodiment, the server 103 may analyze the received information (requirements) and may determine one or more hardware configuration programs based on the requirements. The server 103 may retrieve pre-existing hardware configuration program(s), may automatically or programmatically generate hardware configuration program(s), or a combination thereof.

Figure 10A:
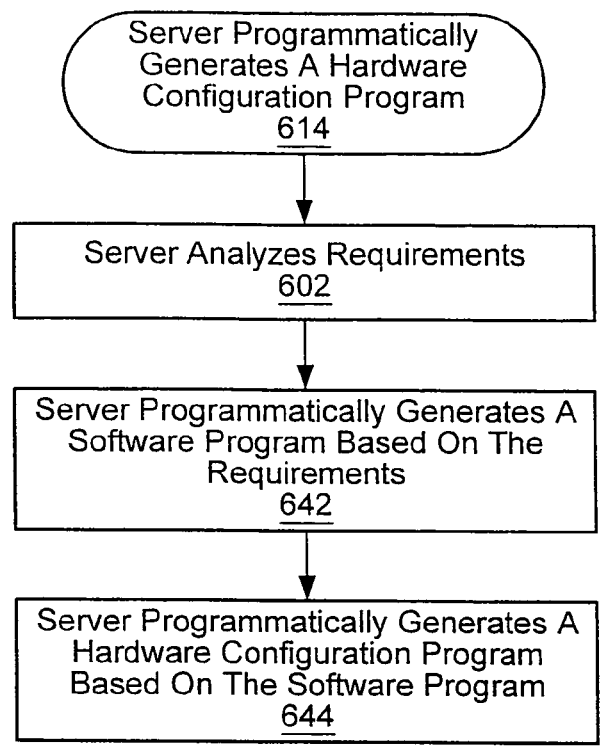
FIGS. 10A and 10B are flowchart diagrams illustrating methods of programmatically generating a hardware configuration program.
Figure 10B:
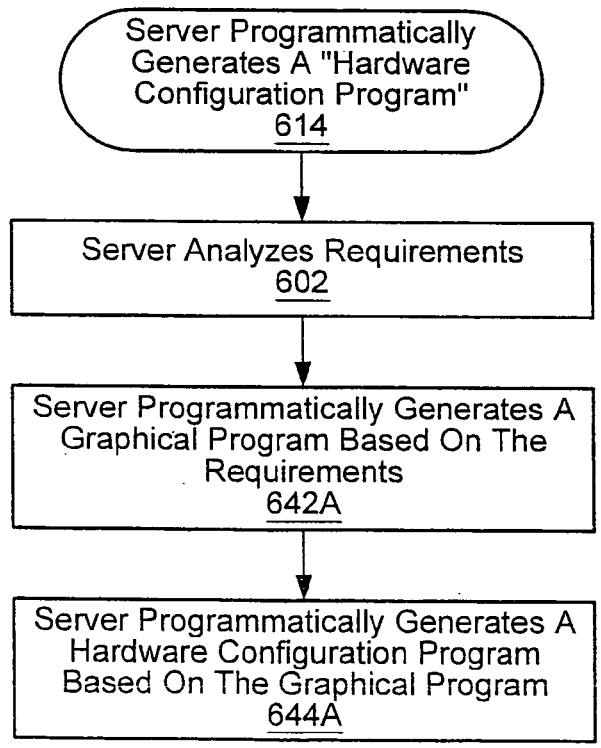

As discussed above, where the server 103 determines or generates a hardware configuration program, the server 103 may programmatically generate the hardware configuration program directly from the received requirements. Alternatively, as shown in FIG. 10A, the server may programmatically generate a software program or other intermediate description or data structure based on the requirements in 642, and then programmatically generate a hardware configuration program based on the software program, description, or data structure in 644. As shown in FIG. 10B, the server may programmatically generate a graphical program based on the requirements in 642A, and then programmatically generate a hardware configuration program based on the graphical program in 644A.

FIG. 8 illustrates an embodiment of Step 508 of FIG. 5. In step 602 the server 103 may analyze the received information (requirements) and may determine one or more programs based on the requirements. For example, in step 612 of FIG. 8 the server 103 may retrieve pre-existing program(s) from a memory medium or database based on the requirements. The program(s) may be software program(s) or hardware configuration program(s).

As shown in FIG. 9 and discussed above, in one embodiment the server 103 may analyze the received information (requirements) and may programmatically generate one or more programs based on the requirements. In this embodiment, the program(s) that accomplish a portion or all of the measurement task are programmatically or automatically generated (generated by software). This may involve programmatically generating one or more software programs or one or more hardware configuration programs. For example, software executing on the server 103 may programmatically generate a graphical program, such as a LabVIEW graphical program, based on the requirements. This may involve programmatically generating and displaying function nodes or icons and interconnections among the nodes to specify the graphical program, as well as the underlying data structures which represent the graphical program. Software executing on the server 103 may also programmatically generate a hardware configuration program based on the requirements.

Configuration Diagram

In one embodiment, the system may display visual information to the customer illustrating the software product(s) and/or hardware and software configurations specified by the customer. In other words, the customer may dynamically be presented with a display or picture of the system and/or configuration (e.g., a configuration diagram) in or near real time, thereby providing a 'What You See Is What You Get' (WYSIWYG) purchasing experience for the customer. Exemplary configuration diagrams are described below with respect to FIGS. 16A–16C.

In one embodiment, the server 103 (or the client computer 102) creates a configuration diagram based on the user's measurement system. The server 103 (or the client computer 102) may create and display a configuration diagram as described in U.S. patent application Ser. No. 60/312,242 titled "System and Method for Graphically Creating, Deploying and Executing Programs in a Distributed System" filed Aug. 14, 2001, whose inventors are Jeffrey L. Kodosky, Darshan Shah, and Steven W. Rogers. The client computer system 102 may display the configuration diagram (generated by the client or provided by the server). Where the server 103 creates the configuration diagram, the server 103 may download the configuration diagram to the client computer system 102, or simply display the diagram on the client system 102.

The configuration diagram may comprise device icons which correspond to devices present in the measurement system. The configuration diagram may further comprise connections displayed between device icons to visually indicate physical or logical connections between devices. The configuration diagram may further comprise program icons corresponding to programs present in the measurement system. The program icons may be located proximate to device icons corresponding to devices on which the respective programs are stored or, in the case of an FPGA, configured. The configuration diagram may also display other information.

The server 103 may create the configuration diagram to document or allow visualization of the existing measurement system as detected and/or configured by the server 103. Also, the user may use the configuration diagram to deploy received software products (e.g., received programs) on various devices. For example, once the server 103 generates software products for the measurement system, corresponding icons (e.g., program icons or configuration information icons) may appear on the configuration diagram, such as in a palette. The user may then associate (e.g., drag and drop) these icons to various device icons to configure the system.

In one embodiment, the client computer system 102 may display the configuration diagram representing the measurement system as it exists before any software products are received from the server 103. Where the server automatically deploys software products to devices in the client system, when software products (configuration information and/or programs) are received from the server 103, the configuration diagram may be updated accordingly to show the user how the system has changed. In one embodiment, the configuration diagram may show the changes (or deployments) to the client system in an "animated" fashion, allowing the user to easily see what software products are being deployed to which devices. For example, program icons may move on the screen to the device icon corresponding to the device to which the underlying programs are being deployed. This provides the user with the ability to see how his/her system is being changed. The configuration diagram may also be used to show proposed changes to the measurement system, possibly in an animated fashion, with the user having the ability to accept or reject the software products or changes.

The server 103 may thus animate a configuration diagram displayed on the client system to visually illustrate to the user how the server 103 is modifying (or proposing to modify) the client measurement system and programs. Thus, when the server 103 deploys programs on devices, the configuration diagram displayed on the client system may be animated accordingly to visually indicate the deployment. For example, a program icon may move on the screen from a server icon representing the server to the appropriate device icon to visually indicate that the program is being deployed on a respective device.

In one embodiment, the user may not be in possession of the required measurement devices to perform the task. In this case, as discussed below with respect to FIG. 14B, a manufacturer (the vendor) may be provided information on the required hardware devices which the vendor may then ship to the user. The vendor may also receive configuration information and/or programs and use this to configure the device(s). The configured devices(s) may then be sent to the user to perform the measurement task.

The configuration diagram may also be modified to display a device icon, possibly with a modified appearance corresponding to a hardware device that is not currently present in the system (e.g., a "virtual device icon"), but is being shipped to the user. The user may then be able to select the device icon to view software product specifications and/or enter ordering information for the software product. The user may deploy received configuration information and/or programs to this non-present or "virtual device" by associating icons (e.g., program icons or configuration information icons) with this "virtual device icon". The server 103 may also show an animation of program icons and/or configuration information icons being automatically deployed to this virtual device icon. When the actual device is received and coupled to the system, the corresponding programs or configuration information may be automatically or manually deployed to the device at that time. Additionally, when the device is coupled to the system, the virtual device icon may change appearance, for example, the virtual device icon may change into a regular device icon.

Figure 11:
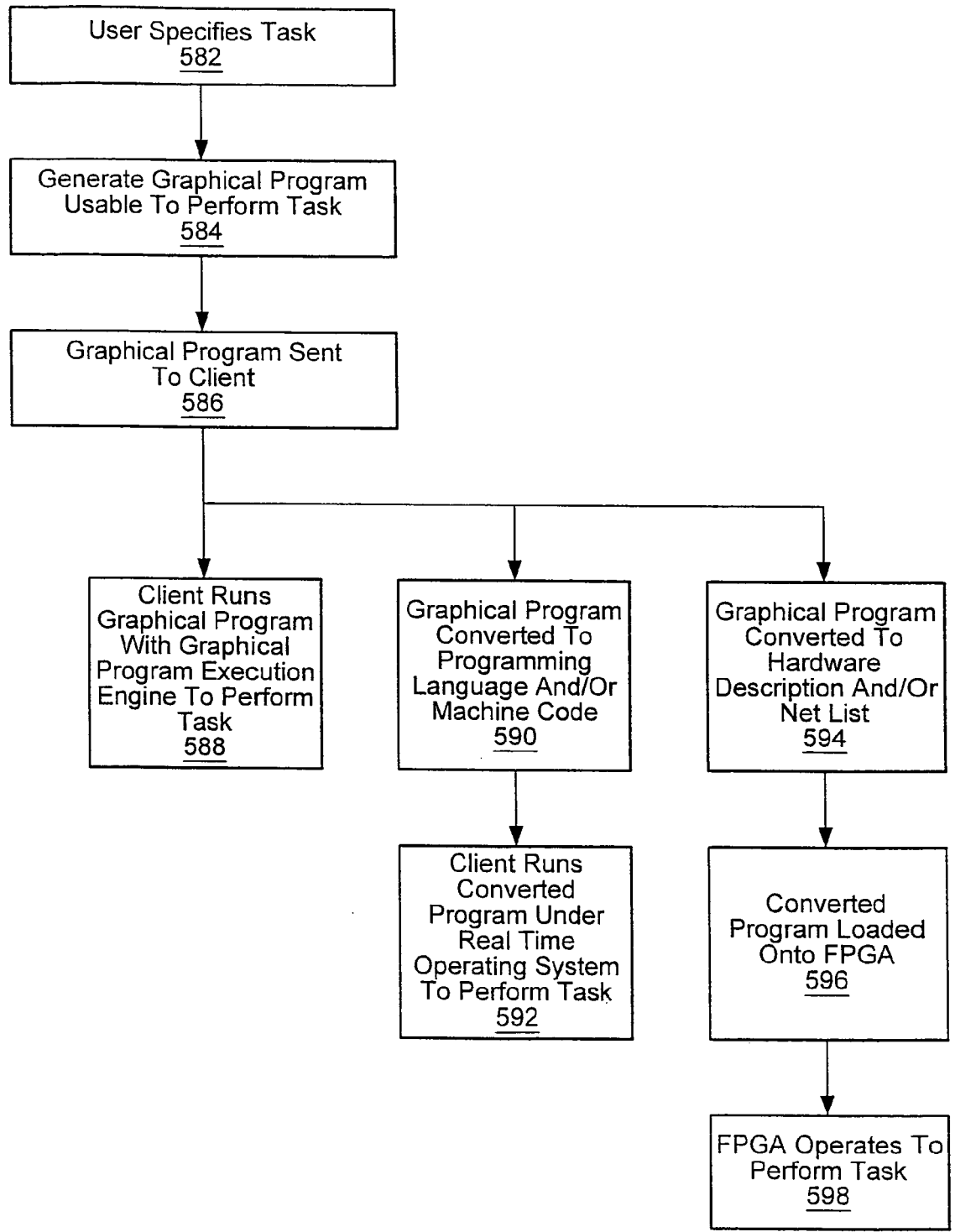
FIG. 11 is a flowchart diagram illustrating network-based specification, generation and deployment of a graphical program.

FIG. 11—Flowchart of a Method for Configuring a Measurement System Using a Graphical Program FIG. 11 is a flowchart of one embodiment of a method for configuring a measurement system using a graphical program, where the measurement system comprises the client computer system 102 and one or more measurement devices. In particular, the method describes the configuration of a measurement system comprising any of a variety of measurement hardware, including reconfigurable hardware such as FPGAs and/or processor/memory based elements, as well as other measurement devices comprised in the measurement system. Note that the flowchart of FIG. 11 is exemplary only, and that various steps in the flowchart of FIG. 11 may occur concurrently or in different order than that shown, or may not be performed, as desired. Also, various additional steps may be performed as desired.

As FIG. 11 shows, in 582 a user may specify a task, e.g., a measurement task, by specifying one or more of task requirements, application type, and client computer type, among others. For example, parameters such as the type of measurement being performed, e.g., voltage, current, temperature, etc., and other measurement settings may be indicated. As described above with reference to FIG. 5, steps 504 and 506, in various embodiments, the user specifying the task may include the user providing input to a client computer system 102, accessing a server 103 over a network, and providing the task specifications to the server 103 using any of a variety of means, including a measurement task specifier (also described above), a FAX, email, telephone, or any other means for communicating requirements information to the server 103. In one embodiment, a measurement task specification specifying the measurement task may be produced in response to the user provided task specifications, preferably by the measurement task specifier.

In 584 a graphical program may be generated which is usable to perform the specified task. The terms "graphical program" and "block diagram" were described above. In one embodiment, the graphical programming environment is comprised on the server 103. In one embodiment, the measurement task specifier may be comprised in, or may utilize, the graphical programming environment, and may be operable to generate the graphical program in response to the user-provided task specifications.

In 586 the graphical program may be sent to the client, i.e., the client computer system 102 and/or the user. As mentioned above, sending the graphical program to the client may include downloading the graphical program over the network to the client computer system 102, sending a physical copy of the graphical program to the user, e.g., in the form of one or more CDs, tapes, discs, or other media, or sending the graphical program to the client by any other means of data transferal. As mentioned above, digital certificates may be used by one or both of the server 103 and the client computer system 102 to verify the identity of the other before sending the graphical program to the client.

In one embodiment, the client may run or execute the graphical program with a graphical program execution engine to perform the specified task, as indicated in 588. In other words, the measurement system may include the graphical program execution engine, thereby facilitating native execution of the graphical program on the system to perform the task. Note that the graphical program execution engine may be comprised on the client computer system 102, or one or more of the measurement devices.

In another embodiment, the graphical program may be converted to a programming language and/or machine code, as indicated in 590. Then, in 592, the converted program may be run or executed under an operating system, such as a real time operating system, to perform the task. In other words, the graphical program may be converted to a 'lower level' text based programming language such as C, C++, FORTRAN, Basic, Java, etc., then compiled or interpreted for execution under the real time operating system, e.g., Microsoft Windows, Sun Solaris, Unix, Linux, etc., or converted to machine code which may be directly executable under such an operating system without the need to compile or interpret the converted program.

In yet another embodiment, the graphical program may be converted to one or more hardware configuration programs (hardware descriptions and/or netlists), as indicated in 594. In this embodiment the client computer system 102 and/or one or more of the measurement devices comprises reconfigurable hardware, such as an FPGA (or multiple FPGAs). The graphical program may be converted to a hardware configuration program by the server 103 or by the client system 102. Then in 596 the converted program may be loaded onto the FPGA (or multiple FPGAs), thereby configuring the FPGA(s) to perform the task. Then, in 598 the configured FPGA(s) may operate to perform the task.

Thus, by performing the method described above, a user may specify a task, such as over a network, a server may generate a graphical program from the user-specified task specification and send the graphical program to the client, then the client may, if necessary, convert the graphical program to an executable form. The executable program may then be run by the measurement system to perform the specified task. As discussed above, the delivery of the program to the client may occur as part of an e-commerce transaction between the client or user and the vendor, i.e., a purchase of the software product by the client from the vendor.

Figure 12A:
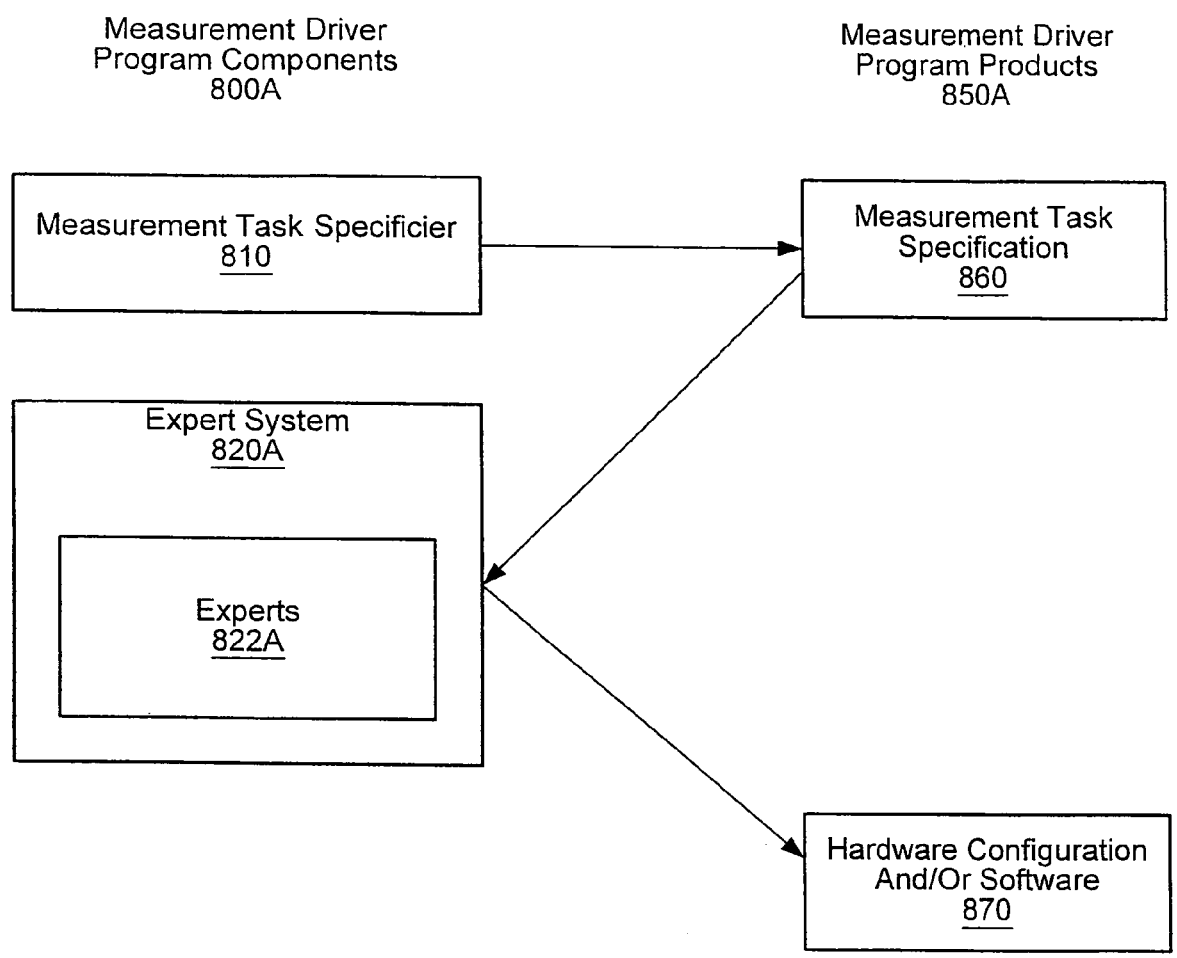
FIGS. 12A–12B illustrate two embodiments of a system for task specification and system configuration, according to one embodiment.
Figure 12B:
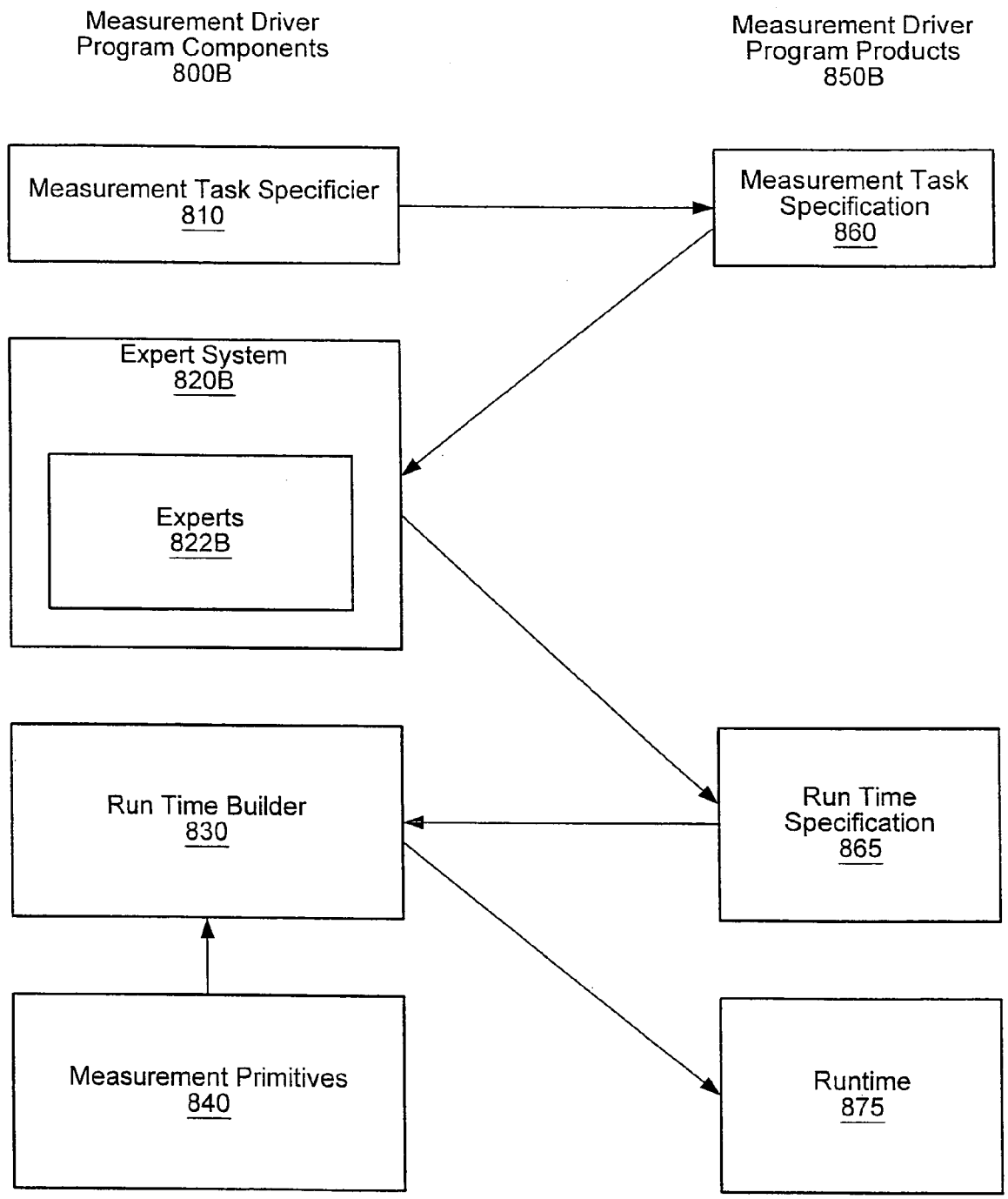

FIGS. 12A and 12B—Measurement Driver Program Components and Software Products FIGS. 12A and 12B illustrate two embodiments of a measurement task specification program and related software products produced and used by the measurement task specification program. The measurement task specification program may also be referred to as the measurement driver program. Note that these embodiments of the measurement task specification program include a measurement task specifier and expert system, as described above. It should also be noted that these embodiments are meant to be illustrative of approaches for implementing the methods described above, and are not meant to preclude other possible implementations.

FIG. 12A—Measurement Task Specification Program Components

FIG. 12A illustrates various software components or programs 800A comprised in the measurement task specification program, also referred to as the measurement driver program. As shown, the measurement task specification program may include a measurement task specifier 810, an expert system 820A with one or more experts 822B, a runtime builder 830, and various measurement primitives 840. The measurement task specification program may also include other software components as well.

As FIG. 12A also illustrates, various of the measurement task specification program components may be operable to generate respective software products 850A which may be useable by other measurement driver program components, by other software programs or systems, or by a user. More specifically, as shown in FIG. 12B, in one embodiment, the measurement task specifier 810 may be operable to generate a measurement task specification 860 which, as described above, may particularly describe the measurement task specified or configured by the user. In one embodiment, the measurement task specification 810 may comprise software objects or data structures, such as C++ objects, which may specify the measurement task. In one embodiment, the measurement task specifier 810 may be a measurement task wizard or assistant, i.e., a software program which leads the user through a measurement task specification process to create the measurement task specification 860. In another embodiment, the measurement task specifier 810 may take the form of a measurement task configurator, which is a software program invocable by the user under a development environment, such as the National Instruments LabVIEW environment or Measurement Studio programming development environment. In yet another embodiment, the measurement task specifier 810 may simply be an API through which the user makes calls to generate the task specification. Thus, in various embodiments, the measurement task specifier 810 may generate the measurement task specification 860 in response to user input. As described above with reference to FIGS. 5 and 6A–6C, the measurement task specifier 810 may be accessible to a user's client computer system 102 over a network 104.

As shown, the expert system 820A may use the measurement task specification 860 to generate a run time specification 865. In one embodiment, the expert system 820A may include a plurality of experts. The expert system 820A may include one or more experts for each of the measurement device types shown in FIGS. 2A, 2B, and 2C, as described above with reference to FIGS. 5 and 6A–6C. As also described above, the run time specification may comprise parameter values for the hardware or measurement devices used to implement the measurement task.

FIG. 12B—Measurement Driver Program Components Including Run Time Builder

FIG. 12B illustrates various software components or programs 800B comprised in a measurement driver program, including a run time builder. The measurement driver shown in FIG. 12B is similar to that described with reference to FIG. 12A above, in that the measurement driver program includes the measurement task specifier 810 and an expert system 820B, which may include one or more experts 822B. However, the expert system of FIG. 12B may differ from that of FIG. 12A in that rather than generating a hardware configuration (and/or software), the expert system 820B may generate a run time specification, described below. Additionally, the measurement driver program of FIG. 12B may also include a runtime builder 830, and various measurement primitives 840. The measurement driver program may also include other software components as well.

As FIG. 12B also illustrates, various of the measurement driver program components may be operable to generate respective software products 850B which may be useable by other measurement driver program components, by other software programs or systems, or by a user. In addition to the measurement task specification 860, described above with reference to FIG. 12A, the measurement driver software products 850B may include a run time specification 865 and a run time 875, described below. More specifically, as shown in FIG. 12B, the expert system 820B may use the measurement task specification 860 to generate the runtime specification 865. Similar to the expert system 820A of above, the expert system 820B may include a plurality of experts, e.g., one or more experts for each of the measurement device types shown in FIGS. 2A, 2B, and 2C.

In one embodiment, the runtime specification 865 may similarly comprise software objects or data structures, such as C++ objects, which may specify the runtime parameters for software and/or hardware used to implement the specified measurement task. The runtime specification 865 may comprise parameter specifications for one or more measurement primitives 840 which correspond to rudimentary measurement tasks or operations. Said another way, the runtime specification 865 may comprise a collection of primitive settings, each of which may comprise a detailed and unambiguous "recipe" for a primitive. For example, primitive settings for a digitizer, such as a National Instruments E-Series digitizer, may include: Dither (Yes, No), Polarity (Bi-polar, Uni-polar), Gain, Mode (Calibration, Diff, NRSE, RSE, Aux, Ghost), Generate Trigger (Yes, No), and Last Channel (Yes, No). In one embodiment, the run time specification may be used to configure hardware devices in the measurement system to perform the specified measurement task.

In one embodiment, the run time specification 865 may in turn be useable by the runtime builder 830 to generate a run time 875, as shown, which may be executable to perform the specified measurement task. In other words, the run time 875 may be executable by the client computer system 102 and/or one or more of the measurement devices to perform the specified measurement task.

Figure 13:
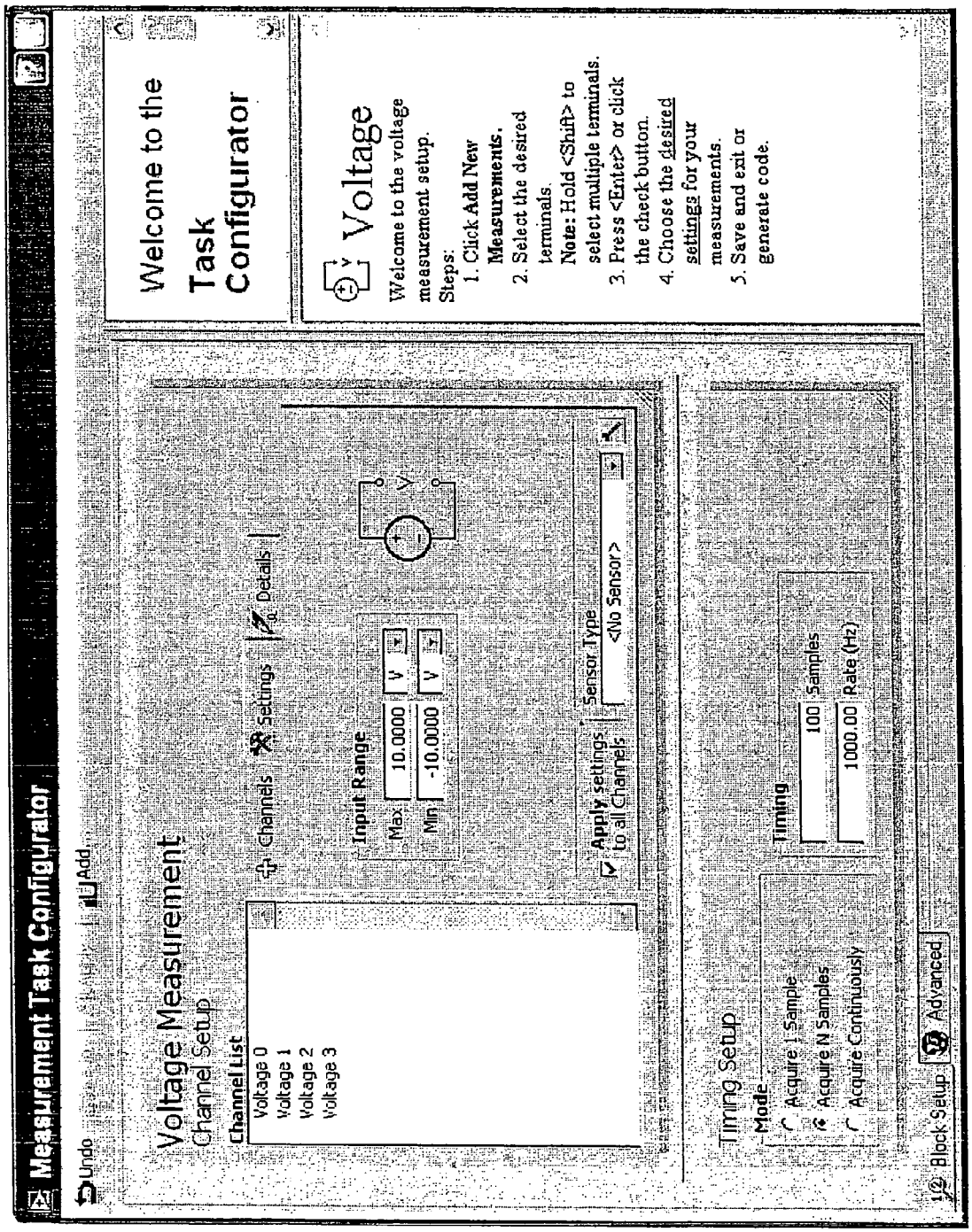
FIG. 13 illustrates a graphical user interface (GUI) of a measurement task specifier interface, according to one embodiment.

FIG. 13—Measurement Task Specifier Screen: Measurement Setup

As mentioned above, the measurement task specifier 730 may be implemented in a variety of forms, including an API, a configuration assistant, or a measurement task configurator, among others. In one embodiment, the measurement task specifier may comprise a software program, e.g., a measurement task configurator, invocable by the user through a web browser. The measurement task configurator may comprise a graphical user interface (GUI) which may provide an intuitive and powerful way for a user to specify a measurement task.

FIG. 13 illustrates an example configurator measurement setup interface, according to one embodiment. More specifically, FIG. 13 shows a measurement setup interface for a voltage measurement. In one embodiment, the primary panel, in this example titled "Voltage Measurement Setup," may be a main GUI template VI, configured dynamically for voltage measurement configuration. In one embodiment, this VI may be operable to receive user input specifying one or more basic voltage measurements, including input ranges, sensors, and scaling, as shown. Various controls on the panel may also allow the user to add and remove measurements, as well as copying existing measurements. As shown, in one embodiment, the panel may also include a list of currently configured measurements of a given type, e.g., voltage measurements.

As FIG. 13 also shows, the configurator interface may include a blocks panel indicating the various types of measurement the user may configure, such as voltage, temperature, resistance, frequency, and angular displacement, among others. In one embodiment, the user may select or click a particular block to activate the configuration panels for that type of measurement.

In one embodiment, the configurator interface may include an icon strip, shown in FIG. 13 between the blocks panel and the main panel. Each icon represents a configured group of measurements corresponding to one of the blocks in the block panel, such as voltage, temperature, frequency, etc. In another embodiment, each icon in the icon strip may represent a step or function of the measurement task being created. Thus, as the user selects and configures measurement functions, corresponding icons are added to the icon strip. It should be noted that each time a measurement block is selected indicating a new measurement group, e.g., a group of voltage measurements, an icon may be added to the icon strip. The measurements in each measurement group may be subject to the specified parameters shown in the panel for that group, such as timing, triggering, routing, etc. If a user specifies multiple voltage measurement groups, then the icon for that measurement type (block) may appear multiple times in the icon list. In one embodiment, when a user selects (clicks) an icon in the icon list, the configurator may present one or more panels corresponding to that measurement group, thereby allowing the user to quickly access any measurement group specification for review, revision, replication, or deletion.

Figure 14A:
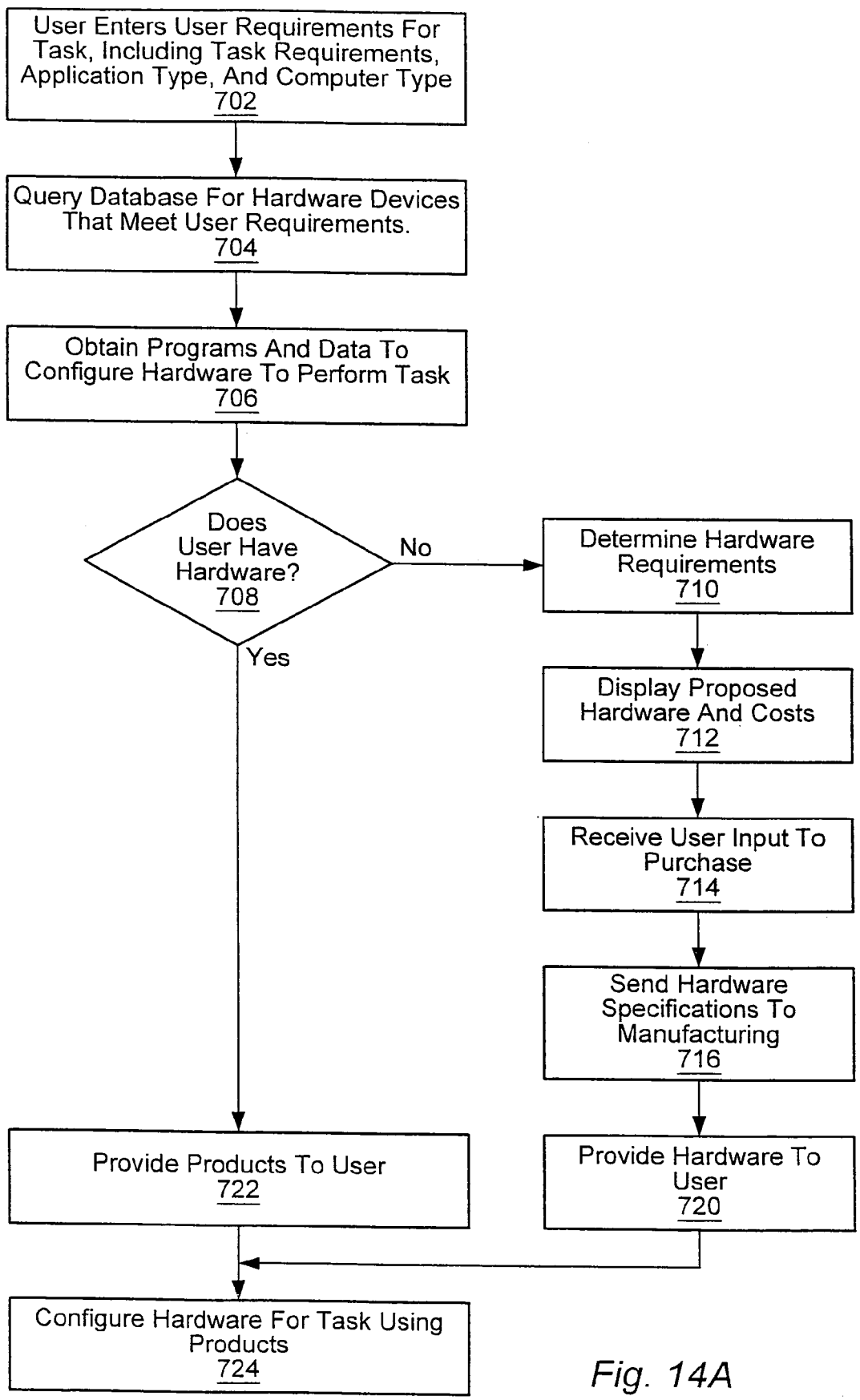
FIGS. 14A–14C are flowchart diagrams illustrating network-based specification, distribution and deployment of software products which may include providing hardware devices to the user.
Figure 14B:
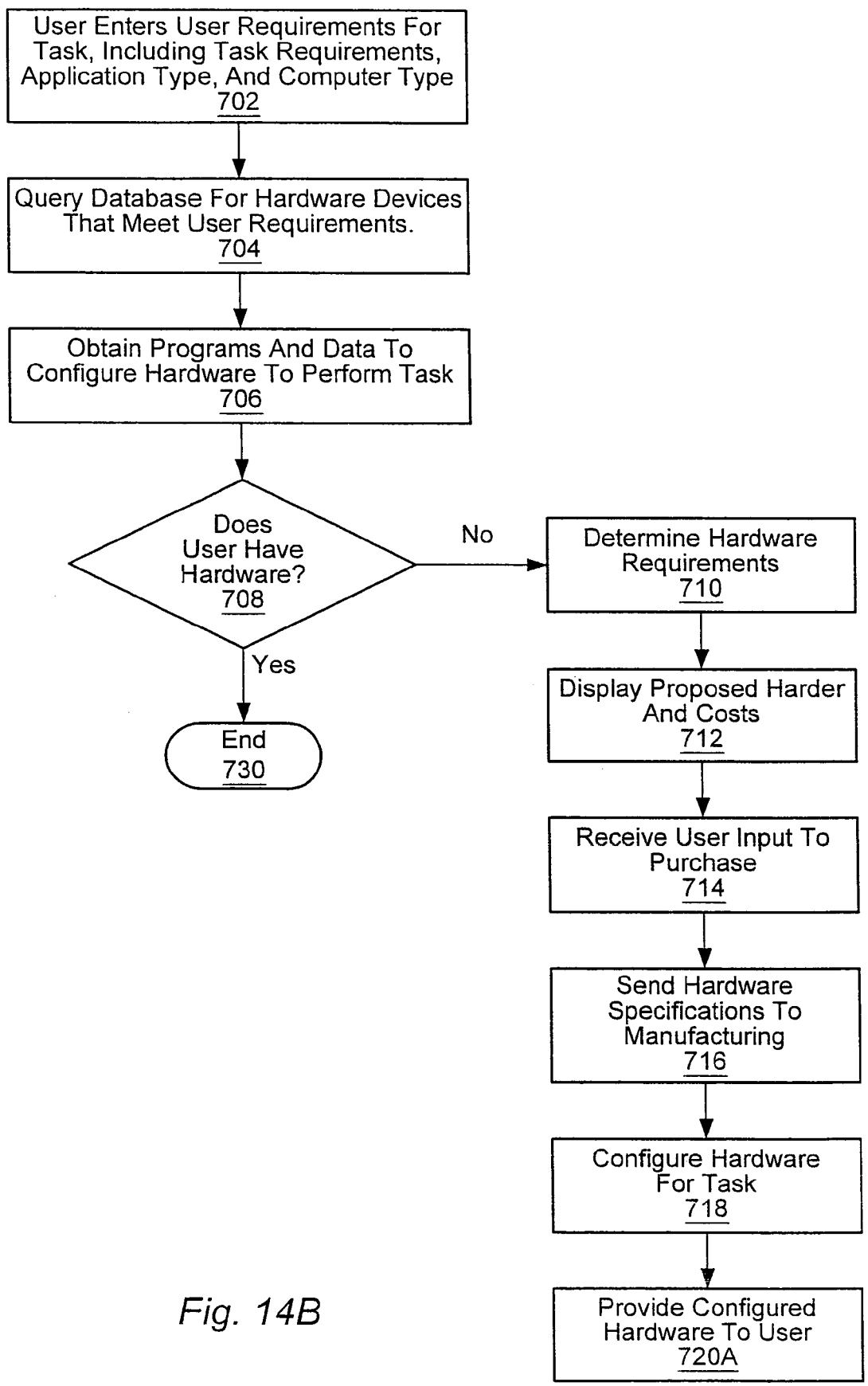
Figure 14C:
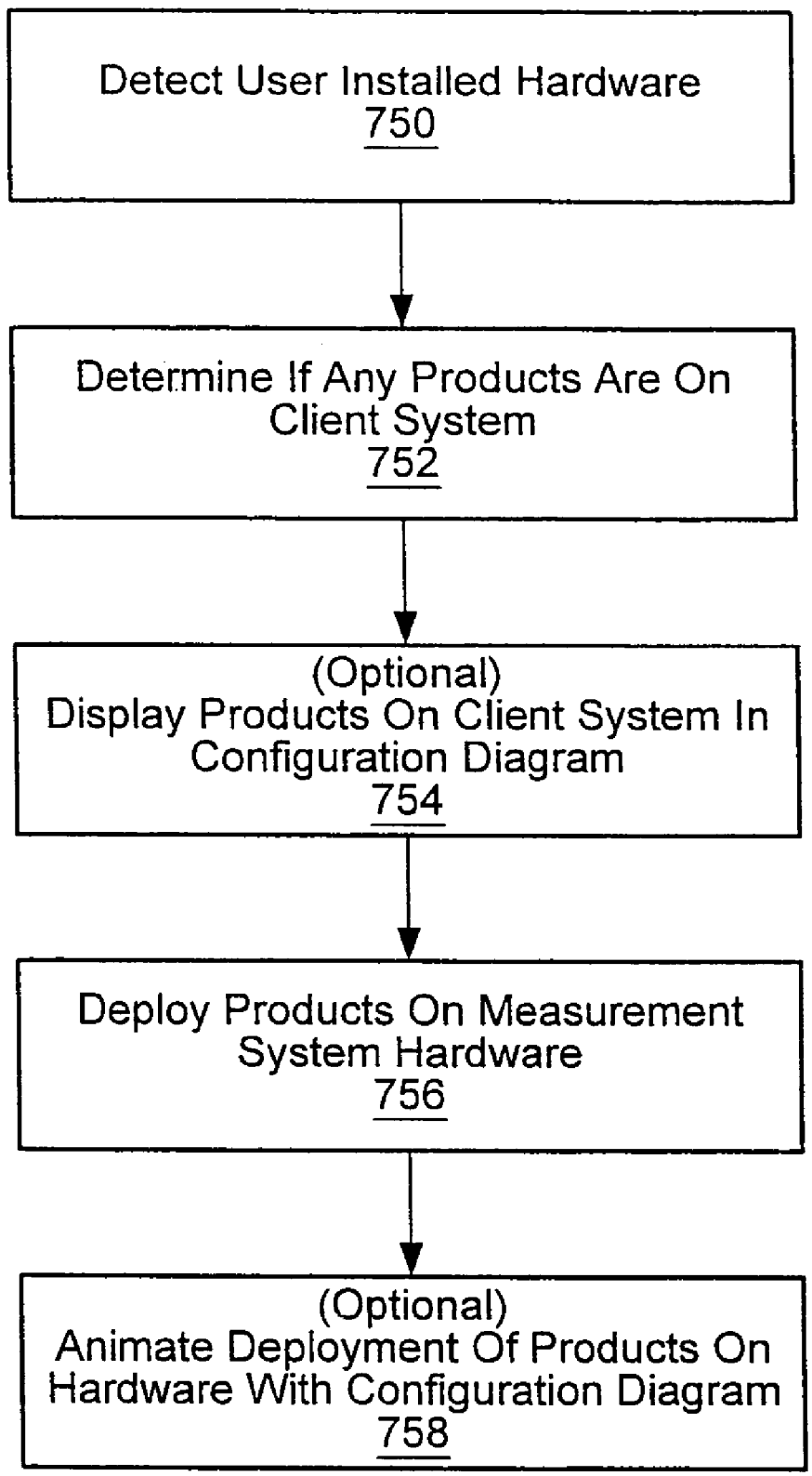

FIGS. 14A–14C—Flowcharts of a Method for Configuring a Measurement System FIGS. 14A–14C flowchart several embodiments of a method for online configuration of a measurement system, where the measurement system may not already have the necessary devices, hardware component(s), and/or software and data, to perform the desired measurement task. It is noted that the flowcharts of FIGS. 14A–14C are exemplary only, and that various steps in the flowcharts of FIGS. 14A–14C may occur concurrently or in different orders than that shown, or may not be performed, as desired. Also, various additional steps may be performed as desired.

As FIGS. 14A (and 14B) shows, in 702 a user may enter one or more requirements for a measurement task. The requirements may be any of various types as described above. Step 702 corresponds to steps 502 and 504 of FIG. 5.

In 704 a database may be queried by the server 103, i.e., the configuration server, for hardware devices that meet the user requirements for the measurement task. As noted above, the server 103 may comprise more than one server computer and/or storage media, and in various embodiments the database may be comprised on any of the server computers or storage media, and may even be distributed among multiple computers or storage media.

As described above in step 508 of FIG. 5, in one embodiment, an expert system may be used to determine the hardware devices that meet the user requirements, where the expert system may analyze the user requirements, e.g., the measurement task specification, and determine the appropriate hardware devices and corresponding software and/or parameters needed to perform the specified measurement task.

In 706 software products (programs and/or configuration data) needed to configure the measurement system to perform the specified measurement task may be obtained or determined. In other words, the server 103 may retrieve and/or generate software products (programs and/or configuration data) for configuring the existing or determined hardware, and possibly other components of the measurement system, including the client computer system 102. Step 706 corresponds to step 508 of FIG. 5. It should be noted that one or more of the software products determined to be needed by the measurement system may be for use with the client computer system 102 or with one or more measurement devices already installed in the measurement system, i.e., already coupled to or comprised in the client computer system 102.

In 708 the server 103 may determine whether the user has device(s) (e.g., reconfigurable hardware) which are necessary to perform the desired task. As one example, the server 103 may determine if the client system has devices operable to be configured with the programs and/or the configuration data determined in 706. The server 103 may programmatically determine the devices in the client system, or the user (or client system) may provide this information.

Then, in 710, the server 103 may determine hardware requirements for the measurement system. In other words, the server 103 may determine which, if any, devices needed to perform the task (according to 706 above), are not present in the user's measurement system, as well as corresponding software products such as programs and/or data for configuring and/or operating the needed devices.

If the user does not already have the necessary measurement devices or reconfigurable hardware, then in 712 the server 103 may provide information and/or a quote to the user indicating the device(s), or a suggestion of proposed devices, and their prices.

Then, in 714, the user may then select the desired devices and elect to purchase these devices. In other words, user input may be received indicating a purchase of the desired devices, such as order information, payment method, etc.

In 716 the hardware specifications for the devices or reconfigurable hardware may be sent to a manufacturing system or operation. For example, the hardware specifications may be transmitted by the configuration server 103 to a manufacturing server operated by the manufacturer.

Figure 16A:
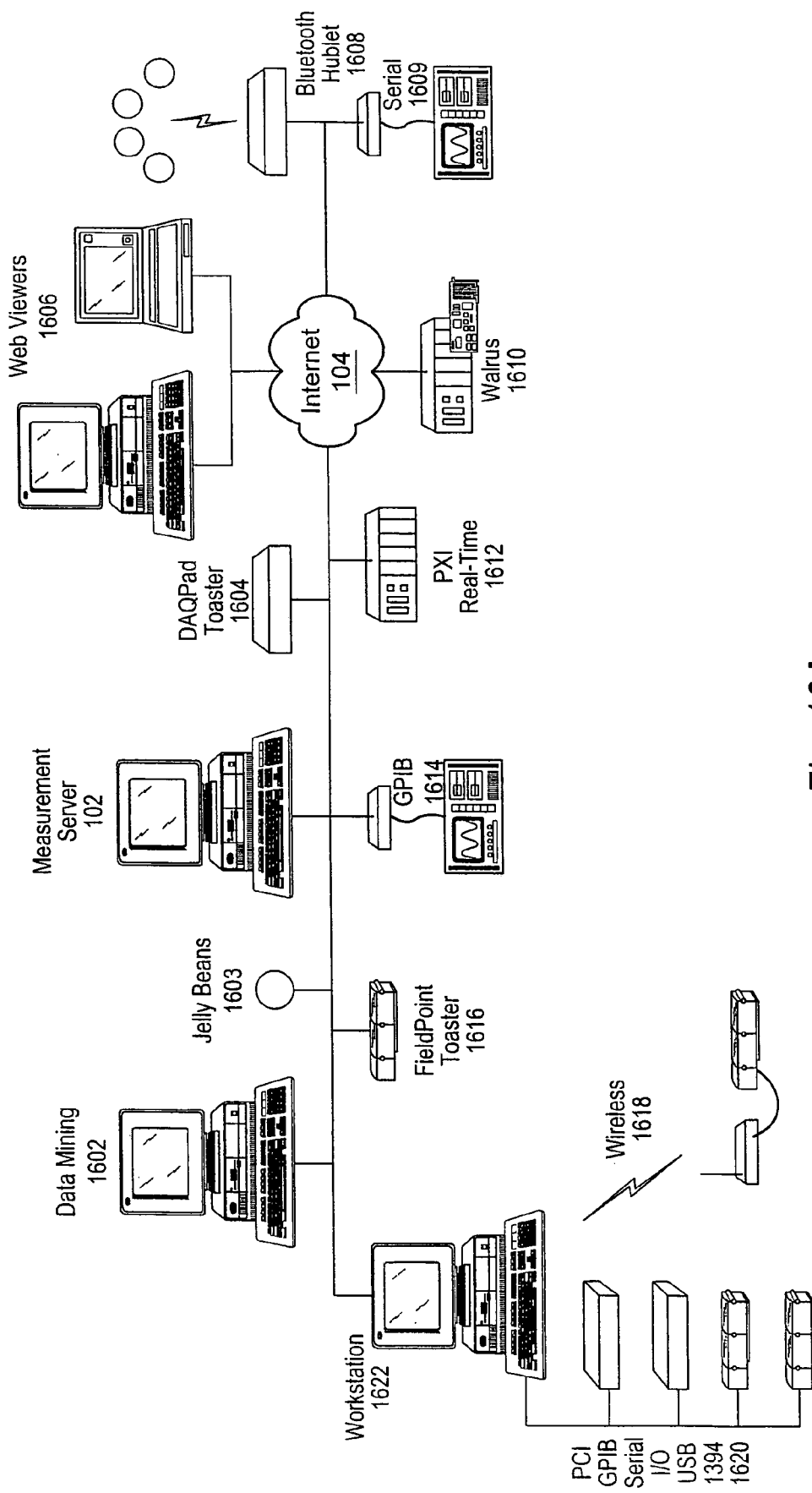
Figure 16B:
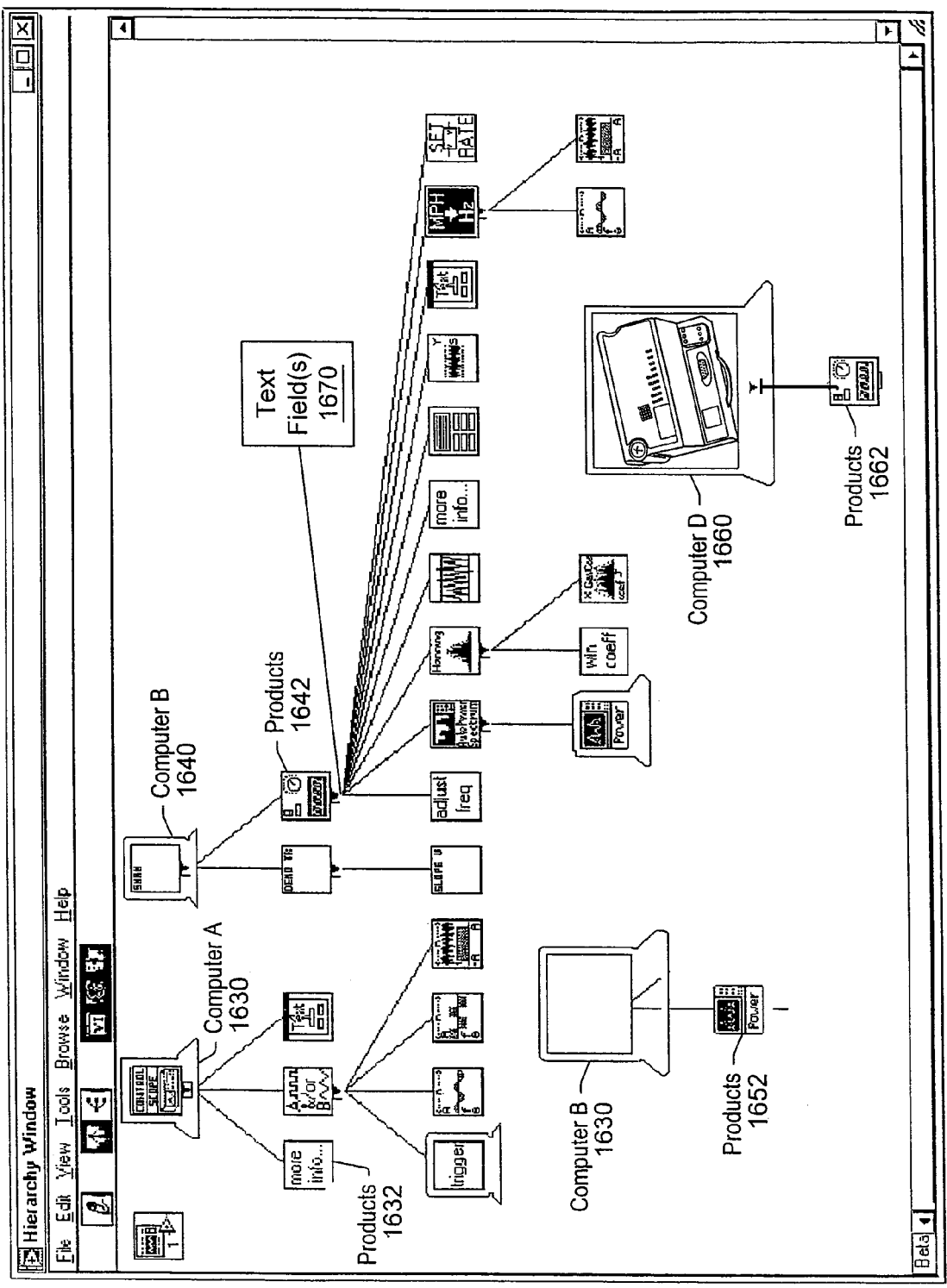

In one embodiment, the server 103 may illustrate the proposed device(s) in a configuration diagram, enabling the user to graphically see his proposed system configuration iconically, as described above. Examples of configuration diagrams are shown in FIGS. 16A and 16B, according to one embodiment. As FIG. 16A shows, the configuration diagram may include various icons representing hardware devices, and optionally, software programs and/or data, in the measurement system. For example, the configuration diagram may illustrate the host computer (i.e., the user's client computer) with a first icon, and may illustrate other devices coupled to the host computer with other respective icons, where lines connecting the icons may represent the couplings between devices. Additionally, as mentioned above, one or more software products, e.g., software programs and/or data, which is stored, installed, or associated, with respective devices may also be represented in the configuration diagram display. In one embodiment, the software products for a given device may be represented by other icons connected to the device icon. In another embodiment, when a user selects a device icon, such as by double-clicking or left/right clicking a mouse or other pointing device on the icon, the software products for the device (i.e., stored, installed, or associated with the device) may be displayed, for example, in a pop-up display or in the form of software product icons proximate to or connected to the device icon.

Thus the user's existing system may be displayed iconically, with device icons representing devices currently present in the system, and additional device icons may be displayed representing devices that are recommended for purchase by the user. The device icons for recommended devices may be have a slightly different appearance (e.g., highlighted in some fashion) to visually indicate that these correspond to the recommended devices.

When the user elects to purchase or receive a hardware device, a virtual device icon may appear on the configuration diagram representing the purchased device. For example, the virtual device icon may be "grayed out" or otherwise have an appearance indicating that the device is not physically present. The virtual device icon may change appearance (to appear like a normal device icon) when the physical device is received and is detected as being coupled to the system.

In 720, the manufacturer may then provide (ship) the specified hardware to the user. In 722 the software products (configuration information and/or programs) may be provided to the client system, e.g., over the network. In 724 the received hardware (and/or existing hardware) may be configured with the received software products. It is noted that the software products (configuration data and/or programs) may be manually or automatically deployed on the devices, either by the client computer system 102 or the server computer system 103 after shipment and receipt. For example, in one embodiment, once the received devices have been coupled to the client computer system 102, the configuration diagram may reflect the new configuration, as mentioned above. In one embodiment, the uninstalled software products for each device may be represented by "gray out" icons proximate or connected to the device. In another embodiment, the software products may be selectable from a palette or menu presented by the GUI. The user may activate, drag and drop, or otherwise indicate configuration of each device with the respective software products, which may initiate configuration of each device with the software product required. Further details of one embodiment of the configuration process for a device are provided with reference to FIG. 14C, described below. Further descriptions of configuration diagrams are also presented below with reference to FIGS. 16A–16C.

In one embodiment, in 720 the hardware device(s) may be provided to the user un-configured. As mentioned above, in this embodiment, in 722 the software products (configuration information and/or programs) may be provided electronically to the client system over the network (the Internet). Thus, where the hardware devices are provided to the user un-configured in 720, in 722 software products (configuration data and/or programs) determined in 706 may be provided to the user. In various embodiments, in 722 the server 103 may download the configuration data and/or programs over the network to the client computer system 102. The software products may also be sent in another fashion, e.g., by sending a physical copy of the data and/or software to the user, e.g., in the form of one or more CDs, tapes, discs, or other media, or by any other means of data transferal. As described above, the software products may comprise any of various types of configuration data and/or programs described above. The software products sent to the client computer system 102 may then be stored, e.g., in a memory medium of the client computer system.

Where the hardware devices are provided to the user un-configured in 720, the client computer system 102 (or the user) may then be responsible for configuring the hardware for the measurement task. As FIG. 14C shows, in one embodiment, installed hardware on the client computer system 102 may be detected, e.g., by Plug and Play software, as indicated by 750. Then, in 752 a determination may be made as to whether any of the needed software products ((programs and/or data) needed to perform the measurement task) are already installed on the system 102. In other words, the system may check for the presence of software products on the client system which are required by the detected installed hardware. If the required software products are not already stored on the client system, they may be downloaded to the client system.

In 754 of FIG. 14C, the software products may optionally be displayed on the client system 102. As also described above, in one embodiment, the software products may be displayed as program or data icons in the configuration display which may be "grayed out" prior to installation. In another embodiment, the icons may be selectable from a palette or menu, and/or dragged and dropped onto the appropriate hardware device icon to initiate deployment on the device(s).

Then, in 756, the software products may be deployed to the measurement system. In other words, the software products may be deployed to the appropriate hardware (and/or software). For example, in one embodiment, the software products received from the server 103 over the network may be temporarily stored on the client system 102, then, when the required hardware device(s) are received and coupled to the system 102, the hardware may be detected, and the software products automatically deployed to the hardware.

Finally, as indicated in 758 of FIG. 14C, the deployment of programs and/or data, e.g., configuration data, may optionally be animated on a configuration diagram shown on the client to visually illustrate to the user how the system is changing. For example, an icon representing data or a program may move across the screen to the target device icon, or, small icons representing portions or components of the software product may stream from the software product icon to the device icon until deployment is complete. Of course, these examples illustrate but a few of the many ways in which the deployment may be represented, and other animated representations of the deployment process are also contemplated.

As one example of the method of FIG. 14C, a configuration program resident on the client computer system may automatically configure received devices for the measurement task when the devices are detected as being installed in the system. Thus, in one embodiment, configuration information and/or programs received from the server 103 over the network may be temporarily stored in the client computer system until the appropriate hardware is received and coupled to the system. When the required hardware device(s) are detected as being received and coupled to the system, the configuration information and/or programs may be automatically installed or deployed at that time. For example, programs may be transferred to the client and registered with a configuration program, such as National Instrument's MAX. When the hardware device is received and coupled to the system, Plug & Play software detects the device, informs the configuration software program, and the programs are automatically deployed on the hardware device at that time. The deployment of configuration information and/or programs may be animated on a configuration diagram shown on the client to visually illustrate to the user how the system is changing, as mentioned above.

Referring back to FIG. 14A, in another embodiment, where the hardware devices are provided to the user unconfigured in 720, the server computer system 103 may be responsible for configuring the hardware for the measurement task. In this embodiment, any software products determined by the server 103 may remain stored on the server 103 until the hardware devices are received and installed on the client computer system 102. The client computer system 102 may notify the server when the devices are received and installed. This notification may be automatically performed, e.g., by a configuration program executing on the client computer system 102 detecting these devices and notifying the server 103. This notification may also be performed manually by the user logging on to the server 103 and providing user input indicating that the devices are installed. The server 103 may then at that time download and deploy the software products (configuration information and/or programs) to the installed devices.

In one embodiment, the manufacturer may configure the device(s) or reconfigurable hardware with various software products (e.g., configuration information and/or programs) to perform the specified measurement task before providing the device(s) to the user. FIG. 14B illustrates one embodiment of this approach. More specifically, after the hardware specifications for the devices or reconfigurable hardware have been sent to the manufacturing system, operation, or manufacturing server, in 716, the manufacturer may configure the devices for the measurement task. For example, the hardware specifications for the devices sent to the manufacturer may include the one or more software products, e.g., programs and/or data, determined in 706. The manufacturer may configure the devices for the measurement task using the received software products. Thus the hardware devices may be shipped to the user pre-configured to perform the measurement task. In one embodiment, the hardware devices may also be shipped to the user pre-configured with various appropriate development tools for creating programs that perform the desired measurement task.

It should be noted that in some embodiments, the configuration server 103 and the manufacturing server may be operated by the same entity. Said another way, the business or enterprise operating the configuration server 103 may also be the manufacturer. In another embodiment, the configuration server 103 and the manufacturing server may be comprised in the same computer system.

Thus, any of various combinations of programs, software and/or data may be provided by the server 103 to the client computer system 102, the user, and/or the manufacturer, for configuring the measurement system to perform the specified measurement task. As mentioned in 510 above (with reference to FIG. 5), digital certificates may be used by one or both of the server 103 and the client computer system 102 to verify the identity of the other before providing the software and/or data. Payment information may also be provided to pay for received devices or software products.

Thus it is noted that the hardware of the measurement system may be configured in any of a number of ways, including manual configuration by the user, pre-configuration (by the manufacturer, as indicated in 552 and 556 above), and programmatic installation and configuration, among others. If the devices are provided by or shipped by a manufacturer in steps 720 and 720A, then the software products (configuration data and/or programs) may be manually or automatically deployed on the devices prior to shipment, or when the devices are received and installed in the system.

Thus, in accordance with the method presented above, a user may specify a measurement task, and configuration software and/or data may be provided to configure the user's measurement system to perform the specified measurement task. In addition, if the user does not have the necessary hardware needed to perform the measurement task, the method may provide the requisite hardware (possibly pre-configured to perform the task) to the user. In other words, the user may purchase the hardware from the vendor, who may then deliver the hardware to the user.

Figure 15A:
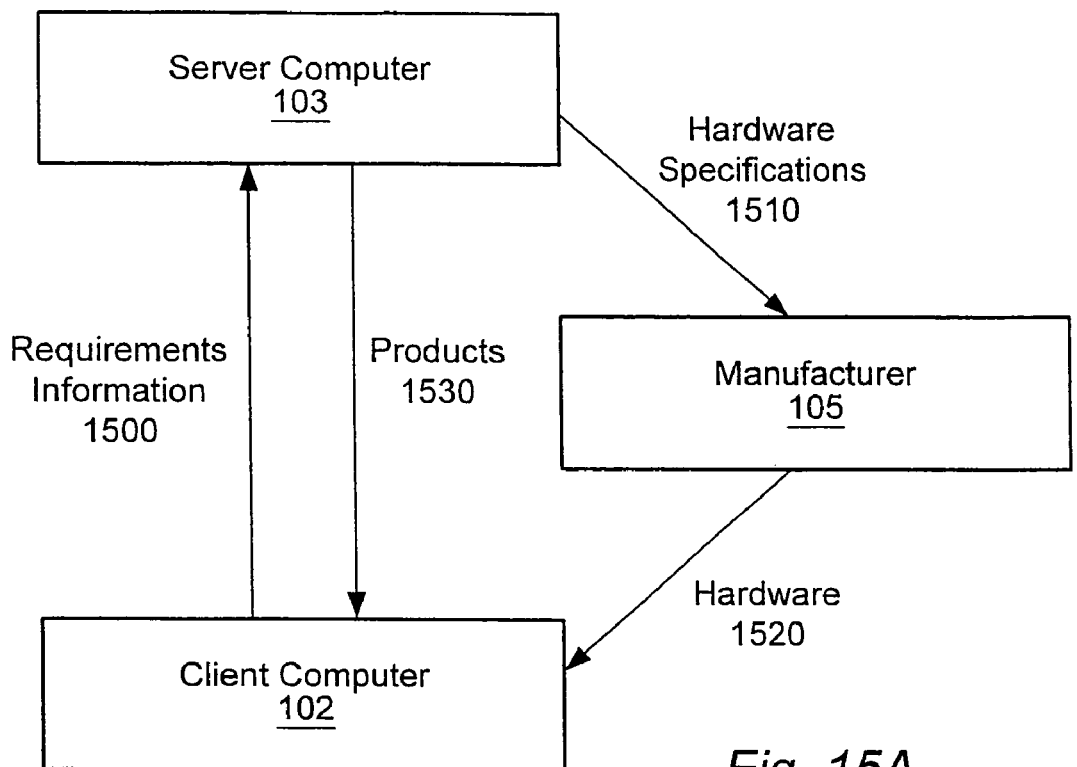
FIGS. 15A and 15B are logistics diagrams for the methods of FIGS. 14A and 14B, respectively.
Figure 15B:
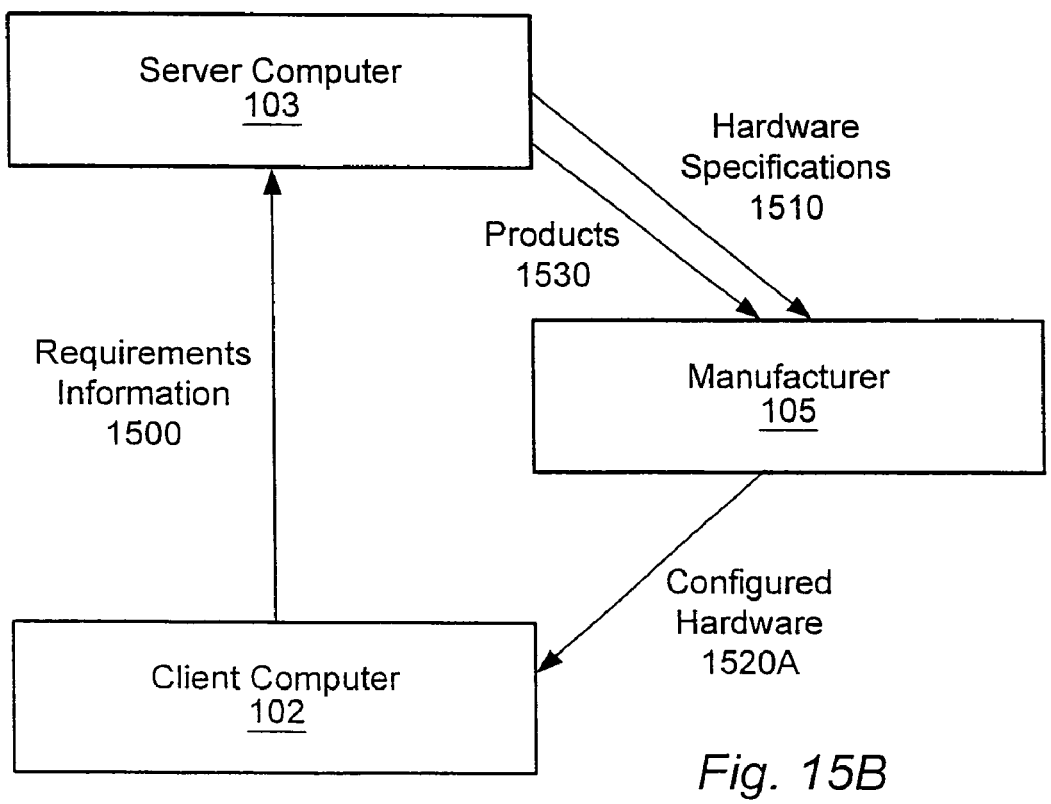

FIGS. 15A and 15B—System Logistics Diagrams

FIGS. 15A and 15B are high level system logistics diagrams for the methods illustrated in FIGS. 14A and 14B, respectively. Each diagram illustrates the flow of software products, hardware, and related information between the server computer 103, a manufacturer 105, and the client computer system 102. As FIG. 15A shows, in the method of FIG. 14A, requirements information 1500 may be transmitted from the client compute system 102 to the server 103, e.g., over a network, as shown. The requirements information 1500 may comprise the requirements themselves, or information from which the requirements may be derived, such as user input to a GUI selecting or specifying options and/or values characterizing a desired measurement task. The server computer 103, after analyzing the received requirements information 1500 and determining appropriate hardware for the task, may send hardware specifications 1510 to the manufacturer 105. In one embodiment, sending the hardware specifications 1510 to the manufacturer 105 comprises sending the hardware specifications 1510 to a manufacturing server coupled to the network. The manufacturer 105, in turn, may send the specified hardware 1520 to the user, i.e., the client computer 102, as shown. Additionally, as FIG. 15A indicates, the server 103 may also send software products 1530 to the client computer 102, e.g., over the network, where the software products may include programs and/or configuration data useable by the client system 102 and/or the specified hardware 1520 in performing the specified task.

FIG. 15B illustrates a similar flow of information, software products, and hardware related to the method of FIG. 14B. In this embodiment, after the server 103 has receive the requirements information 1500, the server 103 may send both the hardware specifications 1510 and the software products 1530 to the manufacturer 105, e.g., to the manufacturing server over the network. The manufacturer 105 may then configure the specified hardware using the software products 1530, and may then send the configured hardware 1520A to the client 102, as shown.

In another embodiment (not shown), a combination of the two diagrams may represent the operation of the method. For example, the server computer 103 may send a first set of software products with the hardware specifications 1510 to the manufacturer 105, which configures the hardware with the first set of software products and sends the configured hardware to the client 102. The server 102 may also send a second set of software products to the client computer, where the second set of software products may include programs and/or data for use with the client computer 102 and/or other hardware or software already installed on the system. For example, the first set of software products, sent to the manufacturer 105, may include hardware configuration information for the specified hardware device, while the second set of software products may include an application, such as a graphical program, which is executable by the client computer system 102 to perform the measurement task in conjunction with the specified, configured, and delivered hardware device, and possibly other hardware or software already configured in the measurement system.

Figure 16C:
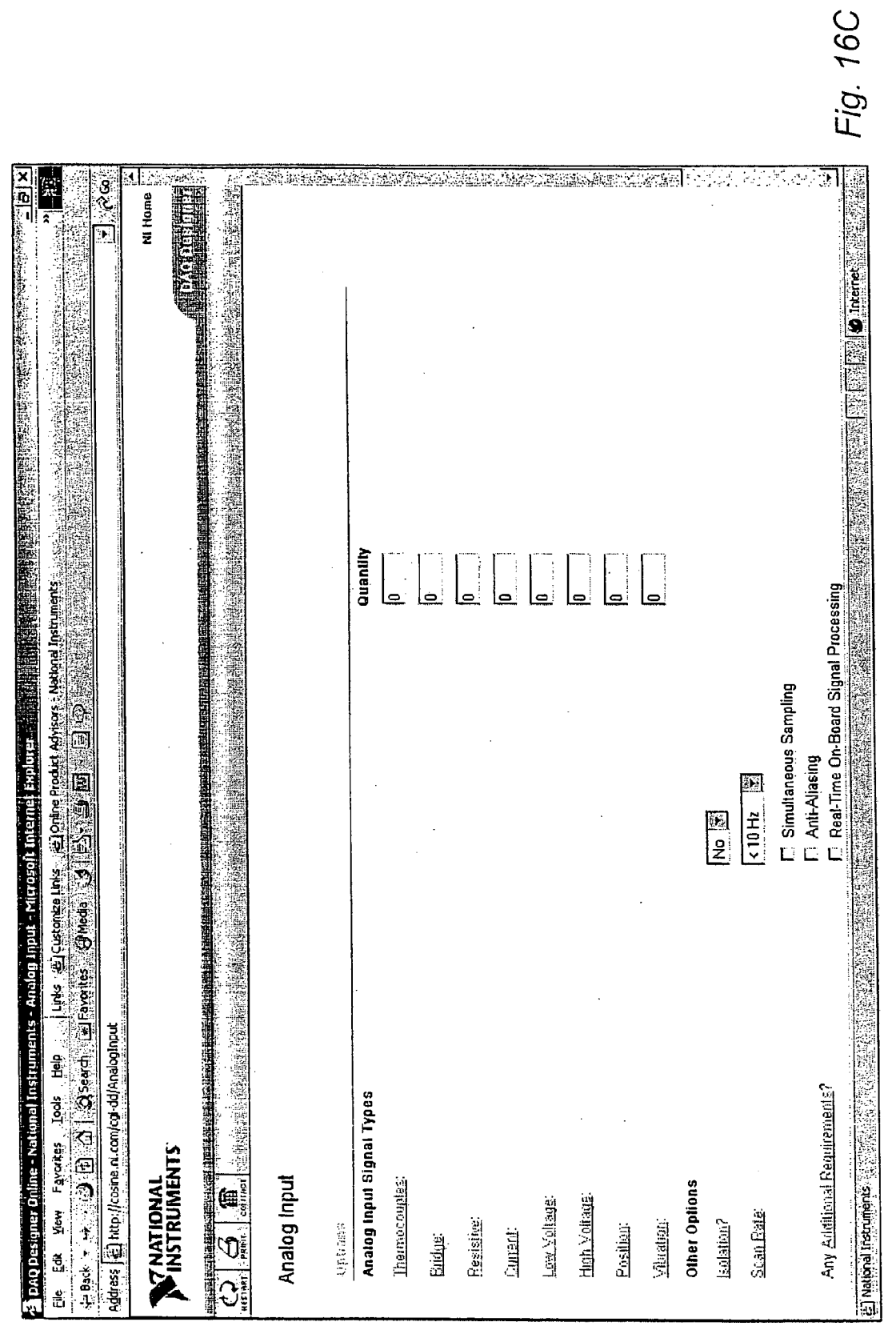

FIGS. 16A–16C—Exemplary Configuration Diagrams

FIGS. 16A–16C illustrate exemplary graphical user interfaces, referred to as configuration diagrams, for deploying software products on devices, according to one embodiment.

As described above, the configuration diagram may include or display device icons that represent the various devices in the distributed system. Each of the device icons preferably has an appearance which corresponds to the device it represents. This allows the viewer to easily view and consider what devices are present in the distributed system. FIG. 16A is a configuration diagram in which a plurality of devices in a networked measurement system are shown, including connections between the devices. As FIG. 16A shows, in this example, a number of computers or workstations, namely, a data mining computer 1602, a measurement server 102, web viewers 1606, and a workstation 1622 are coupled through a network 104 to each other and a variety of other devices and/or instruments, including, for example, GPIB instrument 1614, PXI real-time instrument 1612, FieldPoint Toaster 1616, DAQPad Toaster 1604, and Bluetooth hublet 1608, among others. Thus, in a distributed system which comprises two or more devices connected to each other, such as through a network, a serial or parallel bus, or through wireless means, etc., the system may display a device icon for each of the devices present in the system. For example, a computer system 102 may be represented by a device icon that has the appearance of a computer system, as shown. In a similar manner, other device icons may each have an appearance which is similar to the appearance of the device it represents.

As FIG. 16A also shows, the configuration diagram may include or display connections ("connection icons") such as lines, that are displayed between the various device icons to show the interrelationship or coupling between the respective devices. In this example, the devices are interconnected over the network (the Internet) 104, each comprising a respective Ethernet IP Node 1600. The displayed connections may thus correspond to couplings between the plurality of devices. In one embodiment, the connections that are displayed may be context sensitive to indicate the type of data or phenomena connected between the devices. In other words, the displayed connections between respective device icons have an appearance to visually indicate a type of connection between devices corresponding to the respective device icons. For example, the displayed connections may have an appearance that varies according to one or more of color, size or shading to indicate the type of connection between the devices. For example, the diagram may graphically distinguish between a serial connection 1609 and a wireless connection 1618, as indicated. The appearance of the respective connections may indicate whether the connection is a network connection, internal bus connection, external parallel bus connection, external serial bus connection (e.g., USB or IEEE 1394) or a wireless connection. The appearance of the respective connections may also, or instead, indicate the type of data or material flow between devices. In another embodiment, the configuration diagram may include labels displayed proximate to the connections to visually indicate types of connection, as illustrated by serial connection 1609 and wireless connection 1618.

The user may at least partially create or assemble the configuration diagram, or the configuration diagram may at least partially be automatically or programmatically created, or both. In one embodiment, the configuration diagram may at least partly be automatically or programmatically created by the computer system 102 (or by the server 103) based on an automatic detection of devices coupled to the computer system 102. For example, the server 103 may automatically (programmatically) detect devices present in the measurement system and automatically (programmatically) generate and display a corresponding configuration diagram. The configuration diagram may also be created at least partly based on manual user input. For example, the user may manually drag and drop device icons from a palette or menu to create the configuration diagram.

In one embodiment, the computer system 102 (or the server 103) may automatically detect devices and/or one or more couplings between devices present in the distributed system. The computer system 102 (or the server 103) may then automatically display one or more device icons and connections between respective device icons corresponding to the one or more one or more couplings between devices automatically detected in the distributed system. The connections between device icons that are automatically displayed may be displayed with an appearance indicating the type of detected connection, as described above.

In one embodiment, the user may manually connect device icons on the configuration diagram, such as by using a pointing device. For example, in creating or modifying a configuration diagram, the user may associate, e.g., drag and drop, or otherwise connect, a first device icon to a second device icon. For example, the user may use a pointing device (e.g., a mouse), and may possibly use a "wiring tool" icon on the display, to connect a first device icon to a second device icon. This may cause a connection, e.g., a wire, to appear between the device icons to indicate a relationship between the two (or more) device icons. The connection that is displayed between two device icons may be context sensitive. In other words, the connection that is displayed or created on the display may have a context or appearance that is associated with the types of devices that are being connected. Alternatively, or in addition, the connection that is displayed or created on the display may have a context or appearance that is associated with the type of physical connection (e.g., data or material flow) between the respective devices.

In a measurement application, the device icons may represent the various measurement devices present in the system, such as those shown in FIGS. 2A–2C. For example, there may be device icons present for any one or more of the various measurement or automation devices shown in FIGS. 2A–2C. Thus, as one example, where a computer system is coupled to a PXI chassis that includes a plurality of PXI instrument cards comprised in the chassis, the configuration diagram may include a device icon which represents the computer system, and a device icon which represents each of the respective PXI instruments comprised in the PXI chassis. The configuration diagram may also optionally include a device icon which represents the PXI chassis, with further device icons comprised in the PXI chassis device icon representing each of the respective PXI instrument cards. As another example, where one or more smart sensors are present in the measurement system, icons may be present which represent each of the various smart sensors. In a machine vision application, device icons may be present for a host computer system 102, an image acquisition board 134, and a camera 132, which may be a smart camera as desired. Thus, the configuration diagram graphically displays a plurality of device icons which represent the devices that are present in the system, for which the user is desiring to configure or create an application.

In one embodiment, the configuration diagram may also include icons which represent software products, i.e., programs and/or data, used by the measurement system, referred to as software product icons. FIG. 16B is an example of a configuration diagram which includes icons for a number of computers and related software products. For example, computer A 1630 has software products 1632 stored and/or installed, computer B 1640 has software products 1642, computer C 1650 has software products 1652, and computer D 1660 has software products 1662. As FIG. 16B also shows, in one embodiment, software products themselves may include other software products which may also be shown in the configuration diagram. In other words, the configuration diagram may illustrate components of software products, in addition to the software products. As mentioned above, in one embodiment, user input to a device or software product icon, such as double-clicking on a computer icon, may result in the display of icons representing stored or installed components, e.g., software products or component devices, of the device or software product, thus, the information presented by the configuration diagram may expand (or contract) based on user input. It should be noted that although the configuration diagram of FIG. 16B does not illustrate the interconnections of the hardware in the system, i.e., computers A–D, in various embodiments, a configuration diagram may illustrate both hardware interconnectivity, as shown in the configuration diagram of FIG. 16A, and the software products (and/or devices) associated with, e.g., stored and/or installed in, the hardware in the system, as shown in FIG. 16B.

The user may perform various operations using the configuration diagram. Alternatively, or in addition, the configuration diagram may be used to display or illustrate operations performed by the server 103 and/or the computer system 102.

For example, the user may select various software product icons, e.g., program icons, on the display (within or outside the configuration diagram) and associate them with various device icons (or other program icons) contained in the configuration diagram. This operation of associating program icons with device icons (or other program icons) in the configuration diagram may operate to deploy, either immediately or when the user selects "apply" or the equivalent, the respective programs on the various devices which correspond to the device icons (or within a program relationship or hierarchy represented by the program icons). Deploying a program may comprise moving or copying the program from the server to a respective device, or moving or copying the program between devices, among other types of operations. Various other deployment operations are also contemplated.

The operation of a user associating program icons with device icons (or other program icons) in the configuration diagram may be performed with "drag and drop" techniques, menu-based techniques, dialog box techniques, speech recognition techniques, or other techniques. This operation of associating program icons with device icons (or other program icons) in the configuration diagram operates to deploy, or cause to be deployed, the respective programs on the various devices which correspond to the device icons. Thus, stated another way, if the user selects a first program icon and associates (e.g., drags and drops) this first program icon on to a first device icon which represents a first device, and the user optionally selects "apply", this operates to deploy a first program corresponding to that graphical program icon onto the first device which corresponds to that first device icon. This provides a greatly simplified mechanism for deploying programs on various devices in a distributed system.

As another example, the configuration diagram may be animated to display various deployments of software products (programs and/or configuration information) to various devices in the system, as mentioned above. For example, if the server 103 is deploying a program to a device in the system, the configuration diagram may display the corresponding program icon moving from a server icon representing the server to a device icon corresponding to the device on which the program is being deployed. As another example, if the program is deployed from and by the client computer system to the device, the configuration diagram may display the corresponding program icon moving from a computer icon representing the client computer to a device icon corresponding to the device.

The configuration diagram is preferably updated in real time as the user (or client computer 102 or server 103) performs iconic or deployment operations, such as the deployment operations discussed above. Thus the configuration diagram may display an iconic relationship view of the distributed programs and distributed devices as the user associates (e.g., drags and drops) the program icons on the device icons, the program icons on other program icons, the device icons on other device icons, etc., or as the server deploys programs. For example, as the user drags and drops program icons (e.g., from the configuration diagram) on to various device icons on the configuration diagram, or as the server 103 deploys programs, the system may operate to display the relationship (e.g., hierarchy) of programs proximate to, e.g., underneath, the respective device icon to where they have been deployed, as displayed in FIG. 16B.

In one embodiment, when the user associates program icons with various device icons contained in the configuration diagram, the configuration diagram is immediately updated accordingly, but this operation of associating does not operate to deploy programs at that time. Rather, the user may be required to select an "apply" feature for the deployment to actually occur. This allows the user to view various configuration diagram options before a deployment actually occurs. In another embodiment, a preview window may be employed to allow the user to view proposed changes to a configuration diagram prior to the change being committed or applied.

In one embodiment, when the user provides input to purchase a hardware product from a vendor, the server 103 may cause the client computer system configuration diagram to display a device icon, e.g., a virtual device icon, where the virtual device icon has an alternate or modified appearance (possibly "grayed out") to indicate the device icon represents a virtual or non-present device. Program icons that are deployed to this virtual device icon may be stored in the computer system and deployed to the device when the device is received and installed in the system.

In addition to device icons and software product icons, the configuration diagram may include one or more textual information or numeric fields 1670, as also shown in FIG. 16B. The text field(s) 1670 may display configuration information related to a device or software product, or may allow the user to modify configuration data for the device or software product. One embodiment of a textual display and entry panel is illustrated in FIG. 16C, described below.

In one embodiment, user input to a device or software product icon, such as, for example, right-clicking on a device or software product icon, may result in the display of configuration information, e.g., the text field 1670. For example, if the use right-clicks on an instrument icon, a pop-up window may be displayed showing the instruments current configuration parameters. In one embodiment, a GUI panel may be displayed which not only presents the parameter values, but also allows the user to modify the values. FIG. 16C illustrates an example configuration panel for displaying and configuring analog input parameters for a measurement system or task. As FIG. 16C shows, one or more parameter names and corresponding entry fields may be displayed in the configuration panel. It is noted that configuration panels (or other GUI constructs) may be provided for both hardware devices and software programs and data. Thus, the configuration diagram may also function as an active configuration interface to the measurement system.

Thus, the above systems and methods may allow a user to access a server over a network and specify a desired task, such as a measurement task, and receive configuration software and/or data, e.g., hardware and/or software specifications, usable to configure the user's measurement system hardware (and/or software) to perform the desired task. Additionally, if the user does not have the hardware required to perform the task, the hardware specifications may be sent to a manufacturer, who may then send the required hardware to the user. The configuration software and/or data may be provided to the user for configuring the hardware. The hardware may be reconfigurable hardware, such as an FPGA or a processor/memory based device. In one embodiment, the required hardware may be pre-configured (using the configuration software and/or data) to perform the task before being sent to the user. In another embodiment, the system and method may provide a graphical program to the user in response to receiving the user's task specification, where the graphical program may be usable by the measurement system to perform the task.

The systems and methods described may benefit e-commerce vendors as well as e-commerce users or customers, by increasing the reliability, consistency, and correctness of measurement system configuration with respect to user task requirements, as well as substantially decreasing the effort required from the user to implement the task, i.e., in the selection, configuration and ordering of measurement system devices and software products using the Internet.

EXAMPLE APPLICATIONS

The following describes examples of the use of various embodiments of the present invention. As one example, presume that the user operates a measurement system wherein the measurement system comprises a computer system (client computer system) and a reconfigurable instrument or reconfigurable measurement device coupled to or comprised in the computer system. For example, the measurement system may comprise a computer system and a reconfigurable measurement device card or reconfigurable instrument card that is comprised in a PCI slot of the computer system, e.g., as shown in FIG. 2C. The user's computer system may also include web browser software for browsing the Internet.

The user may use the computer system to connect to the Internet and connect to a server 103 as described herein. For example, the web browser on the user's client computer system may connect to a web server at National Instruments Corporation. The client and/or the server may execute graphical user interface software which allows the user to enter various user input into the client computer system. This user input may specify various requirements of the measurement function or measurement task the user desires to create or configure. The user may enter this user input using a mouse, keyboard, speech recognition or other means. In response to this user input, information may be provided to the remote server, e.g., at National Instruments Corporation.

The client computer system may execute software which receives this user input and generates a more detailed specification or a specification formatted in a particular way. In another embodiment, the user input provided by the user is provided directly to the server computer system. For example, the server computer system may be executing the GUI software and the user input may be provided directly to the server. Therefore, the measurement function or measurement task requirements input by the user are provided in some form to the server 103.

The server 103 receives these requirements and may perform any of various operations. In one embodiment, the server 103 may query the measurement system or client computer system to determine what measurement devices and other hardware and/or software are currently configured in the user's measurement system. In another embodiment, the user may also provide input with respect to the measurement devices and other hardware and/or software that are currently configured or in use in the user's measurement system.

The server 103 receives the requirements for the measurement task from the user and may operate to select and/or programmatically generate a program that is suited for the user's task. In one embodiment, the server may simply select from one or more various pre-existing programs that have been previously created. In another embodiment, the server 103 may programmatically generate one or more programs "from scratch" without using any pre-existing programs. In another embodiment, the server 103 may select among one or more various pre-existing programs and may further programmatically generate one or more other programs (and/or modify one or more existing programs) to generate a final set of one or more programs that accomplishes at least a portion of or all of the user's specified measurement task or measurement function.

As one example, the server 103 may receive the requirements from the user and programmatically generate a graphical program such as a LabVIEW VI in response to the requirements. This LabVIEW VI may then be transferred to the client computer system to configure the client computer system or to one of the measurement devices in the measurement system. This LabVIEW VI may instead be transferred to the reconfigurable measurement device coupled to or comprised in the computer system. The reconfigurable measurement device may have an IP address which allows the server 103 to directly configure the reconfigurable measurement device. Alternatively, the server 103 may programmatically generate a graphical program and then convert this graphical program into a hardware configuration program. This hardware configuration program may then be provided to an FPGA comprised on the reconfigurable instrument of the user.

If the reconfigurable measurement device comprised in the client computer system includes a processor and memory, then the server 103 may provide a graphical program or a compiled executable program to the memory of the measurement device to configure the reconfigurable measurement device.

In one embodiment, the reconfigurable measurement device includes its own IP address which the user may provide or which the server may query and automatically determine, and the server may be operable to automatically and programmatically configure the reconfigurable measurement device with a program of the appropriate type based on the user's requirements. Thus the reconfigurable measurement device may have an IP address which allows the server 103 to directly configure the reconfigurable measurement device.

As another example, the measurement system may include a computer system coupled to a PXI chassis. The PXI chassis may include a first reconfigurable measurement device that includes a processor and memory and a second reconfigurable measurement device that includes an FPGA. The user may provide user input to the client computer, and various measurement function or measurement task requirements are then provided to the server 103 as described above. The server 103 may then generate a software program, e.g., in source or executable form (e.g., a graphical program) that is provided to the reconfigurable measurement device which includes the processor and memory. The server 103 may also provide a hardware configuration program and configure the hardware configuration program on the FPGA in the second reconfigurable measurement device. This operation of the server 103 configuring the reconfigurable measurement devices on the user's system may happen invisibly to the user, or possibly may be indicated to the user with an animated configuration diagram. The server 103 may also provide a notice to the user that configuration is complete and operation may proceed.

In one embodiment of the invention, the server operates to programmatically generate graphical programs and then convert these generated graphical programs to different program types depending on the type of measurement devices present in the user's system.

As another example, assume the user has a computer system, one or more interface cards comprised in the computer system, such as data acquisition cards, and one or more smart sensors coupled to the data acquisition card(s). The smart sensors may include either a processor and memory or an FPGA. The user may use the methods described above to input various requirements, and the server 103 may be operable to generate and/or transfer one or more programs that are provided through the computer system to directly configure the one or more smart sensors to perform a desired function. In one embodiment, the server 103 provides the programs to the computer system, and the user executes a received executable (or client-based configuration software) which causes the programs to be deployed on to the smart sensors. In another embodiment, the server 103 directly deploys respective programs on to the smart sensors without any further involvement from the user. For example, each of the smart sensors may have an IP address for direct communication.

In each of the above examples, the user may operate to input requirements and then receive programs that are deployed on his respective measurement devices. In an electronic commerce embodiment, the user may then submit payment information, such as a credit card number and account number or other similar types of payment information which pays the e-commerce vendor which operates the server 103 for these downloaded programs. The above methods provide a much more convenient way to select, purchase, and install measurement solutions, and other solutions.

Remote Debugging Applications

In one embodiment of the invention, when the user has a configured measurement system and is executing one or more graphical programs, the user may desire to have an expert at a remote location debug operation of a portion or all of the measurement system. In one embodiment, a measurement device in the user's measurement system may transfer information regarding the block diagram that is contained within the user's system. This block diagram information may be transferred to a server, causing the block diagram executing in the measurement device to be graphically displayed on the server computer system or a separate computer system. An expert located at the remote site may view the displayed block diagram as the respective block diagram implement executes in a measurement device that is remote from where the expert is viewing the block diagram. The expert may then use the block diagram as a GUI to implement various debugging operations such as single stepping, break points, and execution highlighting. Thus, a remote expert can graphically view a block diagram that is executing at a remote location from the expert, and the expert may be operable to provide or apply various debugging techniques to examine the block diagram as it executes at the remote location.

Programmatically Analyzing and Modifying a Graphical Program

In one embodiment, the server 103 may analyze a graphical program on the client system 102 and may programmatically make changes to the graphical program. For example, the server 103 may receive information on a desired measurement task, and then may programmatically makes changes to the graphical program to modify the graphical program to perform the indicated measurement task. The server 103 may also programmatically analyze a graphical program and then make suggestions or provide DLLs or other VIs for the user to incorporate into the graphical program, based on the specified measurement task.

Software Simulation of a Device or Hardware Configuration Program

If the user elects to purchase or receive a hardware configuration program, e.g., a FPGA bit file, or a hardware device (e.g., a measurement device), during the interim (before the hardware configuration program or hardware device is provided to the client system) the server 103 may send the client system a software program that may be used to simulate or emulate operation of the hardware configuration program or hardware device that the user has ordered. Thus the user may operate the client system, using the software program executing on the client computer CPU to perform the function of the hardware configuration program (e.g., the FPGA bitfile) or hardware device that will be provided later. A configuration diagram may temporarily display a software program icon to indicate that this operation is being performed. Alternatively, the configuration diagram may temporarily display a device icon or program icon, corresponding to the hardware device or bit file, respectively, with an altered or modified appearance to indicate that this function is being simulated by a software program. Once the hardware configuration program or hardware device is received by the client system, use of the software program may be discontinued. Also, the configuration diagram may change appropriately. Thus, in one embodiment, the software products downloaded to the client computer system may include simulation (or emulation) software which is operable to "stand in" for the ordered hardware configuration program or device in the measurement system until the hardware configuration program or device is delivered and installed.

Network-Based Deployment Analysis and Modification of Programs for Online Configuration of a System In one embodiment, the client system may provide information regarding its current configuration, including devices present and programs, to the server 103 for analysis. For example, the user can provide a snapshot of the configuration of the measurement system and the software programs (e.g., a LabVIEW VI) present in the system. The server 103 may also operate to programmatically obtain this information, with the user's permission. The server 103 may receive this information and execute software to make proposed suggestions to the user or actual modifications to the client system's configuration or programs. For example, the server 103 may analyze the configuration and modify the programs and provide a modified configuration back to the client system. The modified configuration or programs may then be returned to the client system for use. The server 103 may thus iteratively examine the user's system and make iterative changes to the system, as needed. Thus the client 102 and the server 103 can communicate in a bi-directional, iterative fashion.

Network-Based System which Provides A Database of Measurement Solutions

In one embodiment, the server 103 may operate to maintain a database of solutions which users may browse and access. Exemplary configuration diagrams, programs, and other information for various typical systems may be stored in the database. In addition, when the server 103 receives requirements or task specifications from various users and generates solutions, these solutions may also be stored in the database and be accessible to subsequent users. The solutions stored in the database may comprise configuration diagrams, configuration information and/or programs, as well as other information. The database may also store requirements provided by prior users and the corresponding solutions generated in response to those requirements. Subsequent users may browse this database for solutions to their desired tasks, possibly searching based on requirements, solution type, or other criteria. The server 103 may also operate to receive requirements from a user and first operate to search the database for solutions. The server 103 may programmatically generate a solution only if a pre-existing solution is not found in the database. Thus, in one embodiment, the system may allow the user to request and purchase a complete (or partial) solution for a task, e.g., a measurement task, including hardware and software, where the solution has already been tested and debugged by prior users.

Network-Based System for Selecting or Purchasing Products

In one embodiment, the user can connect to the server 103 and access a database of solutions such as described above. For example, the server 103 may present a palette of icons representing items such as configuration diagrams, hardware devices, programs, and/or configuration information. The user can select an icon representing a configuration diagram to indicate a desire to purchase hardware devices, programs, and/or configuration information required by or used in the configuration diagram. The user can also select icons representing hardware devices, programs, and/or configuration information to add to indicate a desired purchase. In one embodiment, the client system may display a configuration diagram of the current client system configuration, and the server may display a palette of icons representing items such as hardware devices, programs, and/or configuration information. The user can then associate (e.g., drag and drop) hardware device icons from the palette displayed on the server onto the configuration diagram displayed on the client system. This may indicate that the user desires to purchase these hardware products. The user can also drag and drop program icons (or configuration information icons) from the server palette onto the configuration diagram to deploy programs (or configuration information) from the server 103 on to devices in the client system. The user may also submit purchasing information to pay for purchased devices or programs.

Network-Based System for Specifying a Desired System Using a Configuration Diagram In one embodiment, the user may draw a configuration diagram of a desired system and send the configuration diagram to the server 103. The server 103 may analyze the configuration diagram and determine appropriate hardware devices, software products and pricing information, which may then be transmitted back to the user of the client system. For example, the names of the devices, software products and pricing information may appear as textual or graphical data on the configuration diagram that the user may view (e.g., the prices of devices may appear below their respective device icons). If programs are suggested for purchase, program icons may appear on the configuration diagram. The user of the client system may then choose the devices or software products desired for purchase. As a result, devices or programs represented in the configuration diagram may be shipped or electronically transferred to the user.

In one embodiment, when the user elects to purchase or receive a hardware device, a virtual device icon may appear on the configuration diagram representing the purchased device. For example, the virtual device icon may be "grayed out". The virtual device icon may change appearance (e.g., to appear like a normal device icon) when the physical device is received and coupled to the system.

In one embodiment, configuration information and/or programs received from the server over the network may be temporarily stored until the appropriate hardware is received and coupled to the system. When the required hardware device(s) are received and coupled to the system, the configuration information and/or programs may be automatically installed at that time. For example, programs may be transferred to the client and stored in a database, such as National Instruments's Measurement and Automation explorer (MAX). When the hardware device is received and coupled to the system, Plug & Play (or an equivalent function) may detect the device, and the programs may be automatically deployed on the hardware device at that time.

Network-Based System for Analyzing a Client System and Generating a Configuration Diagram which Describes the Client System In one embodiment, a server may analyze a client measurement system and generate a configuration diagram representing the client measurement system. The configuration diagram may be displayed on the client system display. The user may use the configuration diagram for documentation purposes or for modifying the system, adding programs, etc.

Animation of a Configuration Diagram to Visually Indicate Network-Based Deployment of Programs In one embodiment, a server may animate a configuration diagram displayed on the client system to visually illustrate to the user the deployment of measurement devices and/or software products to the measurement system, e.g., to graphically indicate how the server is modifying the client measurement system and programs. Thus, when the server deploys programs on devices, the configuration diagram displayed on the client system may be animated to visually indicate the deployment. For example, a program icon may move on the screen from a server icon representing the server to the appropriate device icon to visually indicate that the program is being deployed on a respective device.

Network-Based Deployment, Analysis and Modification of Programs for Online Configuration of a System In one embodiment, a client measurement system may send information regarding the current configuration and programs to a server; the server may modify the programs and send the modified programs back to the client. Thus the client and server may communicate in a bi-directional, iterative fashion, allowing a user to incrementally or iteratively configure the measurement system for specified tasks or operations.

Network-Based System for Specifying a Desired System Using a Configuration Diagram In one embodiment, the user may draw a configuration diagram of a desired system and send the configuration diagram to a fulfillment server. The server may analyze the configuration diagram and determine appropriate software products and pricing information, which may then be transmitted back to the user of the client system. For example, the names of the software products and pricing information may appear as textual or graphical data on the configuration diagram that the user may view (e.g., the prices of devices may appear below their respective device icons). If programs are suggested for purchase, program icons may appear on the configuration diagram. The user of the client system may then choose the software products desired for purchase. As a result, devices or programs represented in the configuration diagram may be shipped or electronically transferred to the user.

Network-Based System for Generating a Hardware Configuration Program Based on a Received Graphical Program In one embodiment, the client system may send a program (such as a LabVIEW graphical program) to the server. The server may generate a hardware configuration program based on the program, and send the generated hardware configuration program back to the client for deployment. In another embodiment, the server may deploy the hardware configuration program directly on the device.

Thus, embodiments of the present invention may provide a number of benefits to e-commerce vendors as well as e-commerce users or customers. First, the system and method may increase the amount of revenue for e-commerce vendors through increased closure and/or volume of purchases. In addition, the system and method may decrease the number of product returns due to incorrectly configured products. The present invention may also provide a number of benefits to the user, including ease of use in the selection, configuration and ordering of products using the Internet, specifically measurement system products.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for configuring a measurement system, comprising:
    a server computer receiving information regarding a measurement system over a wide area network (WAN);
    the server computer determining one or more measurement devices in response to the information;
    determining if a user does not have at least one of the determined one or more measurement devices by:
        determining installed measurement devices in the measurement system over the wide area network;
        comparing the determined installed measurement devices to the determined one or more measurement devices to determine if the at least one measurement device is not installed in the measurement system;
    if the user does not have the at least one measurement device:
        providing the at least one measurement device of the one or more measurement devices to the user.

2. The method of claim 1, further comprising:
    the server computer determining one or more measurement software products in response to the information; and
    providing at least one measurement software product of the one or more measurement software products to the user.

3. The method of claim 2, wherein said providing the at least one measurement software product to the user comprises:
    determining if the user does not have the at least one measurement software product by:

determining installed measurement software products in the measurement system over the wide area network;

comparing the determined installed measurement software products to the one or more measurement software products to determine if the at least one measurement software product is not installed in the measurement system;

if the user does not have the at least one measurement software product:

providing the at least one measurement software product to the user.

4. The method of claim 2, wherein said providing the at least one measurement device of the one or more measurement devices to the user and said providing the at least one measurement software product to the user comprises:

configuring the at least one measurement hardware device with the at least one measurement software product; and sending the configured at least one measurement device to the user.

5. The method of claim 4, wherein said configuring and said sending are performed by a manufacturer.

6. The method of claim 5, wherein the manufacturer includes a manufacturing server that is coupled to a configuration server over the network, the method further comprising:

the configuration server downloading information indicating the at least one measurement device and the at least one measurement software product to the manufacturing server over the network.

7. The method of claim 2, wherein the at least one measurement device comprises a programmable hardware element; and wherein the at least one measurement software product includes a hardware configuration program which is usable to configure the programmable hardware element of the at least one measurement device.

8. The method of claim 2, wherein the at least one measurement device comprises a processor and a memory; and wherein the at least one measurement software product comprises a software program which is operable to be stored in the memory and executed by the processor.

9. The method of claim 2, wherein the measurement system includes a client computer system, wherein the one or more measurement software products include first measurement software products and second measurement software products, wherein the first measurement software products are useable by the manufacturer to configure the at least one measurement device, and wherein the second measurement software products include one or more of:

configuration data and configuration software which is executable by the client computer system to configure one or more of the client computer system and one or more application programs with the configuration data;

application software which is executable by the client computer system to operate in conjunction with the one or more measurement devices;

a graphical program which is executable by the client computer system to operate in conjunction with the one or more measurement devices;

machine executable code which is executable by the client computer system to operate in conjunction with the one or more measurement devices;

text based code which is compilable and executable, or interpretable, by the client computer system to operate in conjunction with the one or more measurement devices;

a self-executing program file which operates in conjunction with the one or more measurement devices; and a self-executing program file which operates to configure the client computer system with configuration information, the method further comprising:

providing the second measurement software products to the client computer system.

10. The method of claim 2, wherein the measurement system includes a client computer system, wherein said providing the at least one measurement software product to the user comprises providing the at least one measurement software product to the client computer system over the WAN, and wherein the one or more measurement software products comprise a hardware configuration program, the method further comprising:

prior to said providing the at least one measurement software product to the client computer system, providing a simulation program which simulates operation of the hardware configuration program to the client computer system;

wherein the simulation program is executable by the client computer system to perform at least a portion of the functionality of the hardware configuration program; and wherein use of the software program is discontinued when the hardware configuration program is deployed in the measurement system.

11. The method of claim 10, the method further comprising:

displaying a configuration diagram on a display of the client computer system which iconically illustrates the measurement system, wherein said displaying comprises displaying one or more device icons corresponding respectively to one or more measurement devices in the measurement system, and/or one or more measurement software product icons corresponding respectively to one or more measurement software products in the measurement system;

wherein said displaying further comprises one or more of:

displaying a software program icon representing the simulation program, wherein after the at least one measurement device is deployed in the measurement system, the software program icon is replaced with a device icon representing the at least one measurement device; and displaying a device icon representing the simulation program, wherein the device icon is modified to indicate that functions of the at least one measurement device are performed by the simulation program, wherein after the at least one measurement device is deployed in the measurement system, the modified device icon is replaced with a device icon representing the at least one measurement device.

12. The method of claim 2, wherein the measurement system comprises a client computer system, the method further comprising:

displaying a graphical user interface (GUI) on a display of the client computer system which iconically illustrates the measurement system; and receiving user input to the GUI specifying one or more measurement devices in the measurement system to be configured by the one or more measurement software products.

13. The method of claim 12, wherein said displaying the graphical user interface (GUI) on the display of the client computer system which iconically illustrates the measurement system comprises:
displaying one or more device icons corresponding respectively to one or more measurement devices in the measurement system; and
displaying connections between the one or more device icons, wherein the displayed connections correspond to couplings between the one or more measurement devices in the measurement system.

14. The method of claim 12, further comprising:
displaying one or more measurement software product icons associated with the one or more measurement software products; and
associating at least one measurement software product icon with at least one device icon in response to user input, wherein the at least one measurement software product icon corresponds to a first measurement software product, wherein the at least one device icon corresponds to a first measurement device, wherein said associating operates to configure the first measurement device with the first measurement software product.

15. The method of claim 2, wherein the measurement system comprises a client computer system, the method further comprising:
displaying a graphical user interface (GUI) on a display of the client computer system which iconically illustrates the measurement system, wherein the GUI comprises a configuration diagram of the measurement system;
wherein said displaying includes displaying information representing the at least one measurement device and the at least one measurement software product to the user as proposed hardware and/or software products for the measurement system.

16. The method of claim 15, the method further comprising:
receiving user input to the GUI specifying purchase of the at least one measurement device and/or measurement software product; and
modifying the display of the information representing the at least one measurement device and/or the at least one measurement software product to reflect the purchase.

17. The method of claim 16, wherein the modified information representing the at least one measurement device and/or the at least one measurement software product reflecting the purchase comprises a virtual device icon and/or a virtual software product icon, the method further comprising:
deploying the at least one measurement device and/or measurement software product to the measurement system; and
modifying the display of the information representing the at least one measurement device and/or the at least one measurement software product to reflect said deploying.

18. The method of claim 1,
wherein the measurement system includes a client computer system, the method further comprising:
prior to the manufacturer sending the at least one measurement device to the user, providing a simulation program to the client system, wherein the software program simulates operation of the at least one measurement device;
wherein the simulation program is executable by the client computer system to perform at least a portion of the functionality of the at least one measurement device; and
wherein use of the simulation program is discontinued when the at least one measurement device is deployed in the measurement system.

19. The method of claim 2, further comprising:
receiving user input specifying payment information for the at least one measurement device and/or the at least one measurement software product.

20. The method of claim 2, wherein said determining one or more measurement software products comprises programmatically generating the one or more measurement software products based on the information.

21. The method of claim 2, wherein the one or more measurement software products comprise one or more of:
a software program;
configuration information, wherein the configuration information is useable to configure at least a portion of the measurement system; and
a hardware configuration program, wherein the hardware configuration program is useable to configure a programmable hardware element in the measurement system.

22. The method of claim 2, wherein said providing the at least one measurement software product to the user comprises:
providing the at least one measurement software product to the user over the WAN.

23. The method of claim 1, wherein said receiving information regarding the measurement system comprises:
a client computer receiving user input indicating the information regarding the measurement system; and
the client computer providing the information to a server in response to the received user input to the client computer.

24. The method of claim 1, wherein said receiving information regarding the measurement system comprises:
a client computer receiving user input indicating the information regarding the measurement system; and
the client computer providing the user input indicating the information regarding the measurement system to a server in response to the received user input to the client computer.

25. A computer-readable medium which stores program instructions for configuring a measurement system, wherein the program instructions are computer-executable to perform:
a server computer receiving information regarding a measurement system over a wide area network (WAN);
the server computer determining one or more measurement devices in response to the information;
determining if a user does not have at least one of the determined one or more measurement devices by:
determining installed measurement devices in the measurement system over the wide area network;
comparing the determined installed measurement devices to the determined one or more measurement devices to determine if the at least one measurement device is not installed in the measurement system;
if the user does not have the at least one measurement device:
providing the at least one measurement device of the one or more measurement devices to the user.

26. A system, comprising:
one or more processors; and one or more memory media coupled to the one or more processors, wherein the one or more memory media store program instructions executable by the one or more processors to configure a measurement device;

wherein at least one of the one or more processors and at least one of the one or more memory media are comprised in a server computer, and wherein the program instructions are executable by the server computer to:

receive information regarding a measurement system over a wide area network (WAN) from a user;

determine one or more measurement devices in response to the information;

wherein the program instructions are further computer-executable by the one or more processors to:

determine if the user does not have at least one of the determined one or more measurement devices, wherein, to determine if the user does not have at least one of the determined one or more measurement devices the program instructions are further computer-executable to:

determine installed measurement devices in the measurement system;

compare the determined installed measurement devices to the determined one or more measurement devices to determine if the at least one measurement device is not installed in the measurement system;

if the user does not have the at least one measurement device:

initiate provision of the at least one measurement device of the one or more measurement devices to the user.

27. A method for configuring a system, comprising:

a server computer receiving information regarding a system over a wide area network (WAN);

the server computer determining one or more devices in response to the information;

determining if a user does not have at least one of the determined one or more devices by:

determining installed devices in the system over the wide area network;

comparing the determined installed devices to the determined one or more devices to determine if the at least one device is not installed in the system;

if the user does not have the at least one device:

providing the at least one device of the one or more devices to the user.

28. A method for configuring a measurement system, comprising:

a server computer receiving information regarding a measurement system over a wide area network (WAN);

the server computer determining one or more measurement software products in response to the information;

determining if a user does not have at least one of the determined one or more measurement software products by:

determining installed measurement software products in the measurement system over the wide area network;

comparing the determined installed measurement software products to the determined one or more measurement software products to determine if the at least one measurement software product is not installed in the measurement system;

if the user does not have the at least one measurement software product:

providing the at least one measurement software product of the one or more measurement software products to the user.

29. The computer-readable medium of claim 25, wherein the information regarding the measurement system comprises requirement information of a desired measurement system.

30. The computer-readable medium of claim 25, wherein the information regarding the measurement system comprises a configuration diagram of a desired measurement system.

31. The computer-readable medium of claim 30, wherein the program instructions are computer-executable to perform:

providing a graphical user interface over the WAN useable for creating the configuration diagram.

32. The computer-readable medium of claim 25, wherein the program instructions are computer-executable to perform:

the server computer determining one or more measurement software products in response to the information; and providing at least one measurement software product of the one or more measurement software products over the WAN to the user.

33. The computer-readable medium of claim 32, wherein the program instructions are computer-executable to perform:

determining if the user does not have the at least one measurement software product by:

determining installed measurement software products in the measurement system over the wide area network;

comparing the determined installed measurement software products to the one or more measurement software products to determine if the at least one measurement software product is not installed in the measurement system;

if the user does not have the at least one measurement software product:

providing the at least one measurement software product to the user.

34. The method of claim 27, wherein the information regarding the system comprises requirement information of a desired system.

35. The method of claim 27, wherein the information regarding the system comprises a configuration diagram of a desired system.

36. The method of claim 35, further comprising:

providing a graphical user interface over the WAN useable for creating the configuration diagram.

37. The method of claim 27, further comprising:

the server computer determining one or more software products in response to the information; and providing at least one software product of the one or more software products over the WAN to the user.

38. The method of claim 37, further comprising:

determining if the user does not have the at least one software product by:

determining installed software products in the system over the wide area network;

comparing the determined installed software products to the one or more software products to determine if the at least one software product is not installed in the system;

if the user does not have the at least one software product:

providing the at least one software product to the user.

39. A computer-readable medium which stores program instructions for configuring a system, wherein the program instructions are computer-executable to perform:
    a server computer receiving information regarding a system over a wide area network (WAN);
    the server computer determining one or more devices in response to the information;
    determining if a user does not have at least one of the determined one or more devices by:
        determining installed devices in the system over the wide area network;
        comparing the determined installed devices to the determined one or more devices to determine if the at least one device is not installed in the system;
    if the user does not have the at least one device:
        providing the at least one device of the one or more devices to the user.

40. The computer-readable medium of claim 39, wherein the information regarding the system comprises requirement information of a desired system.

41. The computer-readable medium of claim 39, wherein the information regarding the system comprises a configuration diagram of a desired system.

42. The computer-readable medium of claim 41, wherein the program instructions are computer-executable to perform:
    providing a graphical user interface over the WAN useable for creating the configuration diagram.

43. The computer-readable medium of claim 39, wherein the program instructions are computer-executable to perform:
    the server computer determining one or more software products in response to the information; and
    providing at least one software product of the one or more software products over the WAN to the user.

44. The computer-readable medium of claim 43, wherein the program instructions are computer-executable to perform:
    determining if the user does not have the at least one software product by:
        determining installed software products in the system over the wide area network;
        comparing the determined installed software products to the one or more software products to determine if the at least one software product is not installed in the system;
    if the user does not have the at least one software product:
        providing the at least one software product to the user.

45. The computer-readable medium of claim 43,
wherein the at least one device comprises a programmable hardware element; and
wherein the at least one software product includes a hardware configuration program which is usable to configure the programmable hardware element of the at least one device.

46. The computer-readable medium of claim 43,
wherein the at least one device comprises a processor and a memory; and
wherein the at least one software product comprises a software program which is operable to be stored in the memory and executed by the processor.

* * * * *